US012262328B2

(12) United States Patent
Yi et al.

(10) Patent No.: US 12,262,328 B2
(45) Date of Patent: Mar. 25, 2025

(54) POWER CONTROL FOR MULTIPLE SERVICES

(71) Applicant: Ofinno, LLC, Reston, VA (US)

(72) Inventors: Yunjung Yi, Vienna, VA (US); Esmael Hejazi Dinan, McLean, VA (US); Hua Zhou, Vienna, VA (US); Alireza Babaei, Fairfax, VA (US); Hyoungsuk Jeon, Centreville, VA (US)

(73) Assignee: Ofinno, LLC, Reston, VA (US)

( * ) Notice: Subject to any disclaimer, the term of this patent is extended or adjusted under 35 U.S.C. 154(b) by 430 days.

(21) Appl. No.: 17/549,502

(22) Filed: Dec. 13, 2021

(65) Prior Publication Data

US 2022/0210743 A1 Jun. 30, 2022

Related U.S. Application Data

(63) Continuation of application No. PCT/US2020/037778, filed on Jun. 15, 2020.
(Continued)

(51) Int. Cl.
*H04W 52/14* (2009.01)
*H04L 1/1812* (2023.01)
(Continued)

(52) U.S. Cl.
CPC ......... *H04W 52/146* (2013.01); *H04L 1/1812* (2013.01); *H04W 52/16* (2013.01); *H04W 52/281* (2013.01); *H04W 52/325* (2013.01)

(58) Field of Classification Search
CPC ..... H04W 52/06; H04W 52/16; H04W 52/18; H04W 52/146; H04W 52/281; H04W 52/325; H04L 1/82
See application file for complete search history.

(56) References Cited

U.S. PATENT DOCUMENTS 9,143,291 B2 9/2015 Kuchibhotla et al.
10,206,199 B2 2/2019 Jung et al.
(Continued)

FOREIGN PATENT DOCUMENTS

CN 102986281 A 3/2013
CN 105519215 A 4/2016
(Continued)

OTHER PUBLICATIONS

3GPP TS 38.101-1 V15.5.0 (Mar. 2019); Technical Specification; 3rd Generation Partnership Project; Technical Specification Group Radio Access Network; NR; User Equipment (UE) radio transmission and reception; Part 1: Range 1 Standalone.
(Continued)

*Primary Examiner* — Said M Elnoubi
(74) *Attorney, Agent, or Firm* — Brett K. Gardner; Kavon Nasabzadeh; Jacob L. Mangan

(57) ABSTRACT

A wireless device receives configuration parameters indicating a first cell group for communication with a first base station and a second cell group for communication with a second base station. A determination is made that an allowed total transmission power for at least one first uplink signal of the first cell group based on at least one priority of at least one uplink signal. A determination is made that at least one first transmission power for the one or more first uplink signal based on the allowed total transmission power. The at least one first uplink signals with the at least one first transmission power are transmitted.

20 Claims, 28 Drawing Sheets

Determine, by a wireless device, transmission powers of uplink channels based on the following order of power priorities: a physical random access channel (PRACH) of a primary cell; an uplink channel comprising 1st information with a 1st priority; the uplink channel comprising 2nd information with a 2nd priority that is lower than the 1st priority; and a PRACH of a secondary cell
2610

Transmit, via the uplink channels, uplink signals with the transmission powers
2620

Related U.S. Application Data

(60) Provisional application No. 62/861,019, filed on Jun. 13, 2019.

(51) Int. Cl.
  *H04W 52/16* (2009.01)
  *H04W 52/28* (2009.01)
  *H04W 52/32* (2009.01)

(56) References Cited

U.S. PATENT DOCUMENTS

| | | | |
|---|---|---|---|
| 10,491,328 | B2 | 11/2019 | Jung et al. |
| 10,966,223 | B2 | 3/2021 | Kundu et al. |
| 11,134,476 | B2 | 9/2021 | Yu |
| 11,277,823 | B2 | 3/2022 | Wang et al. |
| 11,363,628 | B2 | 6/2022 | Lee et al. |
| 2016/0308653 | A1 | 10/2016 | Dinan |
| 2019/0261281 | A1* | 8/2019 | Jung .................... H04W 52/50 |
| 2019/0335485 | A1 | 10/2019 | Kundu et al. |
| 2019/0335488 | A1 | 10/2019 | Xiong et al. |
| 2020/0053724 | A1* | 2/2020 | MolavianJazi ..... H04W 52/281 |
| 2020/0053801 | A1* | 2/2020 | Hosseini ............... H04W 72/21 |
| 2020/0229104 | A1* | 7/2020 | MolavianJazi ... H04W 72/1268 |
| 2020/0275504 | A1* | 8/2020 | Hosseini ........... H04W 72/1268 |
| 2022/0167372 | A1* | 5/2022 | Zhang .................... H04W 48/12 |
| 2022/0295458 | A1 | 9/2022 | Zhang et al. |
| 2023/0085025 | A1 | 3/2023 | Yoo et al. |

FOREIGN PATENT DOCUMENTS

| | | |
|---|---|---|
| CN | 106134263 A | 11/2016 |
| CN | 106165504 A | 11/2016 |
| CN | 108370294 A | 8/2018 |
| EP | 2 667 668 A2 | 11/2013 |
| WO | 2017019587 A2 | 2/2017 |

OTHER PUBLICATIONS

3GPP TS 38.212 V15.4.0 (Dec. 2018); Technical Specification; 3rd Generation Partnership Project; Technical Specification Group Radio Access Network; NR; Multiplexing and channel coding; (Release 15).
"3GPP TS 38.213 V15.5.0 (Mar. 2019); Technical Specification; 3rd Generation Partnership Project; Technical Specification Group Radio Access Network; NR; Physical layer procedures for control (Release 15)."
3GPP TS 38.331 V15.4.0 (Dec. 2018); Technical Specification; 3rd Generation Partnership Project; Technical Specification Group Radio Access Network; NR; Radio Resource Control (RRC) protocol specification; (Release 15).
"R1-1813648 Ericsson—On 2-stage PSCCH design; 3GPP TSG-RAN WG1 Meeting #95; Spokane, WA, US, Nov. 12-16, 2018(Revision of R1-181607); ; Agenda Item:7.2.4.1.5; Source:Ericsson; Title:On 2-stage PSCCH design".
"R1-1904492 On sidelink physical layer structure; 3GPP TSG RAN WG1 #96bisR1-1904492 Xi'an, China, Apr. 8- 12, 2019; Agenda item:7.2.4.1; Source: MediaTek Inc.; Title: On sidelink physical layer structure; Document for:Discussion/Decision."
"R1-1904814 NR sidelink physical layer structure; 3GPP TSG RAN WG1 #96bis; Xi'an, China, Apr. 8-12, 2019; Title: NR sidelink physical layer structure; Source: ZTE, Sanechips; Agenda item:7.2.4.1; Document for: Discussion and decision."
"R1-1905437 Discussion on physical layer structure for NR sidelink; 3GPP TSG RAN WG1 #96bis; Xi'an, China, Apr. 8-12, 2019; Agenda Item:7.2.4.1; Source: LG Electronics; Title: Discussion on physical layer structure for NR sidelink; Document for:Discussion and decision."
"R1-1905490 Ericsson—On SCI and SFCI formats; 3GPP TSG-RAN WG1 Meeting #96bis; Xi'an, China, Apr. 8-12, 2019; ; Agenda Item:7.2.4.2.3 ; Source:Ericsson; Title:On SCI and SFCI formats."
"R1-1905995; 3GPP TSG RAN WG1 Meeting #97; Reno, USA, May 13-17, 2019; ; Agenda Item:7.2.5.4; Source: Huawei, HiSilicon; Title:Discussion on HARQ for NTN."
"R1-1906088; 3GPP TSG RAN WG1 Meeting #97; Reno, USA, May 13-17, 2019; Source :; Nokia, Nokia Shanghai Bell."
"R1-1906265 NTN HARQ.DOCX3GPP TSG RAN WG1 #97; Reno, USA, May 13-17, 2019; ; Source:Panasonic; Title: Discussion on Retransmission Mechanisms for NTN; Agenda Item:7.2.5.4 (More delay-tolerant re-transmission mechanisms)."
"R1-1906326; 3GPP TSG RAN WG1 Meeting #97; Reno, USA, May 13-17, 2019; ; Agenda Item:7.2.5.4; Source: CATT; Title:HARQ consideration for NTN."
"R1-1906386 HARQ operation for NTN; 3GPP TSG RAN WG1 #97; Reno, USA, May 13-17, 2019; Agenda Item:7.2.5.4; Source: OPPO; Title:Delay-tolerant HARQ operation for NTN."
"R1-1906466-MediaTek-Delay-tolerant re-transmission mechanisms for NR-NTN; 3GPP TSG RAN WG1 Meeting #97; Reno, Nevada, USA, May 13-17, 2019 ; Agenda Item: 7.2.5.4; Source: MediaTek Inc.; Title: Delay-tolerant re-transmission mechanisms in NR-NTN; Document for: Discussion and Decision."
"R1-1906805 Discussion on HARQ for NTN; 3GPP TSG RAN WG1 #97 R1-19xxxxx, Reno, Nevada, US May 13-17, 2019; Source: Intel Corporation; Title:Discussion on HARQ for NTN; Agenda item:7.2.5.4."
"R1-1906873 Discussion on the HARQ procedure for NTN; 3GPP TSG RAN WG1 #97; Reno, USA, May 13-17, 2019; ; Source:ZTE; Title:Discussion on the HARQ procedure for NTN; Agenda Item:7.2.5.4."
"R1-1906954_NTN_HARQ_SS; 3GPP TSG RAN WG1 Meeting #97; Reno, USA, May 13-17, 2019; Agenda tem:7.2.5.4; Source: Samsung; Title: HARQ procedure in NTN; Document for: Discussion."
"R1-1907279 Delay-tolerant retransmission mechanisms for NTN; 3GPP TSG RAN WG1 #97; Reno, USA, May 13-17, 2019; ; Agenda item:7.2.5.4; Source: Qualcomm Incorporated; Title: Delay-Tolerant Retransmission Mechanisms for NTN."
"R1-1907392 On adapting HARQ procedures for NTN; 3GPP TSG-RAN WG1 Meeting #97; Reno, USA, May 13-17, 2019; ; Agenda Item:7.2.5.4; Source:Ericsson; Title:On adapting HARQ procedures for NTN."
R1-142170; 3GPP TSG RAN WG1 Meeting #77; Seoul, Korea, May 19-23, 2014; Agenda Item: 6.2.4, Source: NEC; Title: Channel prioritisation and power scaling for dual connectivity; Document for: Discussion / Decision.
R1-1803239; 3GPP TSG RAN WG1 Meeting #92; Athens, Greece, Feb. 26-Mar. 2, 2018; Agenda item: 7.1.6.2 and 7.1.6.3; Source: Samsung; Title: Summary of NR UL power control—CA aspects.
International Search Report and Written Opinion of the International Searching authority mailed Nov. 6, 2020, in International Application No. PCT/US2020/037778.
Notice of Allowance, mailed Jul. 26, 2024, in CN Patent Application No. 2020800552960.
Chinese Office Action, mailed Dec. 21, 2023, in CN Patent Application No. 2020800552960.
R1-1906752; 3GPP TSG RAN WG1#97; Reno, Nevada, US, May 13-17, 2019; Agenda item: 7.2.6.2; Source: Nokia, Nokia Shanghai Bell; Title: On UCI Enhancements for NR URLLC; Document for: Discussion and Decision.

* cited by examiner

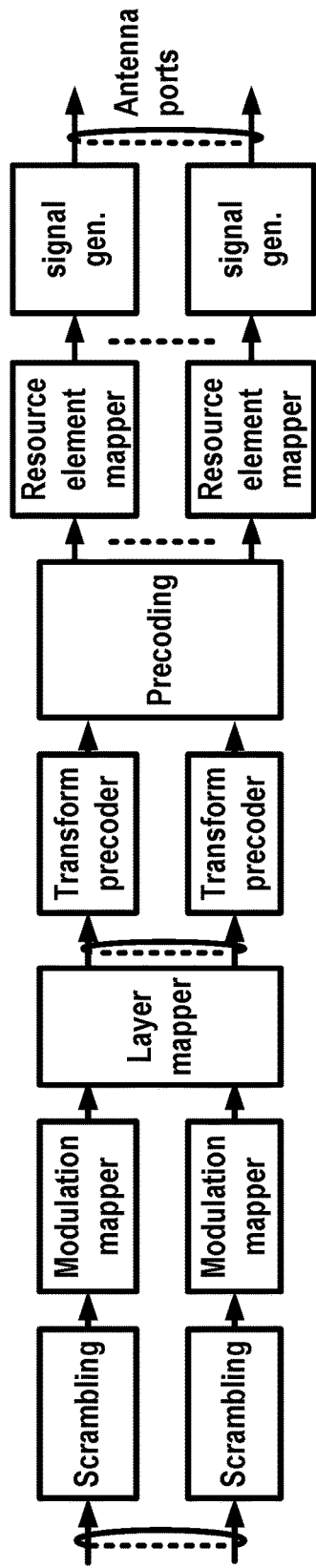
FIG. 4A
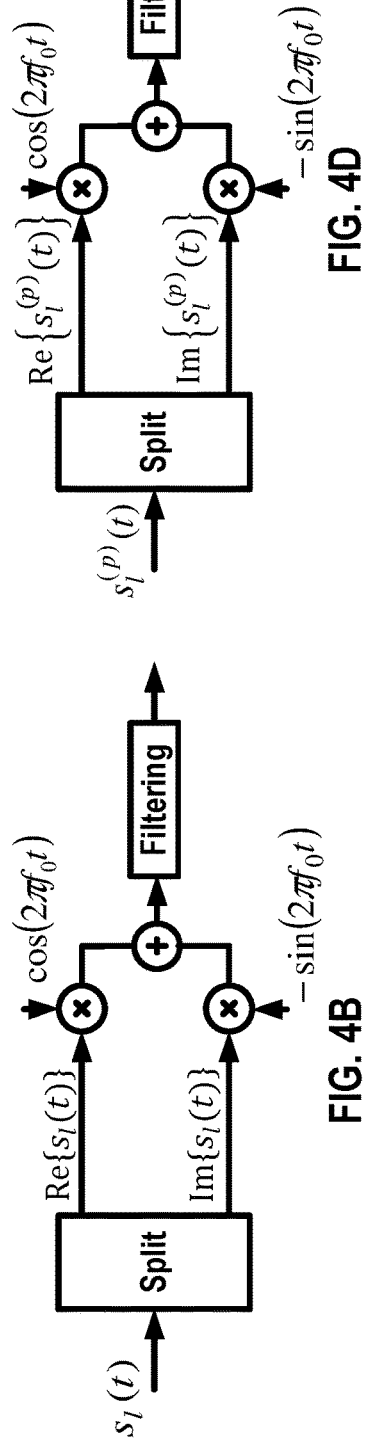
FIG. 4B
FIG. 4D
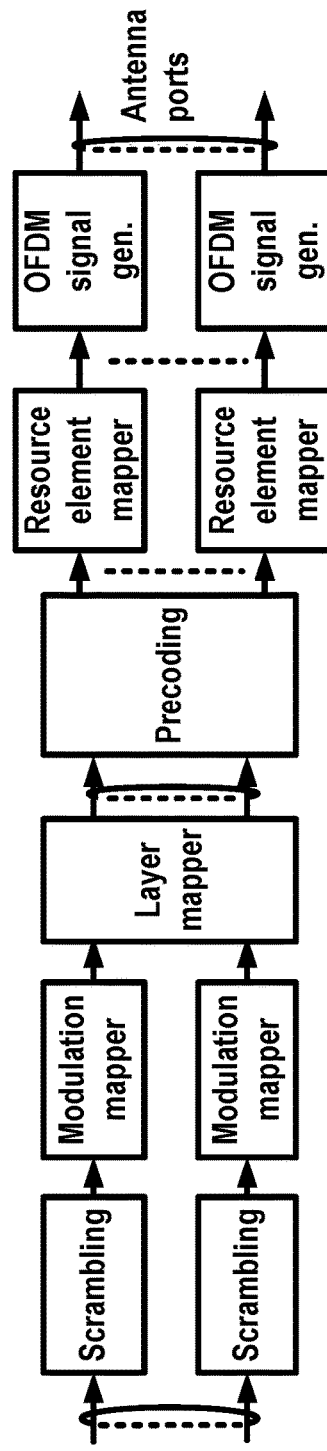
FIG. 4C

```
PhysicalCellGroupConfig ::=         SEQUENCE {
    p-NR-FR1                            P-Max       OPTIONAL,       -- Need R
    pdsch-HARQ-ACK-Codebook             ENUMERATED {semiStatic, dynamic},
    [[
    mcs-C-RNTI                          RNTI-Value  OPTIONAL,       -- Need R
    p-UE-FR1                            P-Max       OPTIONAL        -- Cond MCG-Only
    ]],
    additional-Allowance                AdditionalAllowance  OPTIONAL,   -- Need S
    ...
}
```

*p-NR-FR1*
The maximum total transmit power to be used by the UE in this NR cell group across all serving cells in frequency range 1 (FR1) at least for first uplink channel type. additional-Allowance is (if configured) added for second uplink channel type. The maximum transmit power that the UE may use may be additionally limited by *p-Max* (configured in FrequencyInfoUL) and by *p-UE-FR1* (configured total for all serving cells operating on FR1).

*p-UE-FR1*
The maximum total transmit power to be used by the UE across all serving cells in frequency range 1 (FR1) across all cell groups for first uplink channel type at least for first uplink channel type. additional-Allowance is (if configured) added for second uplink channel type. The maximum transmit power that the UE may use may be additionally limited by p-Max (configured in FrequencyInfoUL) and by p-NR-FR1 (configured for the cell group).

FIG. 23

Determine, by a wireless device, transmission powers of uplink channels based on the following order of power priorities: a physical random access channel (PRACH) of a primary cell; an uplink channel comprising 1st information with a 1st priority; the uplink channel comprising 2nd information with a 2nd priority that is lower than the 1st priority; and a PRACH of a secondary cell
2610

Transmit, via the uplink channels, uplink signals with the transmission powers
2620

FIG. 26

POWER CONTROL FOR MULTIPLE SERVICES

CROSS-REFERENCE TO RELATED APPLICATIONS

This application is a continuation of International Application No. PCT/US2020/037778, filed Jun. 15, 2020, which claims the benefit of U.S. Provisional Application No. 62/861,019, filed Jun. 13, 2019, the contents of each of which are hereby incorporated by reference in their entireties.

BRIEF DESCRIPTION OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 23 is an example of configuration parameters.

FIG. 26 is a flow diagram of an aspect of an example embodiment of the present disclosure.

DETAILED DESCRIPTION OF EMBODIMENTS

Figure 1:
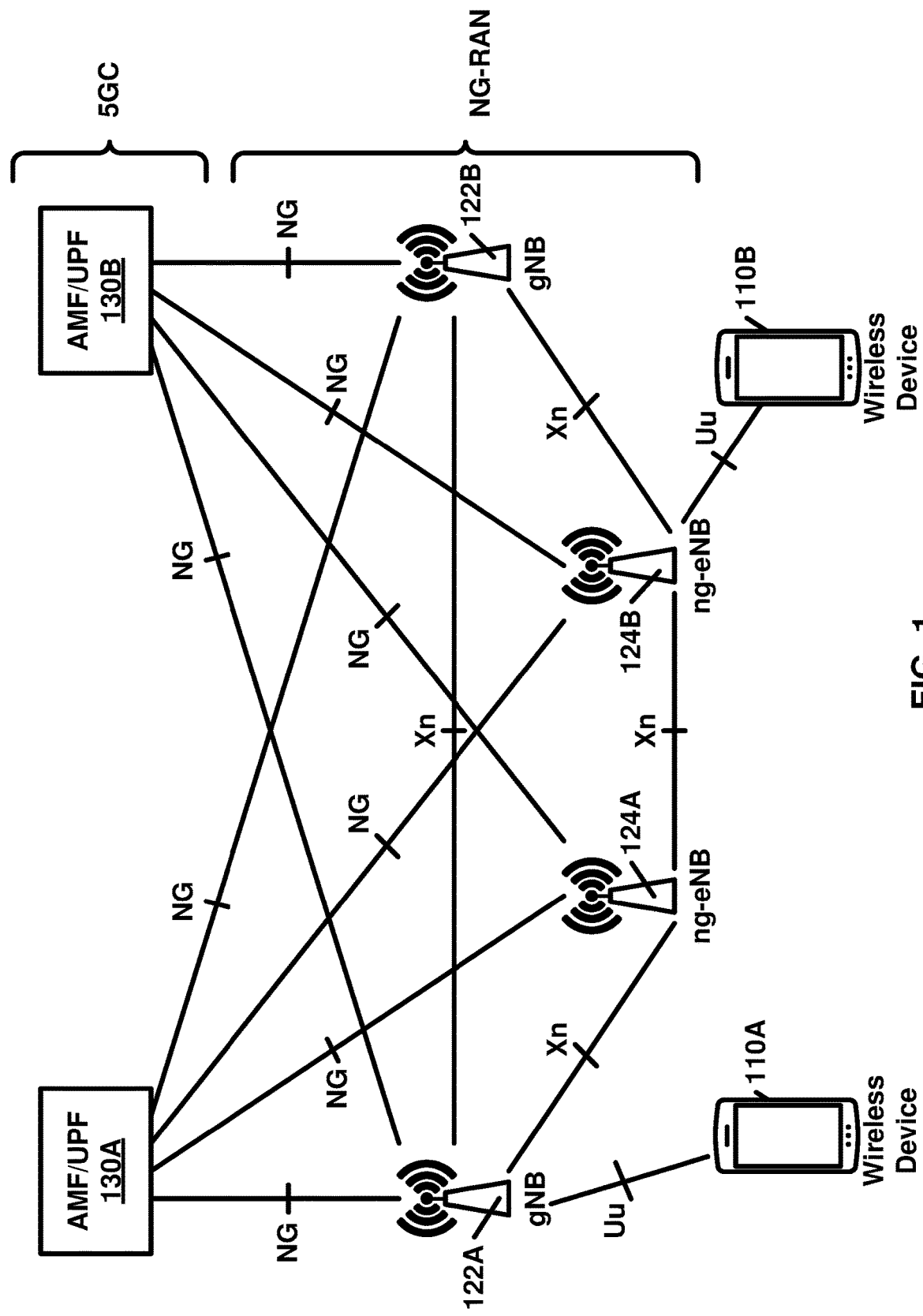
FIG. 1 is a diagram of an example RAN architecture as per an aspect of an embodiment of the present disclosure.

Example embodiments of the present disclosure enable operation of wireless communication systems. Embodiments of the technology disclosed herein may be employed in the technical field of multicarrier communication systems. More particularly, the embodiments of the technology disclosed herein may relate to radio access networks in multicarrier communication systems.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel IDentifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
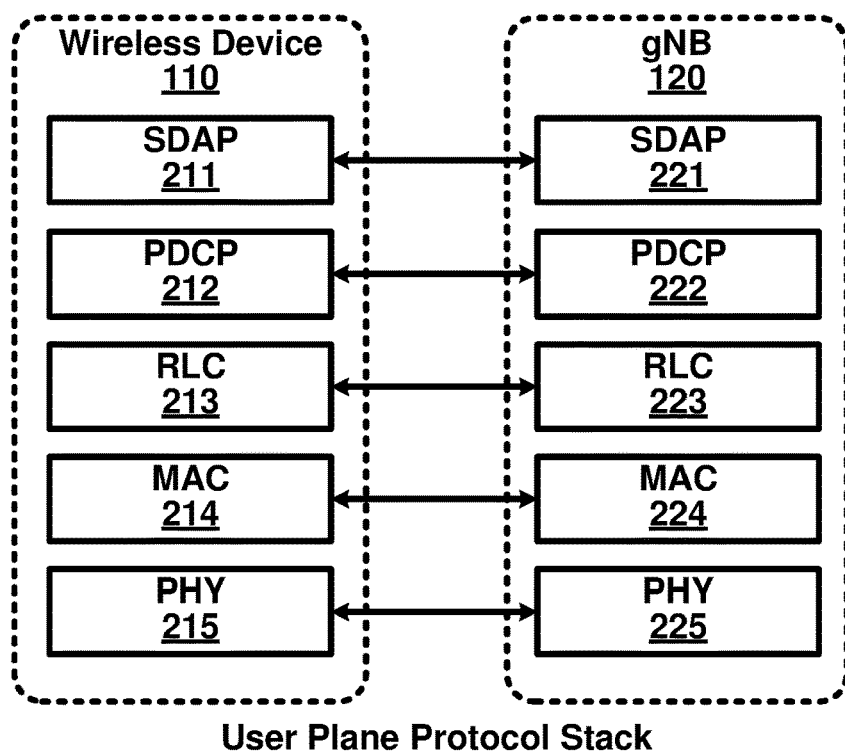
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TB s) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
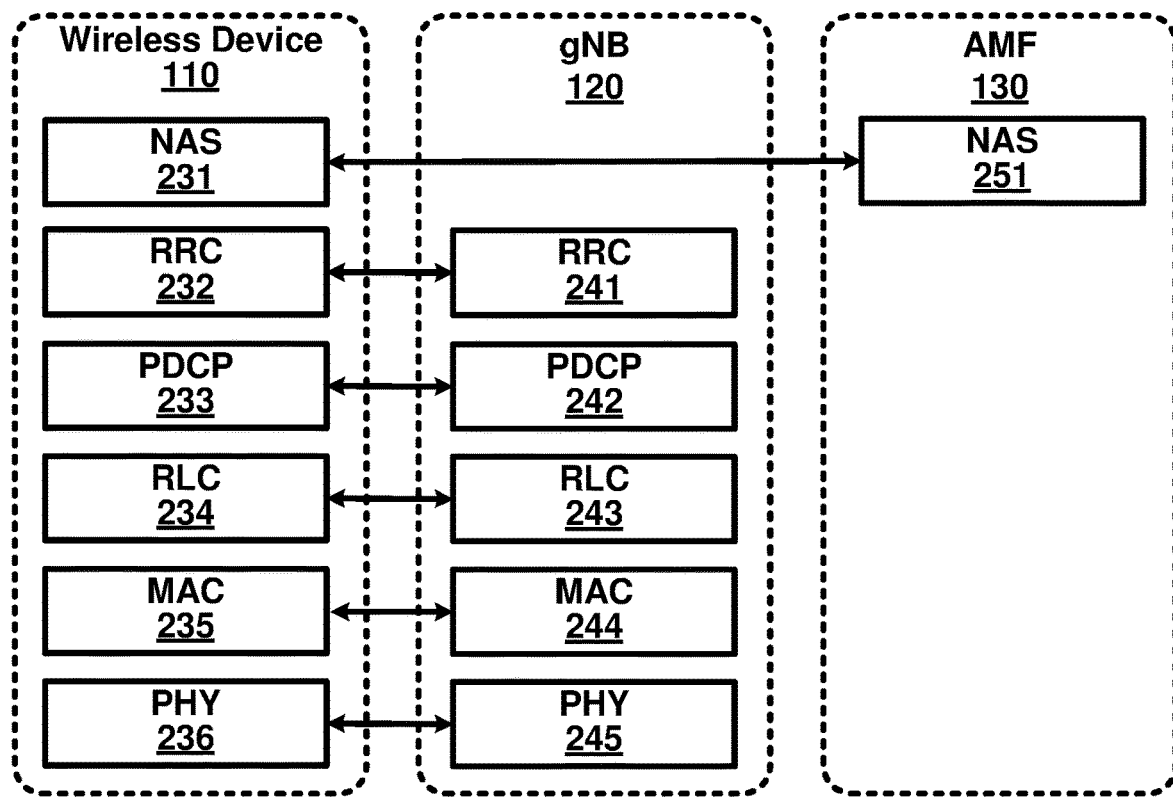
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
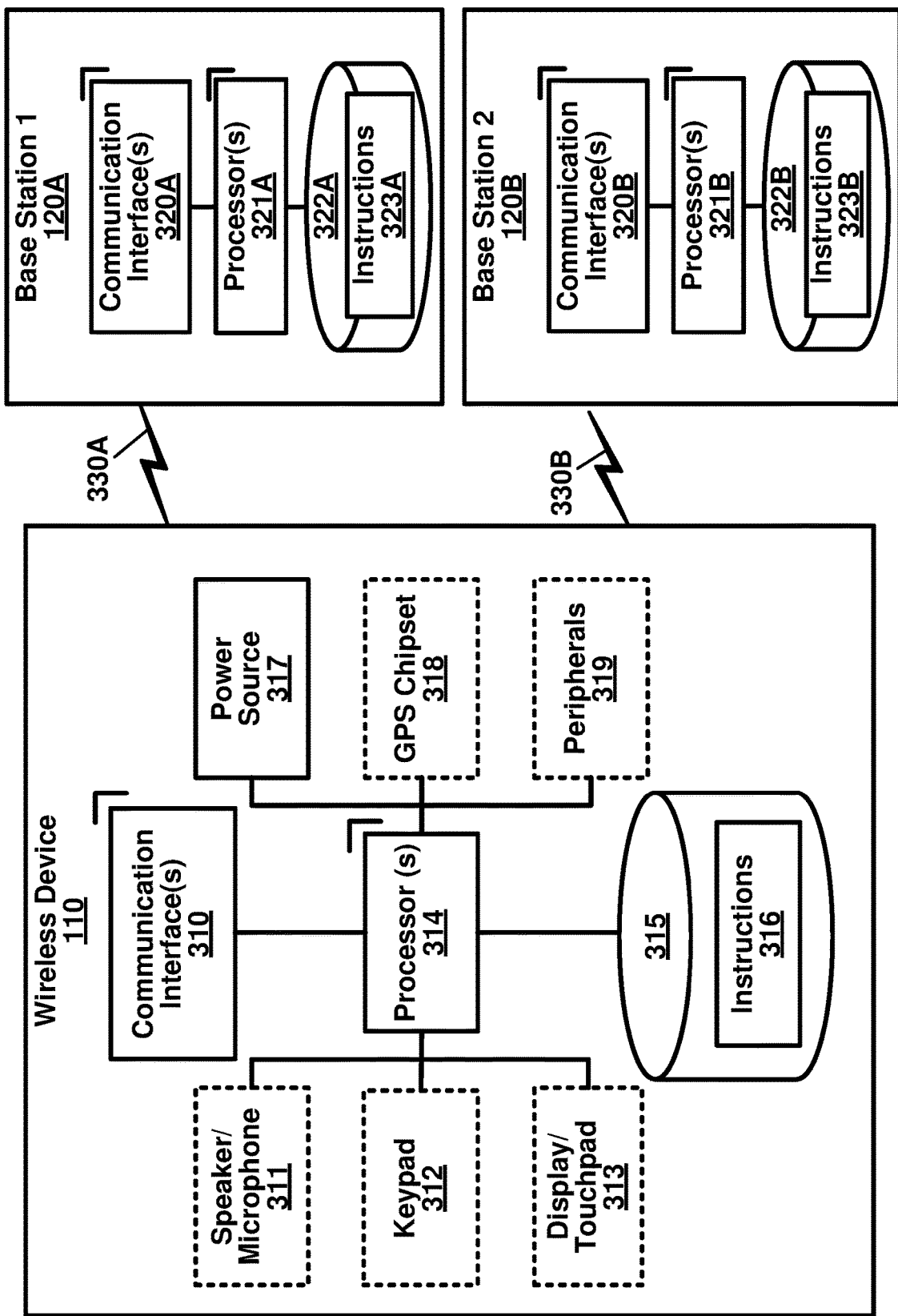
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of:

scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
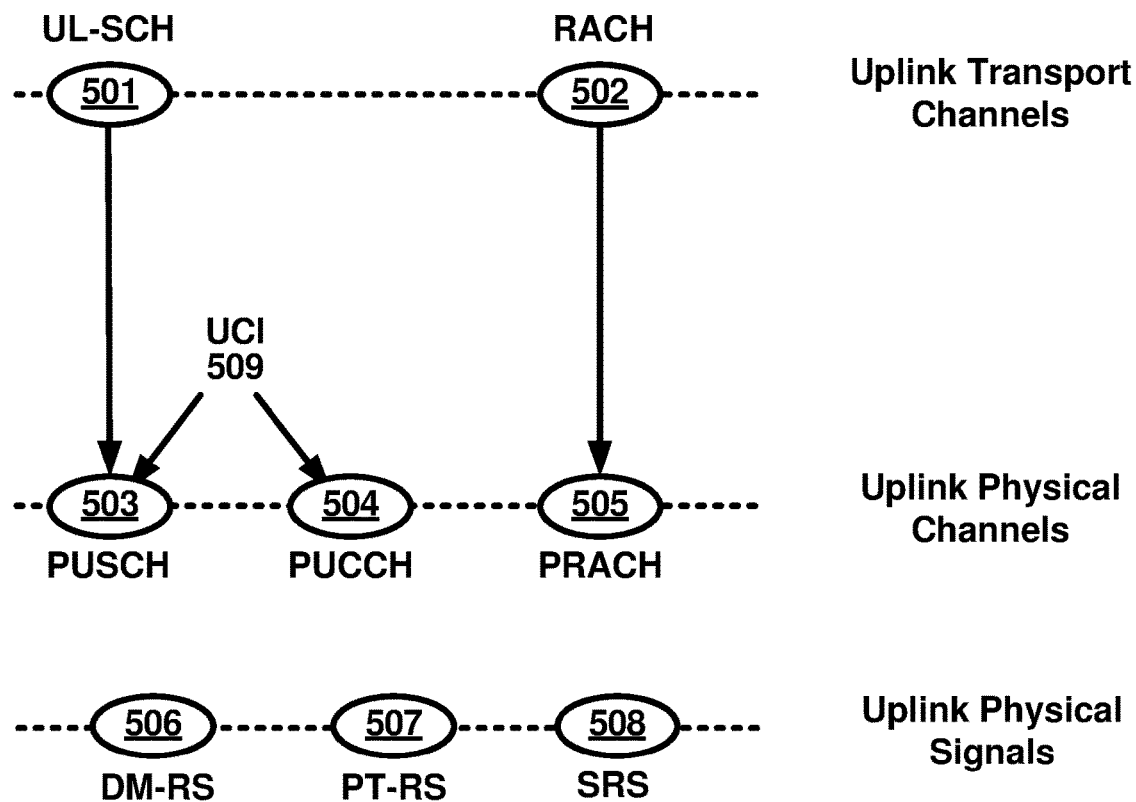
FIG. 5A is a diagram of an example uplink channel mapping and example uplink physical signals as per an aspect of an embodiment of the present disclosure.
Figure 5B:
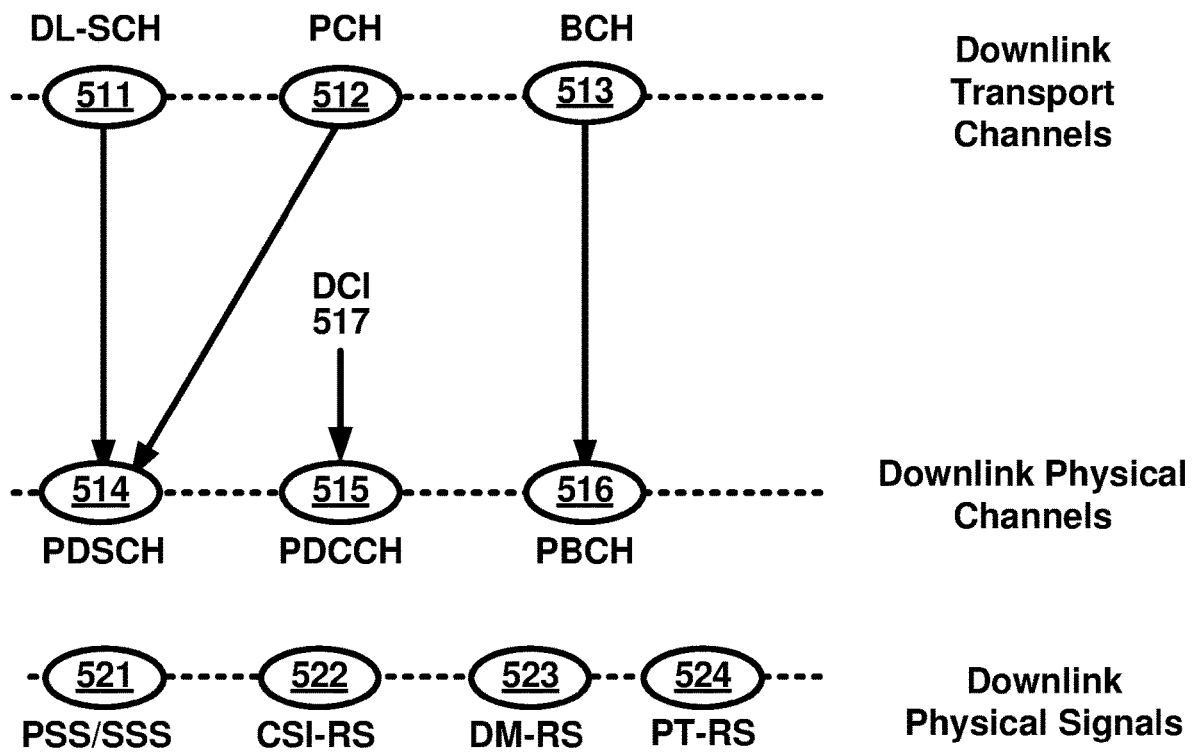
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic, and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM- RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
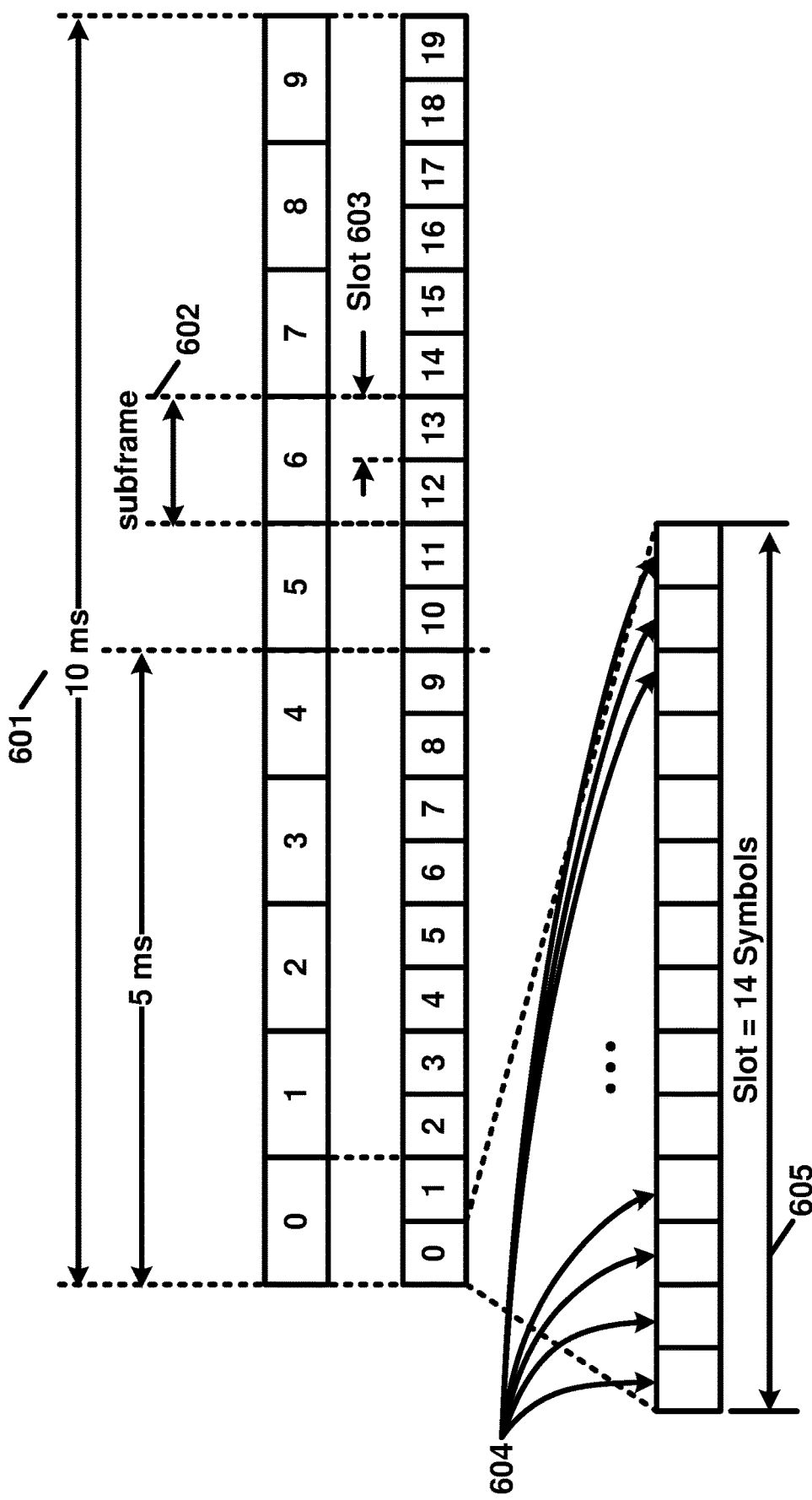
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz, and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
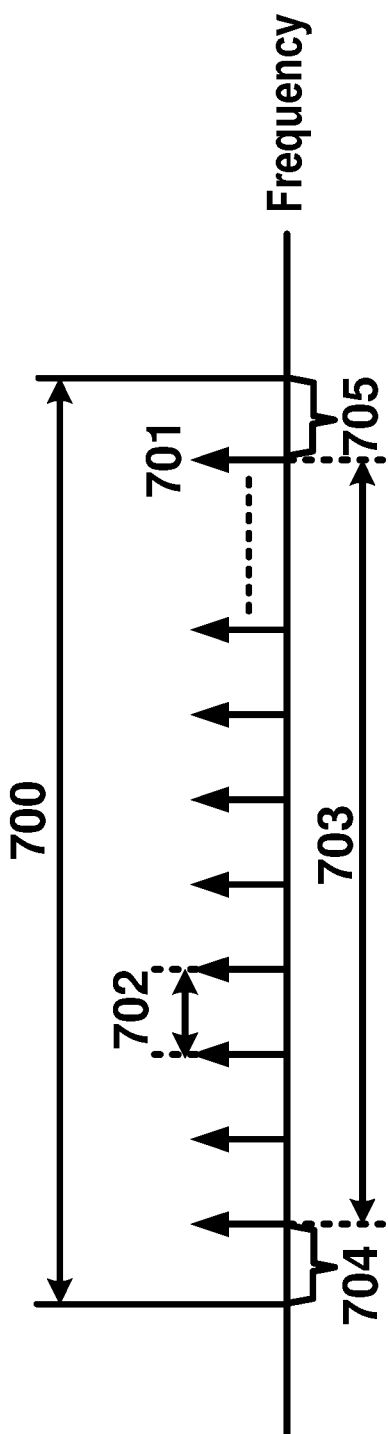
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
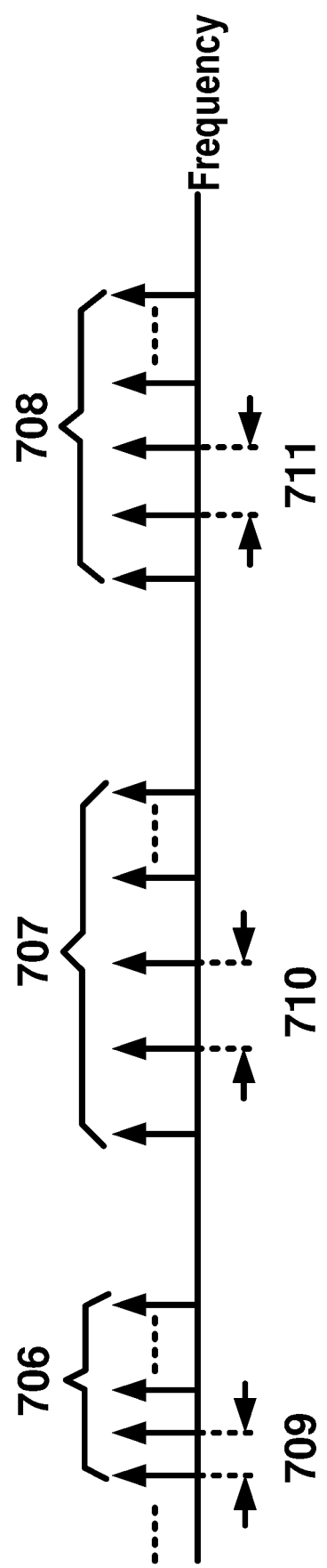

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
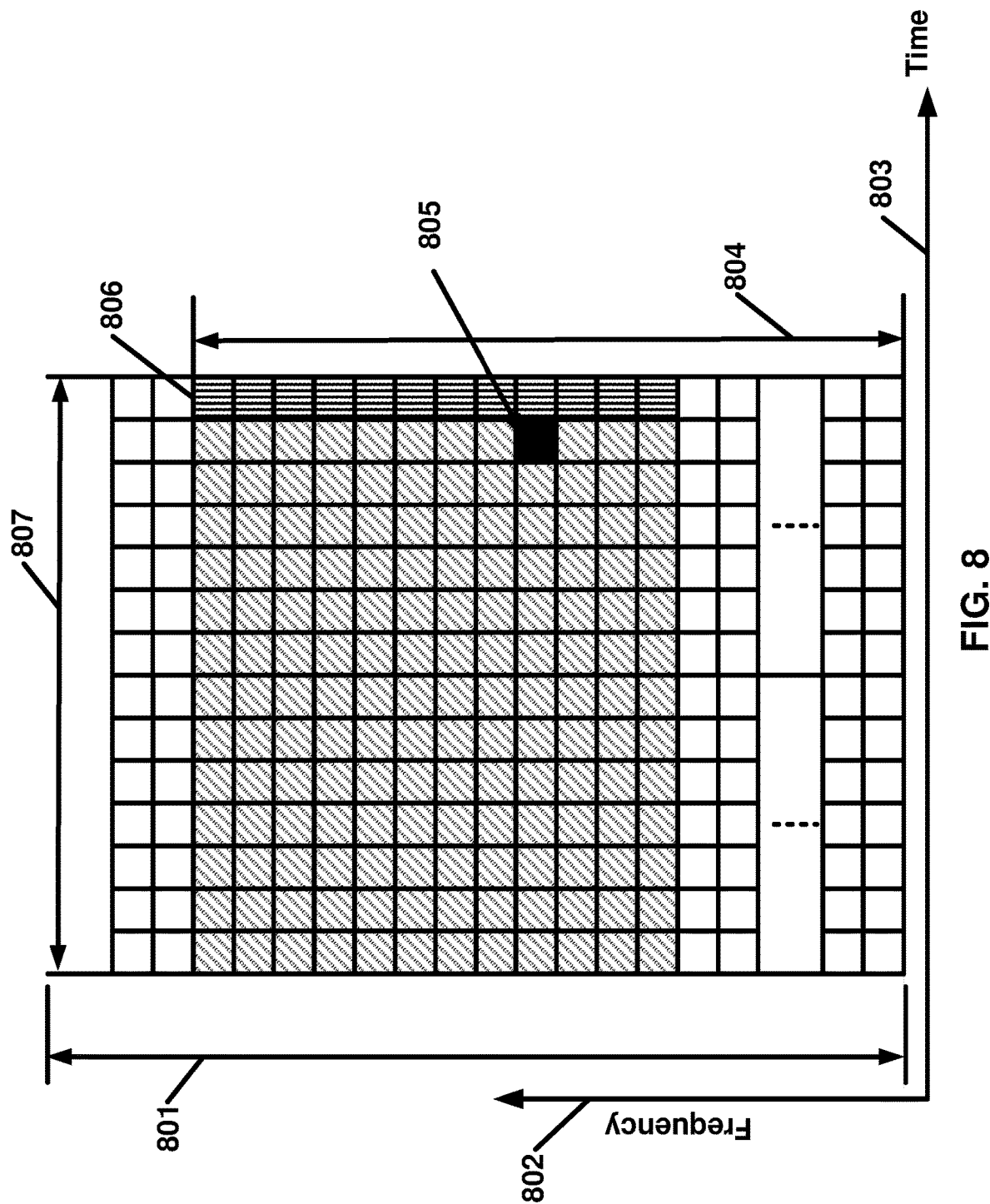
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
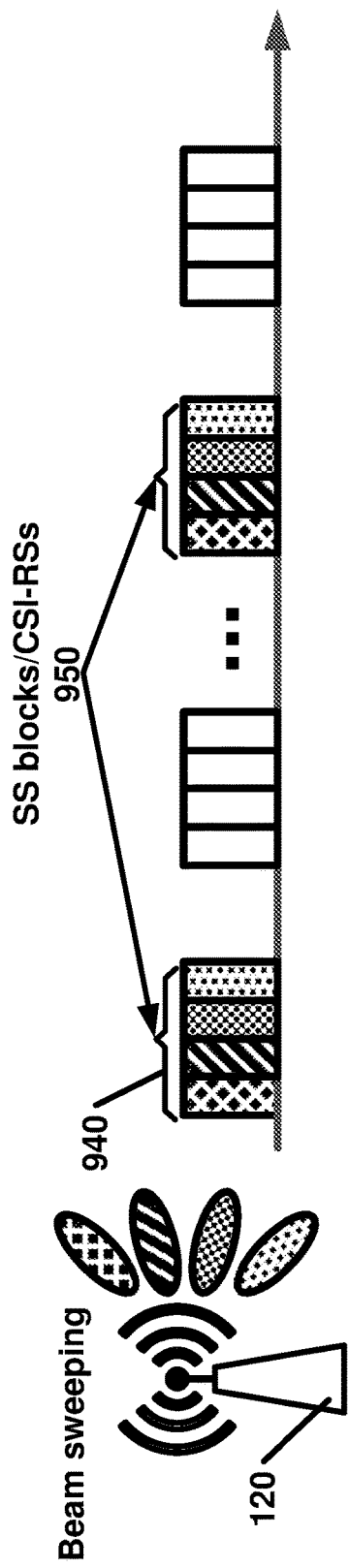
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
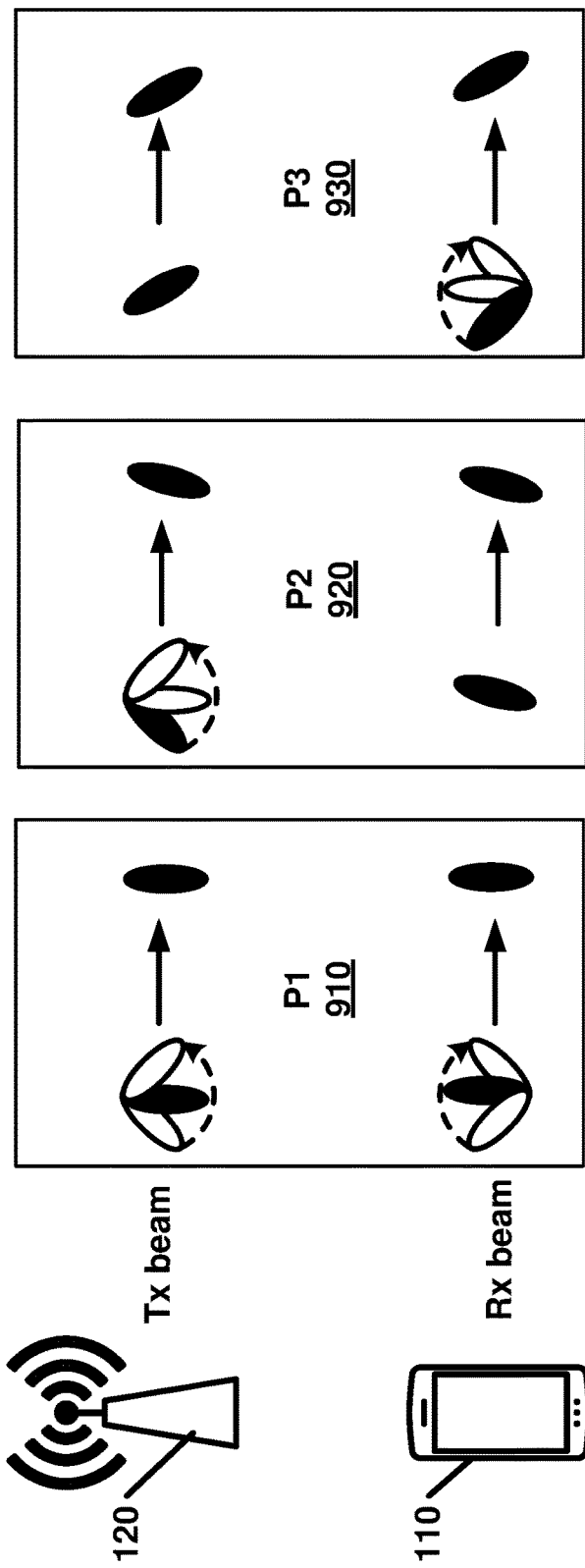
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
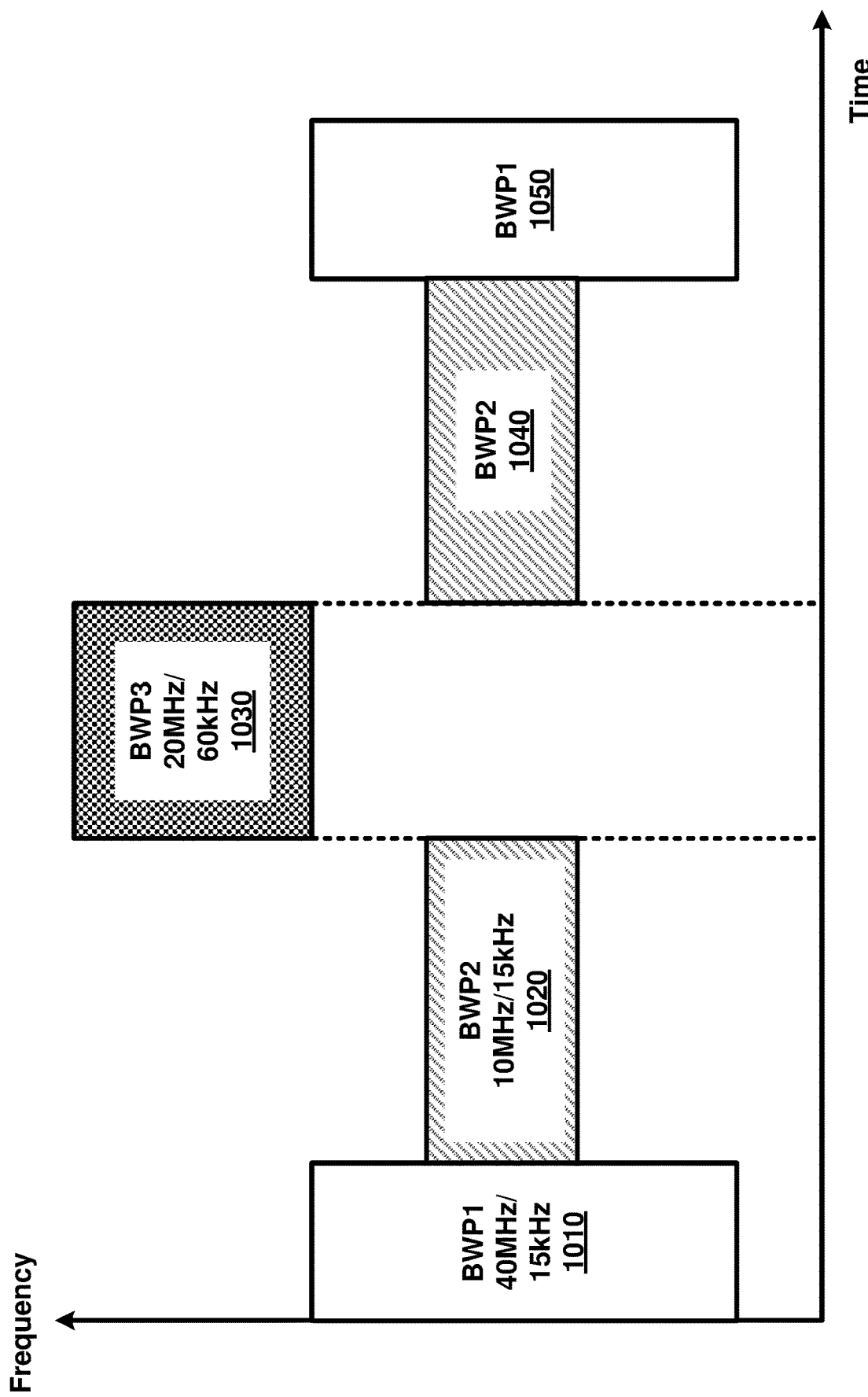
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
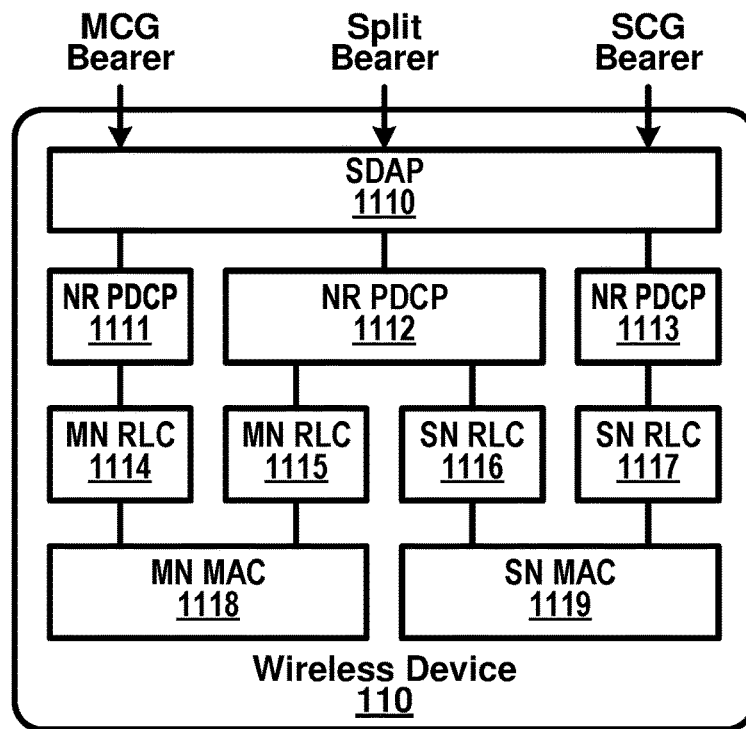
FIG. 11A and FIG. 11B are diagrams of an example multi-connectivity as per an aspect of an embodiment of the present disclosure.
Figure 11B:
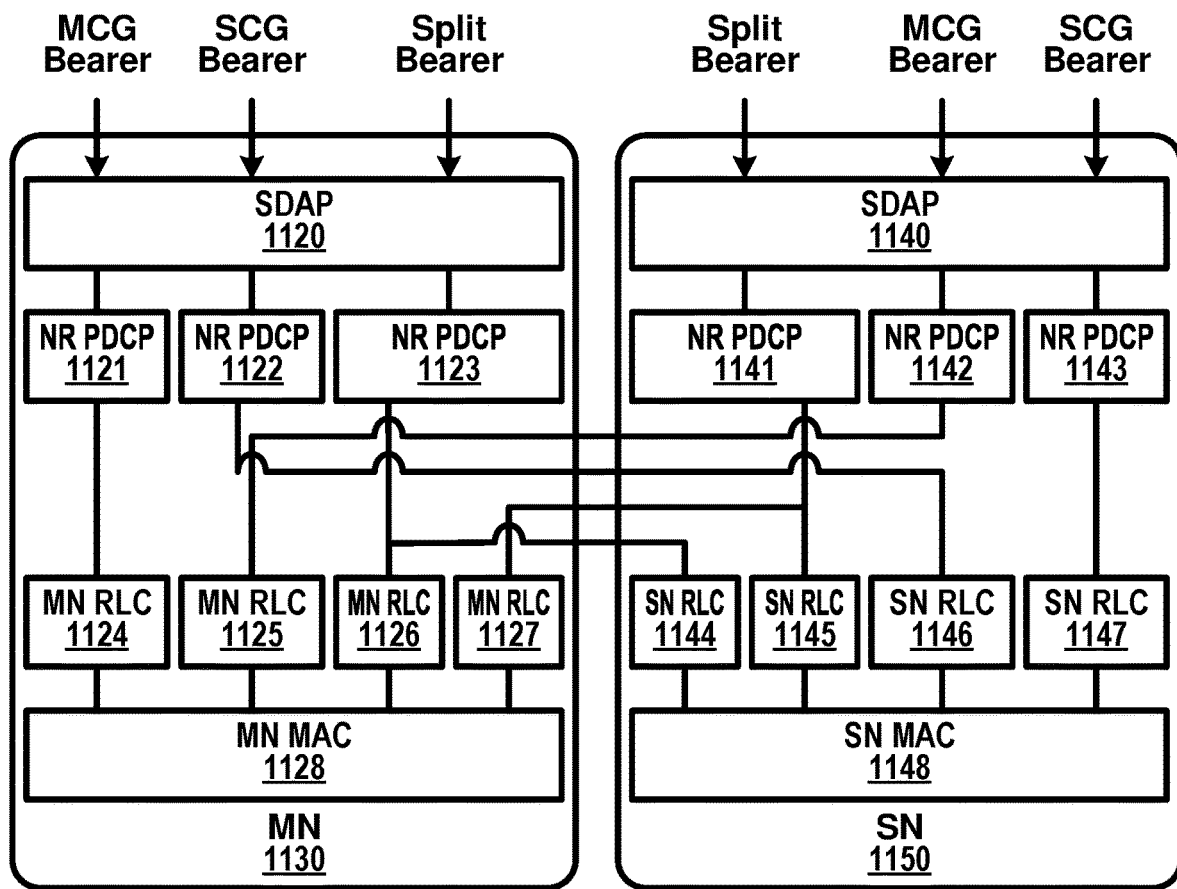

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g.

the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
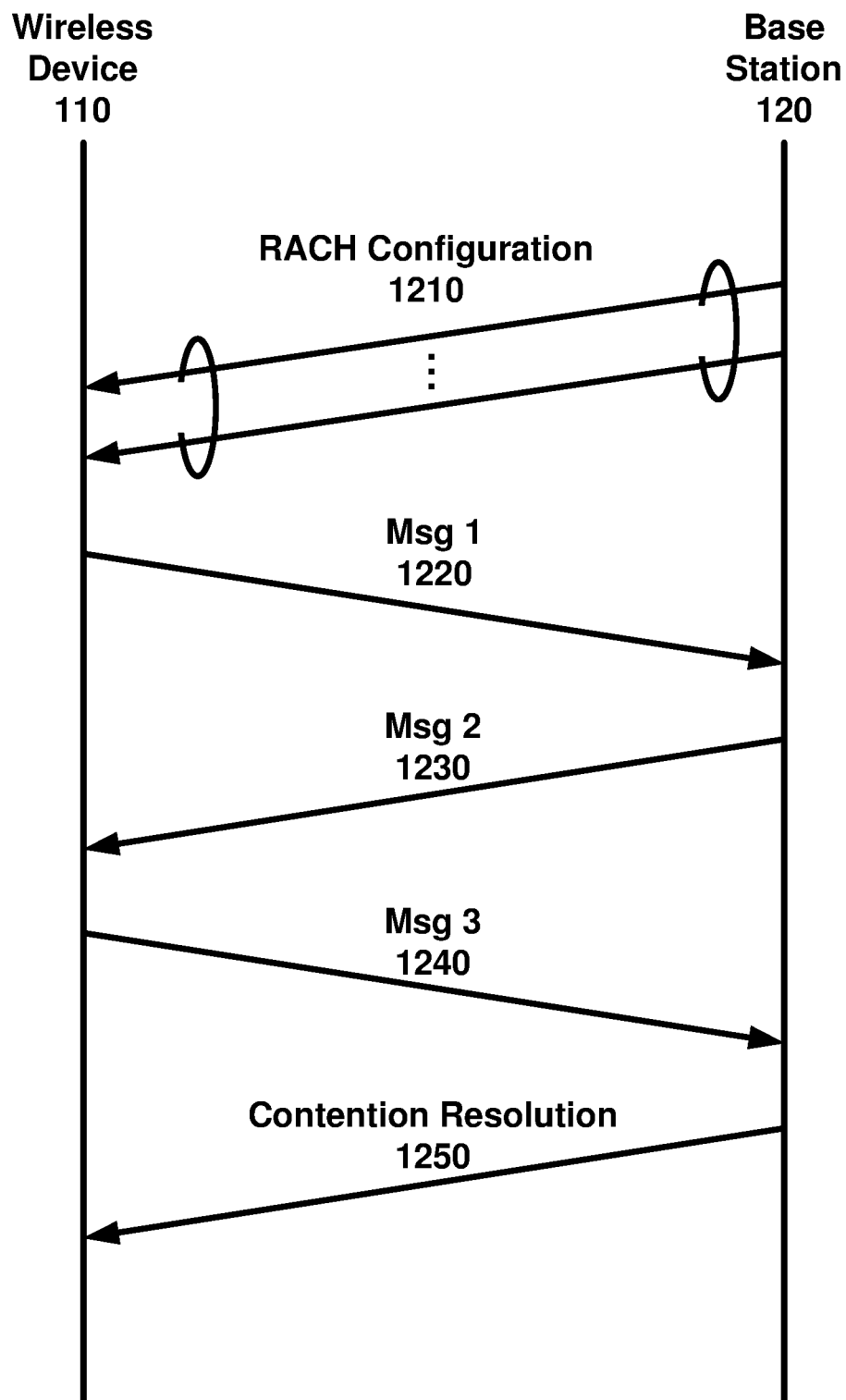
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-Response Window) to monitor a random access response. For beam failure recovery request, a base station may configure a UE with a different time window (e.g., bfr-Response Window) to monitor response on beam failure recovery request. For example, a UE may start a time window (e.g., ra-Response Window or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
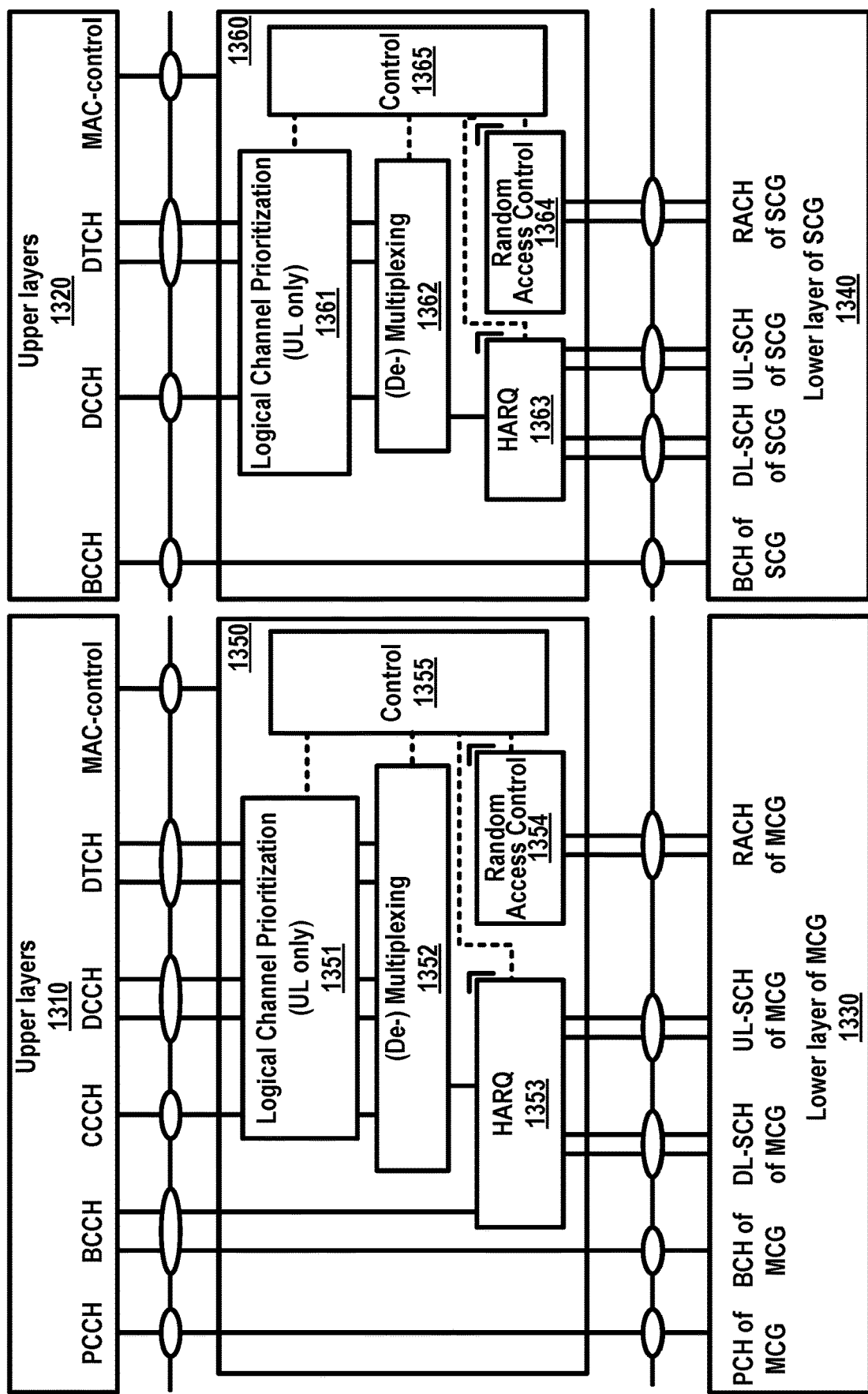
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection reestablishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
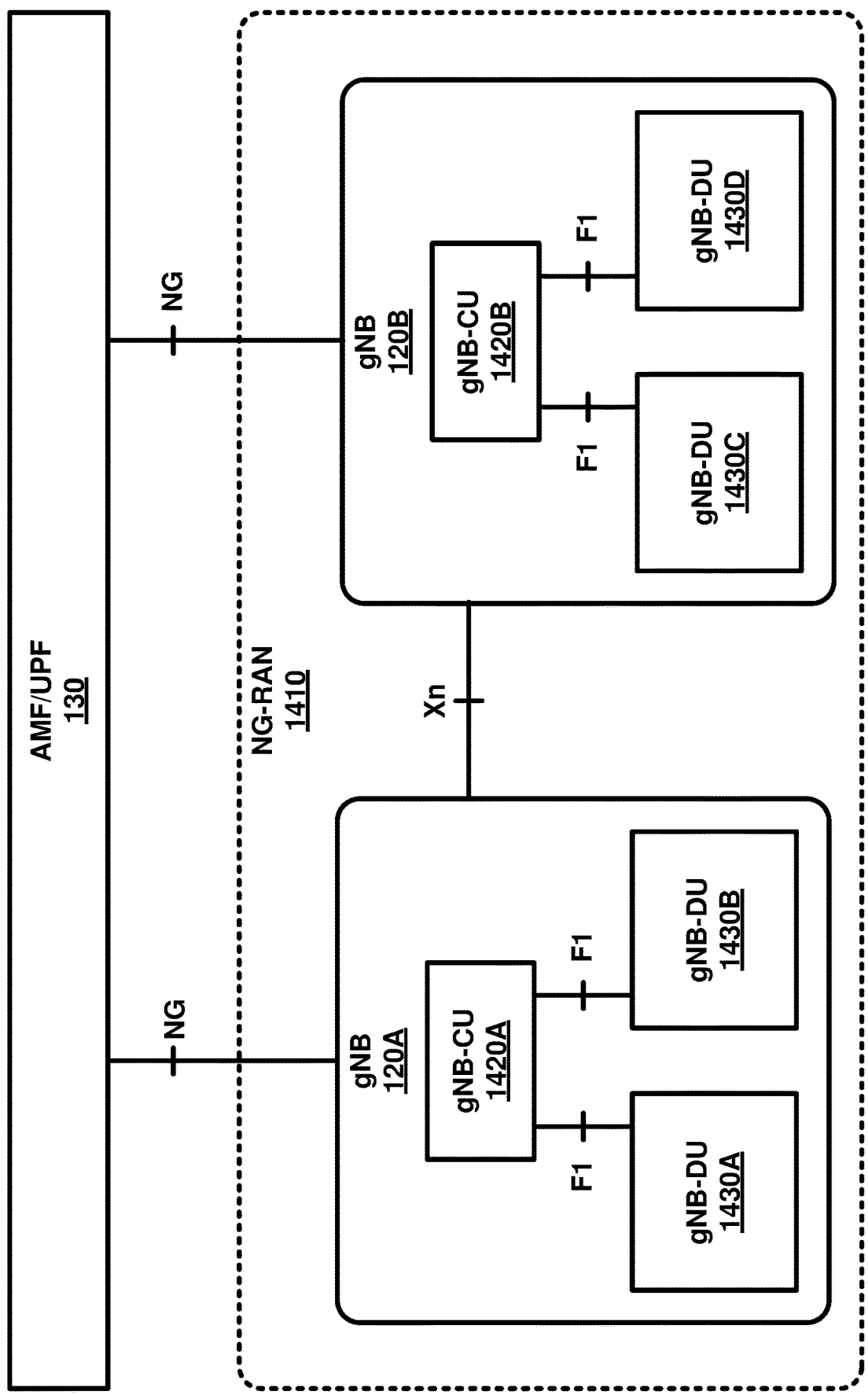
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g.

gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
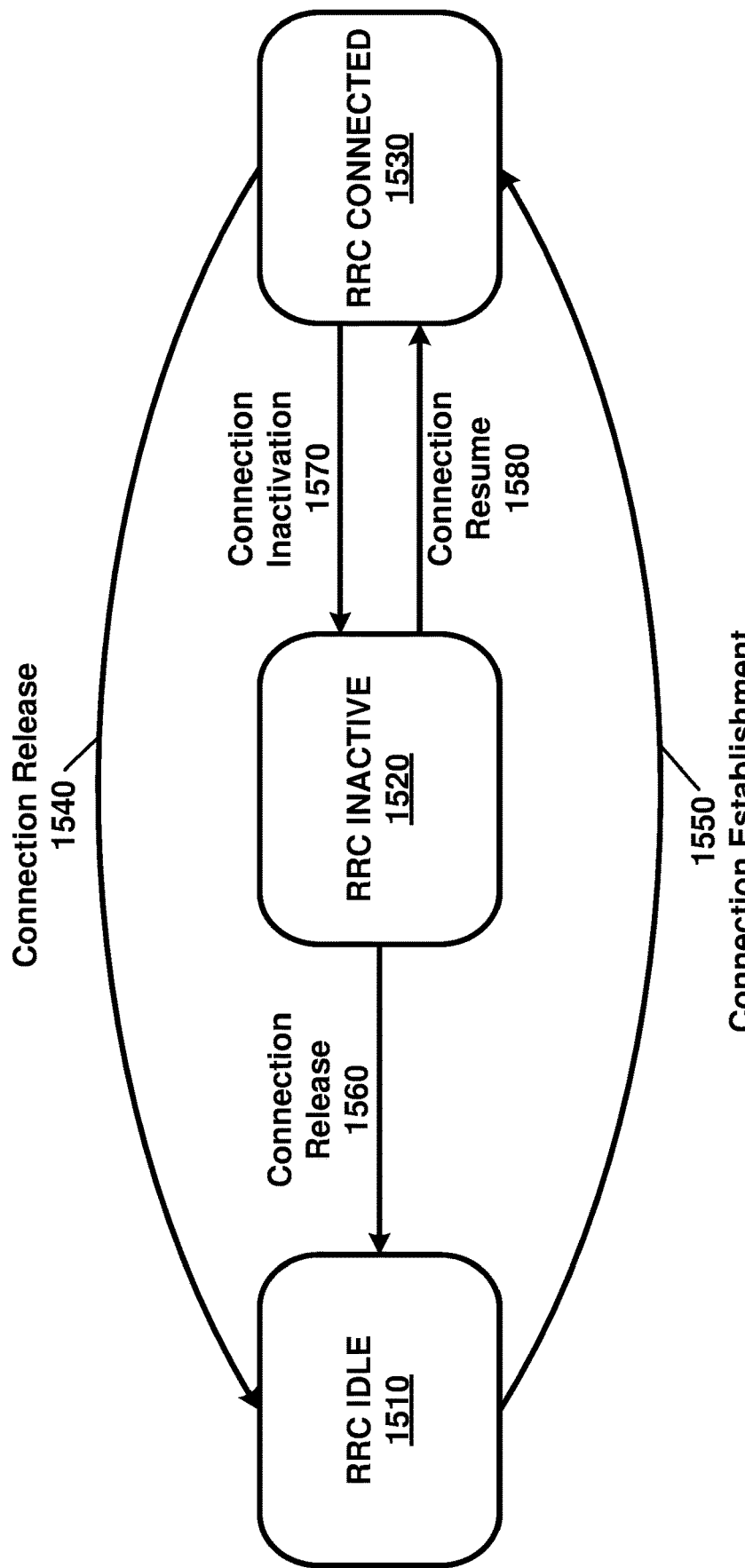
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

In an example, a PUSCH/PUCCH/SRS/PRACH transmission occasion ii may be defined by a slot index $n_{s,f}^{\mu} n_{s,f}^{\mu}$ within a frame with system frame number SFN SFN, a first symbol SS within the slot, and a number of consecutive symbols L.

For a PUSCH transmission on active UL BWP b of carrier f of serving cell c, a wireless device may calculate a linear value $\hat{P}_{PUSCH,b,f,c}(i, j, q_d, l)\hat{P}_{PUSCH,b,f,c}(i, j, q_d, l)$ of the transmit power $P_{PUSCH,b,f,c}(i, j, q_d, l)P_{PUSCH,b,f,c}(i, j, q_d, l)$, with parameters described elsewhere in this specification. If the PUSCH transmission is scheduled by a DCI format 0_1 and when txConfig in PUSCH-Config is set to 'codebook', the wireless device may scale the linear value by the ratio of the number of antenna ports with a non-zero PUSCH transmission power to the maximum number of SRS ports supported by the wireless device in one SRS resource. For example, the wireless device split the power equally across the antenna ports on which the wireless device transmits the PUSCH with non-zero power. For example, two PUSCH transmissions are scheduled in different SRS resource sets (e.g., different antenna groups and/or panels), the wireless device may determine a PUSCH power per each SRS resource set (e.g., antenna group and/or panel) and scale a sum of one or more determined PUSCH powers for the different SRS resource sets (e.g., the different antenna groups and/or panels), for example, if the sum exceed (e.g., larger than and/or equal to) $P_{CMAX,f,c}(i)P_{CMAX,f,c}(i)$.

For example, i a wireless device transmits a PUSCH on active UL BWP b of carrier f of serving cell c using parameter set configuration with index j and PUSCH power control adjustment state with index l, the wireless device may determine the PUSCH transmission power $P_{PUSCH,b,f,c}(i, j, q_d, l)$ in PUSCH transmission occasion i as $$P_{PUSCH,b,f,c}(i, j, q_d, l) = \min\left\{\begin{array}{l} P_{CMAX,f,c}(i), \\ P_{O\_PUSCH,b,f,c}(j) + 10\log_{10}(2^{\mu} \cdot M_{RB,b,f,c}^{PUSCH}(i)) + \\ \alpha_{b,f,c}(j) \cdot PL_{b,f,c}(q_d) + \Delta_{TF,b,f,c}(i) + \\ f_{b,f,c}(i, l) \end{array}\right\} \text{[dBm]}.$$

In an example, $P_{CMAX,f,c}(i)$ may be the configured wireless device transmit power for carrier f of serving cell c in PUSCH transmission occasion i. $P_{O\_PUSCH,b,f,c}(j)$ may be a parameter composed of the sum of a component $P_{O\_NOMINAL\_PUSCH,f,c}(j)$ and a component $P_{O\_UE\_PUSCH,b,f,c}(j)$ where $j \in \{0, 1, \ldots, J-1\}$.

For example, if a wireless device is not provided P0-PUSCH-AlphaSet or for a PUSCH transmission scheduled by a RAR UL grant, a wireless device may determine j=0, $P_{O\_UE\_PUSCH,b,f,c}(0) = 0$, and $P_{O\_NOMINAL\_PUSCH,f,c}(0) = P_{O\_PRE} + \Delta_{PREAMBLE\_Msg3}$, where a higher layer parameter, e.g., preambleReceivedTargetPower (for $P_{O\_PRE}$) and msg3-DeltaPreamble (for $\Delta_{PREAMBLE\_Msg3}$), may be provided by higher layers, or $\Delta_{PREAMBLE\_Msg3} = 0$ dB if msg3-DeltaPreamble is not provided, for carrier f of serving cell c.

In an example, for a PUSCH (re)transmission configured by ConfiguredGrantConfig, j=1, $P_{O\_NOMINAL\_PUSCH,f,c}(1)$ is provided by p0-NominalWithoutGrant, or $P_{O\_NOMINAL\_PUSCH,f,c}(1) = P_{O\_NOMINAL\_PUSCH,f,c}(0)$ if p0-NominalWithoutGrant is not provided, and $P_{O\_UE\_PUSCH,b,f,c}(1)$ is provided by p0 obtained from p0-PUSCH-Alpha in ConfiguredGrantConfig that provides an index P0-PUSCH-AlphaSetId to a set ofs P0-PUSCH-AlphaSet for active UL BWP b of carrier f of serving cell c In an example, for $j \in \{2, \ldots, J-1\} = S_J$, a $P_{O\_NOMINAL\_PUSCH,f,c}(j)$ value, applicable for all $j \in S_J$, may be provided by p0-NominalWithGrant, or $P_{O\_NOMINAL\_PUSCH,f,c}(j) = P_{O\_NOMINAL\_PUSCH,f,c}(0)$ if p0-NominalWithGrant is not provided, for each carrier f of serving cell c and a set of $P_{O\_UE\_PUSCH,b,f,c}(j)$ values are provided by a set of p0 in P0-PUSCH-AlphaSet indicated by a respective set of p0-PUSCH-AlphaSetId for active UL BWP b of carrier f of serving cell c In an example, if the wireless device is provided by SRI-PUSCH-PowerControl more than one values of p0-PUSCH-AlphaSetId and if DCI format 0_1 includes a SRI field, the wireless device may obtain a mapping from sri-PUSCH-PowerControlId in SRI-PUSCH-PowerControl between a set of values for the SRI field in DCI format 0_1 and a set of indexes provided by p0-PUSCH-AlphaSetId that map to a set of P0-PUSCH-AlphaSet values. If the PUSCH transmission is scheduled by a DCI format 0_1 that includes a SRI field, the wireless device determine the value of $P_{O\_UE\_PUSCH,b,f,c}(j)$ from the p0-PUSCH-AlphaSetId value that is mapped to the SRI field value.

If the PUSCH transmission is scheduled by a DCI format 0_0 or by a DCI format 0_1 that does not include a SRI field, or if SRI-PUSCHPowerControl is not provided to the UE, j=2, and the wireless device determines $P_{O\_UE\_PUSCH,b,f,c}(j)$ from the value of the first p0-Pusch-AlphaSet in p0-AlphaSets.

For $\alpha_{b,f,c}(j)$ with $j=0$, $\alpha_{b,f,c}(0)$ may be a value of msg3-Alpha, when provided; otherwise, a wireless device may determine $\alpha_{b,f,c}(0)=1$. For $\alpha_{b,f,c}(j)$ with $j=1$, $\alpha_{b,f,c}(1)$ may be provided by alpha obtained from p0-PUSCH-Alpha in ConfiguredGrantConfig providing an index P0-PUSCH-AlphaSetId to a set of P0-PUSCH-AlphaSet for active UL BWP b of carrier f of serving cell c. For $\alpha_{b,f,c}(j)$ with $j \in S_j$, a set of $\alpha_{b,f,c}(j)$ values may be provided by a set of alpha in P0-PUSCH-AlphaSet indicated by a respective set of p0-PUSCH-AlphaSetId for active UL BWP b of carrier f of serving cell c.

For example, if the wireless device is provided SRI-PUSCH-PowerControl and more than one values of p0-PUSCH-AlphaSetId, and if DCI format 0_1 includes a SRI field, the wireless device may obtain a mapping from sri-PUSCH-PowerControlId in SRI-PUSCH-PowerControl between a set of values for the SRI field in DCI format 0_1 and a set of indexes provided by p0-PUSCH-AlphaSetId that map to a set of P0-PUSCH-AlphaSet values. If the PUSCH transmission is scheduled by a DCI format 0_1 that includes a SRI field, the wireless device may determine the values of $\alpha_{b,f,c}(j)$ from the p0-PUSCH-AlphaSetId value that is mapped to the SRI field value For example, if the PUSCH transmission is scheduled by a DCI format 0_0 or by a DCI format 0_1 that does not include a SRI field, or if SRI-PUSCH-PowerControl is not provided to the UE, j=2, and the wireless device may determine $\alpha_{b,f,c}(j)$ from the value of the first p0-PUSCH-AlphaSet in p0-AlphaSets For example, $M_{RB,b,f,c}^{PUSCH}(i)$ may be the bandwidth of the PUSCH resource assignment expressed in number of resource blocks for PUSCH transmission occasion i on active UL BWP b of carrier f of serving cell c and µ is a SCS configuration.

For example, $PL_{b,f,c}(q_d)$ may be a downlink pathloss estimate in dB calculated by the wireless device using reference signal (RS) index $q_d$ for the active DL BWP of serving cell c.

For example, i the wireless device is not provided PUSCH-PathlossReferenceRS or before the wireless device is provided dedicated higher layer parameters, the wireless device may calculate $PL_{b,f,c}(q_d)$ using a RS resource from the SS/PBCH block that the wireless device may use to obtain MIB For example, if the wireless device is configured with a number of RS resource indexes, up to the value of maxNrofPUSCH-PathlossReferenceRSs, and a respective set of RS configurations for the number of RS resource indexes by PUSCH-PathlossReferenceRS, the set of RS resource indexes may comprise one or both of a set of SS/PBCH block indexes, each provided by ssb-Index when a value of a corresponding pusch-PathlossReferenceRS-Id maps to a SS/PBCH block index, and a set of CSI-RS resource indexes, each provided by csi-RS-Index when a value of a corresponding pusch-PathlossReferenceRS-Id maps to a CSI-RS resource index. The wireless device may identify an RS resource index $q_d$ in the set of RS resource indexes to correspond either to a SS/PBCH block index or to a CSI-RS resource index as provided by pusch-PathlossReferenceRS-Id in PUSCH-PathlossReferenceRS For example, if the PUSCH transmission is scheduled by a RAR UL grant, the wireless device may use the same RS resource index $q_d$ as for a corresponding PRACH transmission For example, if the wireless device is provided SRI-PUSCH-PowerControl and more than one values of PUSCH-PathlossReferenceRS-Id, the wireless device may obtain a mapping from sri-PUSCH-PowerControlId in SRI-PUSCH-PowerControl between a set of values for the SRI field in DCI format 0_1 and a set of PUSCH-PathlossReferenceRS-Id values. If the PUSCH transmission is scheduled by a DCI format 0_1 that includes a SRI field, the wireless device may determine the RS resource index $q_d$ from the value of PUSCH-PathlossReferenceRS-Id that is mapped to the SRI field value where the RS resource is either on serving cell c or, if provided, on a serving cell indicated by a value of pathlossReferenceLinking For example, If the PUSCH transmission is scheduled by a DCI format 0_0, and if the wireless device is provided a spatial setting by PUCCH-Spatialrelationinfo for a PUCCH resource with a lowest index for active UL BWP b of each carrier f and serving cell, the wireless device uses the same RS resource index $q_d$ as for a PUCCH transmission in the PUCCH resource with the lowest index For example, if the PUSCH transmission is scheduled by a DCI format 0_0 and if the wireless device is not provided a spatial setting for a PUCCH transmission, or by a DCI format 0_1 that does not include a SRI field, or if SRI-PUSCH-PowerControl is not provided to the wireless device, the wireless device determines a RS resource index $q_d$ with a respective PUSCH-PathlossReferenceRS-Id value being equal to zero where the RS resource is either on serving cell c or, if provided, on a serving cell indicated by a value of pathlossReferenceLinking For a PUSCH transmission configured by ConfiguredGrantConfig, if rrc-ConfiguredUplinkGrant is included in ConfiguredGrantConfig, a RS resource index $q_d$ may be provided by a value of pathlossReferenceIndex included in rrc-ConfiguredUplinkGrant where the RS resource may be either on serving cell c or, if provided, on a serving cell indicated by a value of pathlossReferenceLinking For a PUSCH transmission configured by ConfiguredGrantConfig that does not include rrc-ConfiguredUplinkGrant, the wireless device may determine an RS resource index $q_d$ from a value of PUSCH-PathlossReferenceRS-Id that is mapped to a SRI field value in a DCI format activating the PUSCH transmission. For example, if the DCI format activating the PUSCH transmission does not include a SRI field, the wireless device may determine an RS resource index $q_d$ with a respective PUSCH-PathlossReferenceRS-Id value being equal to zero where the RS resource is either on serving cell c or, if provided, on a serving cell indicated by a value of pathlossReferenceLinking The wireless device may determine $PL_{f,c}(q_d)=$referenceSignalPower−higher layer filtered RSRP, where referenceSignalPower may be provided by higher layers and a calculation of RSRP may be predefined for the reference serving cell and the higher layer filter configuration provided by QuantityConfig is for the reference serving cell For example, if the wireless device is not configured periodic CSI-RS reception, referenceSignalPower is provided by ss-PBCH-BlockPower. For example, if the wireless device is configured periodic CSI-RS reception, referenceSignalPower is provided either by ss-PBCH-BlockPower or by powerControlOffsetSS providing an offset of the CSI-RS transmission power relative to the SS/PBCH block transmission power. For example, if powerControlOffsetSS is not provided to the wireless device, the wireless device may determine an offset of 0 dB.

The wireless device may determine $\Delta_{TF,b,f,c}(i)=10 \log_{10}((2^{BPRE \cdot K_S}-1) \cdot \beta_{offset}^{PUSCH})$ for $K_S=1.25$ and $\Delta_{TF,b,f,c}(i)=0$ for $K_S=0$ where $K_S$ may be provided by deltaMCS for each UL BWP b of each carrier f and serving cell c. If the PUSCH transmission is over more than one layer, $\Delta_{TF,b,f,c}(i)=0$.

BPRE and $\beta_{offset}^{PUSCH}$, for active UL BWP b of each carrier f and each serving cell c, may be computed as below the wireless device may determine BPRE=$\Sigma_{r=0}^{C-1} K_r/N_{RE}$ for PUSCH with UL-SCH data and BPRE=$Q_m \cdot R/\beta_{offset}^{PUSCH}$ for CSI transmission in a PUSCH without UL-SCH data, where C may be a number of transmitted code blocks, $K_r$ is a size for code block r, and $N_{RE}$ may be a number of resource elements determined as $N_{RE}= M_{RB,b,f,c}^{PUSCH}(i) \cdot \Sigma_{j=0}^{N_{symb,b,f,c}^{PUSCH}(i)-1} N_{sc,data}^{RB}(i,j)$, where $N_{symb,b,f,c}^{PUSCH}(i)$ may be a number of symbols for PUSCH transmission occasion i on active UL BWP b of carrier f of serving cell c, $N_{sc,data}^{RB}(i,j)$ may be a number of subcarriers excluding DM-RS subcarriers and phase-tracking RS samples in PUSCH symbol j, $0 \leq j < N_{symb,b,f,c}^{PUSCH}(i)$, and C, $K_r$ may be predefined and/or indicated by a DCI and/or RRC.

The wireless device may determine $\beta_{offset}^{PUSCH}=1$, for example, when the PUSCH includes UL-SCH data and $\beta_{offset}^{PUSCH}=\beta_{offset}^{CSI,1}$, for example, when the PUSCH includes CSI and does not include UL-SCH data.

$Q_m$ may be the modulation order and R is the target code rate, provided by the DCI format scheduling the PUSCH transmission that includes CSI and does not include UL-SCH data.

For the PUSCH power control adjustment state $f_{b,f,c}(i,l)$ for active UL BWP b of carrier f of serving cell c in PUSCH transmission occasion i $\delta_{PUSCH,b,f,c}(i,l)$ may be a transmit power control (TPC) command value included in a DCI format 0_0 or DCI format 0_1 that schedules the PUSCH transmission occasion i on active UL BWP b of carrier f of serving cell c or jointly coded with other TPC commands in a DCI format 2_2 with CRC scrambled by a particular RNTI (e.g., TPC-PUSCH-RNTI). The wireless device may determine $l \in \{0, 1\}$ if the wireless device is configured with twoPUSCH-PC-AdjustmentStates and l=0 if the wireless device is not configured with twoPUSCH-PC-AdjustmentStates or if the PUSCH transmission is scheduled by a RAR UL grant.

For a PUSCH (re)transmission configured by ConfiguredGrantConfig, the value of $l \in \{0, 1\}$ may be provided to the wireless device by powerControlLoopToUse. For example, if the wireless device is provided SRI-PUSCH-PowerControl, the wireless device may obtain a mapping between a set of values for the SRI field in DCI format 0_1 and the l value(s) provided by sri-PUSCH-ClosedLoopIndex. For example, if the PUSCH transmission is scheduled by a DCI format 0_1 and if DCI format 0_1 includes a SRI field, the wireless device may determine the l value that is mapped to the SRI field value For example, if the PUSCH transmission is scheduled by a DCI format 0_0 or by a DCI format 0_1 that does not include a SRI field, or if a SRI-PUSCH-PowerControl is not provided to the UE, l=0 For example, if the wireless device obtains one TPC command from a DCI format 2_2 with CRC scrambled by a TPC-PUSCH-RNTI, the l value may be provided by the closed loop indicator field in DCI format 2_2.

The wireless device may determine that $f_{b,f,c}(i,l)=f_{b,f,c}(i-i_0, 1)+\Sigma_{m=0}^{C(D_i)-1}\delta_{PUSCH,b,f,c}(m,l)$ is the PUSCH power control adjustment state l for active UL BWP b of carrier f of serving cell c and PUSCH transmission occasion i if the wireless device is not provided tpc-Accumulation, where the $\delta_{PUSCH,b,f,c}$ values are given in a predefined table.

For example, $\Sigma_{m=0}^{C(D_i)-1}\delta_{PUSCH,b,f,c}(m,l)$ may be a sum of TPC command values in a set $D_i$ of TPC command values with cardinality $C(D_i)$ that the wireless device receives between $K_{PUSCH}(i-i_0)-1$ symbols before PUSCH transmission occasion $i-i_0$ and $K_{PUSCH}(i)$ symbols before PUSCH transmission occasion i on active UL BWP b of carrier f of serving cell c for PUSCH power control adjustment state l, where $i_0>0$ may be the smallest integer for which $K_{PUSCH}(i-i_0)$ symbols before PUSCH transmission occasion $i-i_0$ is earlier than $K_{PUSCH}(i)$ symbols before PUSCH transmission occasion i.

For example, if a PUSCH transmission is scheduled by a DCI format 0_0 or DCI format 0_1, $K_{PUSCH}(i)$ may be a number of symbols for active UL BWP b of carrier f of serving cell c after a last symbol of a corresponding PDCCH reception and before a first symbol of the PUSCH transmission.

For example, if a PUSCH transmission is configured by ConfiguredGrantConfig, $K_{PUSCH}(i)$ may be a number of $K_{PUSCH,min}$ symbols equal to the product of a number of symbols per slot, $N_{symb}^{slot}$, and the minimum of the values provided by k2 in PUSCH-ConfigCommon for active UL BWP b of carrier f of serving cell c.

For example, if the wireless device has reached maximum power for active UL BWPb of carrier f of serving cell c at PUSCH transmission occasion $i-i_0$ and $\Sigma_{m=0}^{C(D_i)-1}\delta_{PUSCH,b,f,c}(m,l) \geq 0$, then the wireless device may determine $f_{b,f,c}(i,l)=f_{b,f,c}(i-i_0, 1)$.

For example, if the wireless device has reached minimum power for active UL BWPb of carrier f of serving cell c at PUSCH transmission occasion $i-i_0$ and $\Sigma_{m=0}^{C(D_i)-1}\delta_{PUSCH,b,f,c}(m,l) \leq 0$, then the wireless device may determine $f_{b,f,c}(i,l)=f_{b,f,c}(i-i_0, 1)$.

For example, a wireless device may reset accumulation of a PUSCH power control adjustment state l for active UL BWP b of carrier f of serving cell c to $f_{b,f,c}(0, l)=0$, for example, if a configuration for a corresponding $P_{O\_UE\_PUSCH,b,f,c}(i)$ value is provided by higher layers. For example, a wireless device may reset accumulation of a PUSCH power control adjustment state l for active UL BWP b of carrier f of serving cell c to $f_{b,f,c}(0, l)=0$, for example, if a configuration for a corresponding $\alpha_{b,f,c}(j)$ value is provided by higher layers For example, if j>1 and the PUSCH transmission is scheduled by a DCI format 0_1 that includes a SRI field, and the wireless device is provided higher SRI-PUSCH-Power-Control, the wireless device may determine the value of l from the value of j based on an indication by the SRI field for a sri-PUSCH-PowerControlId value associated with the sri-P0-PUSCH-AlphaSetId value corresponding to j and with the sri-PUSCH-ClosedLoopIndex value corresponding to l.

For example, if j>1 and the PUSCH transmission is scheduled by a DCI format 0_0 or by a DCI format 0_1 that does not include a SRI field or the wireless device is not provided SRI-PUSCH-PowerControl, the wireless device may determine l=0.

For example, if j=1, l is provided by the value of powerControlLoopToUse, the wireless device may determine that $f_{b,f,c}(i,l)=\delta_{PUSCH,b,f,c}(i,l)$ is the PUSCH power control adjustment state for active UL BWP b of carrier f of serving cell c and PUSCH transmission occasion i if the wireless device is provided tpc-Accumulation, where $\delta_{PUSCH,b,f,c}$ absolute values may be predefined.

For example, if the wireless device receives a random access response message in response to a PRACH transmission on active UL BWP b of carrier f of serving cell c, the wireless device may determine $f_{b,f,c}(0, 1)=\Delta P_{rampup,b,f,c}+\delta_{msg2,b,f,c}$, where the wireless device may determine that l=0 and $\delta_{msg2,b,f,c}$ is a TPC command value indicated in the random access response grant of the random access response message corresponding to the PRACH transmission on active UL BWP b of carrier f in the serving cell c, and $$\Delta P_{rampup,b,f,c} = \min\left[\left\{\max\left(0, P_{CMAX,f,c} - \left(\begin{array}{c} 10\log_{10}(2^\mu \cdot M_{RB,b,f,c}^{PUSCH}(0)) + \\ P_{O\_PUSCH,b,f,c}(0) + \alpha_{b,f,c}(0) \cdot PL_c + \\ \Delta_{TF,b,f,c}(0) + \delta_{msg2,b,f,c} \end{array}\right)\right)\right\}, \Delta P_{rampuprequested,b,f,c}\right]$$

and $\Delta P_{rampuprequested,b,f,c}$ is provided by higher layers and corresponds to the total power ramp-up requested by higher layers from the first to the last random access preamble for carrier f in the serving cell c, $M_{RB,b,f,c}^{PUSCH}(0)$ is the bandwidth of the PUSCH resource assignment expressed in number of resource blocks for the first PUSCH transmission on active UL BWP b of carrier f of serving cell c, and $\Delta_{TF,b,f,c}(0)$ is the power adjustment of first PUSCH transmission on active UL BWP b of carrier f of serving cell c.

For example, if a wireless device transmits a PUCCH on active UL BWP b of carrier f in the primary cell c using PUCCH power control adjustment state with index l, the wireless device determines the PUCCH transmission power $P_{PUCCH,b,f,c}(i, q_u, q_d, l)$ in PUCCH transmission occasion i as $$P_{PUCCH,b,f,c}(i, q_u, q_d, l) = \min\left\{\begin{array}{c} P_{CMAX,f,c}(i), \\ P_{O\_PUCCH,b,f,c}(q_u) + 10\log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + g_b \end{array}\right\} \text{ [dBm]}.$$

For example, $P_{CMAX,f,c}(i)$ may be the configured wireless device transmit power defined in for carrier f of serving cell c in PUCCH transmission occasion i. For example, $P_{O\_PUCCH,b,f,c}(q_u)$ may be a parameter composed of the sum of a component $P_{O\_NOMINAL\_PUCCH}$, provided by p0-nominal, or $P_{O\_NOMINAL\_PUCCH}=0$ dBm, for example, if p0-nominal is not provided, for carrier f of primary cell c and, if provided, a component $P_{O\_UE\_PUCCH}(q_u)$ provided by p0-PUCCH-Value in P0-PUCCH for active UL BWP b of carrier f of primary cell c, where $0 \leq q_u < Q_u$. $Q_u$ may be a size for a set of $P_{O\_UE\_PUCCH}$ values provided by maxNrof-PUCCH-P0-PerSet. The set of $P_{O\_UE\_PUCCH}$ values may be provided by p0-Set. If p0-Set is not provided to the wireless device, the wireless device may determine $P_{O\_UE\_PUCCH}(q_u)=0$, $0 \leq q_u < Q_u$ For example, if the wireless device is provided PUCCH-SpatialRelationInfo, the wireless device may obtain a mapping, by an index provided by p0-PUCCH-Id, between a set of pucch-SpatialRelationInfold values and a set of p0-PUCCH-Value values. If the wireless device is provided more than one values for pucch-SpatialRelationInfold and the wireless device receives an activation command indicating a value of pucch-SpatialRelationInfold, the wireless device may determine the p0-PUCCH-Value value through the link to a corresponding p0-PUCCH-Id index. The wireless device may apply the activation command with a time offset (e.g., 3 msec) after a slot where the wireless device transmits HARQ-ACK information for the PDSCH providing the activation command. For example, if the wireless device is not provided PUCCH-SpatialRelationInfo, the wireless device may obtain the p0-PUCCH-Value value from the P0-PUCCH with p0-PUCCH-Id value equal to 0 in p0-Set.

For example, $M_{RB,b,f,c}^{PUCCH}(i)$ may be a bandwidth of the PUCCH resource assignment expressed in number of resource blocks for PUCCH transmission occasion i on active UL BWP b of carrier f of serving cell c and $\mu$ is a SCS configuration.

For example, $PL_{b,f,c}(q_d)$ may be a downlink pathloss estimate in dB calculated by the wireless device using RS resource index $q_d$ as described elsewhere in this specification for the active DL BWP of carrier f of the primary cell c.

For example, if the wireless device is not provided pathlossReferenceRSs or before the wireless device is provided dedicated higher layer parameters, the wireless device may determine $PL_{b,f,c}(q_d)$ using a RS resource obtained from the SS/PBCH block that the wireless device uses to obtain MIB.

For example, if the wireless device is provided a number of RS resource indexes, the wireless device may determine $PL_{b,f,c}(q_d)$ using RS resource with index $q_d$, where $0 \leq q_d < Q_d$. $Q_d$ may be a size for a set of RS resources provided by maxNrofPUCCH-PathlossReferenceRSs. The set of RS resources may be provided by pathlossReferenceRSs. The set of RS resources may comprise one or both of a set of SS/PBCH block indexes, each provided by ssb-Index in PUCCH-PathlossReferenceRS when a value of a corresponding pucch-PathlossReferenceRS-Id maps to a SS/PBCH block index, and a set of CSI-RS resource indexes, each provided by csi-RS-Index when a value of a corresponding pucch-PathlossReferenceRS-Id maps to a CSI-RS resource index. The wireless device may identify an RS resource in the set of RS resources to correspond either to a SS/PBCH block index or to a CSI-RS resource index as provided by pucch-PathlossReferenceRS-Id in PUCCH-PathlossReferenceRS.

For example, if the wireless device is provided PUCCH-SpatialRelationInfo, the wireless device may obtain a mapping, by indexes provided by corresponding values of pucch-PathlossReferenceRS-Id, between a set of pucch-SpatialRelationInfold values and a set of reference signal values provided by PUCCH-PathlossReferenceRS. If the wireless device is provided more than one values for pucch-SpatialRelationInfold and the wireless device receives an activation command indicating a value of pucch-SpatialRelationInfold, the wireless device may determine the reference signal value in PUCCH-PathlossReferenceRS through the link to a corresponding pucch-PathlossReferenceRS-Id index. The wireless device may apply the activation command with a time offset (e.g., 3 msec) after a slot where the wireless device transmits HARQ-ACK information for the PDSCH providing the activation command.

For example, if PUCCH-SpatialRelationInfo comprises servingCellId indicating a serving cell, the wireless device may receive the RS for resource index $q_d$ on the active DL BWP of the serving cell. For example, if the wireless device is not provided PUCCH-SpatialRelationInfo, the wireless device may obtain the reference signal value in PUCCH-PathlossReferenceRS from the pucch-PathlossReferenceRS-Id with index 0 in PUCCH-PathlossReferenceRS where the RS resource is either on a same serving cell or, if provided, on a serving cell indicated by a value of pathlossReferenceLinking.

For example, the parameter $\Delta_{F\_PUCCH}(F)$ may be provided by deltaF-PUCCH-f0 for PUCCH format 0, deltaF- PUCCH-f1 for PUCCH format 1, deltaF-PUCCH-f2 for PUCCH format 2, deltaF-PUCCH-f3 for PUCCH format 3, and deltaF-PUCCH-f4 for PUCCH format 4.

For example, $\Delta_{TF,b,f,c}(i)$ may be a PUCCH transmission power adjustment component on active UL BWP b of carrier f of primary cell c. For a PUCCH transmission using PUCCH format 0 or PUCCH format 1, the wireless device may determine $$\Delta_{TF,b,f,c}(i) = 10\log_{10}\left(\frac{N_{ref}^{PUCCH}}{N_{symb}^{PUCCH}(i)}\right) + \Delta_{UCI}(i).$$

For example, $N_{symb}^{PUCCH}(i)$ may be number of PUCCH format 0 symbols or PUCCH format 1 symbols included in a PUCCH resource of a PUCCH resource set indicated by a value of a PUCCH resource indicator field in DCI format 1_0 or DCI format 1_1, or provided by nrofSymbols in PUCCH-format0 or in PUCCH-format1 respectively. For example, the wireless device may determine $N_{ref}^{PUCCH}=2$ for PUCCH format 0. For example, the wireless device may determine $N_{ref}^{PUCCH}=N_{symb}^{slot}$ for PUCCH format 1. For example, the wireless device may determine $\Delta_{UCI}(i)=0$ for PUCCH format 0. For example, the wireless device may determine $\Delta_{UCI}(i)=10\log_{10}(O_{UCI}(i))$ for PUCCH format 1, where $O_{UCI}(i)$ may be a number of UCI bits in PUCCH transmission occasion i.

For a PUCCH transmission using PUCCH format 2 or PUCCH format 3 or PUCCH format 4 and for a number of UCI bits smaller than or equal to 11, the wireless device may determine $\Delta_{TF,b,f,c}(i)=10\log_{10}(K_1\cdot(n_{HARQ-ACK}(i)+O_{SR}(i)+O_{CSI}(i))/N_{RE}(i))$. For example, $K_1=6$. For example, $n_{HARQ-ACK}(i)$ may be a number of HARQ-ACK information bits that the wireless device determines for Type-1 HARQ-ACK codebook and for Type-2 HARQ-ACK codebook. If the wireless device is not provided with pdsch-HARQ-ACK-Codebook, the wireless device may determine $n_{HARQ-ACK}(i)=1$ if the wireless device includes a HARQ-ACK information bit in the PUCCH transmission; otherwise, the wireless device may determine $n_{HARQ-ACK}(i)=0$.

For example, $O_{SR}(i)$ may be a number of SR information bits that the wireless device determines. For example, $O_{CSI}(i)$ may be a number of CSI information bits that the wireless device determines.

For example, $N_{RE}(i)$ may be a number of resource elements determined as $N_{RE}(i)=M_{RB,b,f,c}^{PUCCH}(i)\cdot N_{sc,ctrl}^{RB}(i)\cdot N_{symb-UCI,b,f,c}^{PUCCH}(i)$, where $N_{sc,ctrl}^{RB}(i)$ may be a number of subcarriers per resource block excluding subcarriers used for DM-RS transmission, and $N_{symb-UCI,b,f,c}^{PUCCH}(i)$ is a number of symbols excluding symbols used for DM-RS transmission for PUCCH transmission occasion i on active UL BWP b of carrier f of serving cell c For a PUCCH transmission using PUCCH format 2 or PUCCH format 3 or PUCCH format 4 and for a number of UCI bits larger than 11, the wireless device may determine $\Delta_{TF,b,f,c}(i)=10\log_{10}(2^{K_2\cdot BPRE(i)}-1)$.

For example, $K_2=2.4$. For example, the wireless device may determine $BPRE(i)=(O_{ACK}(i)+O_{SR}(i)+O_{CSI}(i)+O_{CRC}(i))/N_{RE}(i)$.

For example, $O_{ACK}(i)$ may be a number of HARQ-ACK information bits that the wireless device determines for Type-1 HARQ-ACK codebook and for Type-2 HARQ-ACK codebook. If the wireless device is not provided pdsch-HARQ-ACK-Codebook, the wireless device may determine $O_{ACK}=1$ if the wireless device includes a HARQ-ACK information bit in the PUCCH transmission; otherwise, $O_{ACK}=0$.

For example, $O_{SR}(i)$ may be a number of SR information bits that the wireless device determines. For example, $O_{CSI}(i)$ may be a number of CSI information bits that the wireless device determines. For example, $O_{CRC}(i)$ may be a number of CRC bits.

For example, $N_{RE}(i)$ may be a number of resource elements that the wireless device may determine as $N_{RE}(i)=M_{RB,b,f,c}^{PUCCH}(i)\cdot N_{sc,ctrl}^{RB}(i)\cdot N_{symb-UCI,b,f,c}^{PUCCH}(i)$, where $N_{sc,ctrl}^{RB}(i)$ may be a number of subcarriers per resource block excluding subcarriers used for DM-RS transmission, and $N_{symb-UCI,b,f,c}^{PUCCH}(i)$ may be a number of symbols excluding symbols used for DM-RS transmission for PUCCH transmission occasion i on active UL BWP b of carrier f of serving cell c.

For the PUCCH power control adjustment state $g_{b,f,c}(i,l)$ for active UL BWP b of carrier f of primary cell c and PUCCH transmission occasion i, the wireless device may determine at least one of following.

For example, $\delta_{PUCCH,b,f,c}(i,l)$ may be a TPC command value and is included in a DCI format 1_0 or DCI format 1_1 for active UL BWP b of carrier f of the primary cell c that the wireless device may detect for PUCCH transmission occasion i or is jointly coded with other TPC commands in a DCI format 2_2 with CRC scrambled by a particular RNTI (e.g., TPC-PUCCH-RNTI).

For example, $l \in \{0, 1\}$ if the wireless device is provided twoPUCCH-PC-AdjustmentStates and PUCCH-SpatialRelationInfo and l=0 if the wireless device is not provided twoPUCCH-PC-AdjustmentStates or PUCCH-SpatialRelationInfo.

For example, if the wireless device obtains a TPC command value from a DCI format 1_0 or a DCI format 1_1 and if the wireless device is provided PUCCH-SpatialRelationInfo, the wireless device may obtain a mapping, by an index provided by p0-PUCCH-Id, between a set of pucch-SpatialRelationInfoId values and a set of values for closedLoopIndex that provide the l value(s). If the wireless device receives an activation command indicating a value of pucch-SpatialRelationInfoId, the wireless device may determine the value closedLoopIndex that provides the value of l through the link to a corresponding p0-PUCCH-Id index.

For example, if the wireless device obtains one TPC command from a DCI format 2_2 with CRC scrambled by a particular RNTI (e.g., TPC-PUCCH-RNTI), the l value is provided by the closed loop indicator field in DCI format 2_2, the wireless device may determine that $g_{b,f,c}(i,l)=g_{b,f,c}(i|i_0, l)+\Sigma_{m=0}^{C(C_i)-1}\delta_{PUCCH,b,f,c}(m,l)$ is the current PUCCH power control adjustment state l for active UL BWP b of carrier f of serving cell c and PUCCH transmission occasion i, where the $\delta_{PUCCH,b,f,c}$ values may be predefined.

For example, $\Sigma_{m=0}^{C(C_i)-1}\delta_{PUCCH,b,f,c}(m,l)$ may be a sum of TPC command values in a set $C_i$ of TPC command values with cardinality $C(C_i)$ that the wireless device receives between $K_{PUCCH}(i-i_0)-1$ symbols before PUCCH transmission occasion $i-i_0$ and $K_{PUCCH}(i)$ symbols before PUCCH transmission occasion i on active UL BWP b of carrier f of serving cell c for PUCCH power control adjustment state, where $i_0>0$ may be the smallest integer for which $K_{PUCCH}(i-i_0)$ symbols before PUCCH transmission occasion $i-i_0$ is earlier than $K_{PUCCH}(i)$ symbols before PUCCH transmission occasion i.

For example, if the PUCCH transmission is in response to a detection by the wireless device of a DCI format 1_0 or DCI format 1_1, $K_{PUCCH}(i)$ may be a number of symbols for active UL BWP b of carrier f of serving cell c after a last symbol of a corresponding PDCCH reception and before a first symbol of the PUCCH transmission.

For example, if the PUCCH transmission is not in response to a detection by the wireless device of a DCI format 1_0 or DCI format 1_1, $K_{PUCCH}(i)$ may be a number of $K_{PUCCH,min}$ symbols equal to the product of a number of symbols per slot, $N_{symb}^{slot}$, and the minimum of the values provided by k2 in PUSCH-ConfigCommon for active UL BWP b of carrier f of serving cell c.

For example, if the wireless device has reached maximum power for active UL BWP b of carrier f of primary cell c at PUCCH transmission occasion $i-i_0$ and $\Sigma_{m=0}^{C(C_i)-1} \delta_{PUCCH,b,f,c}(m,l) \leq 0$, then the wireless device may determine $g_{b,f,c}(i,l) = g_{b,f,c}(i-i_0, l)$.

For example, if wireless device has reached minimum power for active UL BWP b of carrier f of primary cell c at PUCCH transmission occasion $i-i_0$ and $\Sigma_{m=0}^{C(C_i)-1} \delta_{PUCCH,b,f,c}(m,l) \leq 0$, then the wireless device may determine $g_{b,f,c}(i,l) = g_{b,f,c}(i-i_0, l)$.

For example, if a configuration of a $P_{O\_PUCCH,b,f,c}(q_u)$ value for a corresponding PUCCH power control adjustment state l for active UL BWP b of carrier f of serving cell c is provided by higher layers, the wireless device may determine $g_{b,f,c}(0,l) = 0$. For example, if the wireless device is provided PUCCH-SpatialRelationInfo, the wireless device may determine the value of l from the value of $q_u$ based on a pucch-SpatialRelationInfoId value associated with the p0-PUCCH-Id value corresponding to $q_u$ and with the closedLoopIndex value corresponding to l; otherwise, l=0

For example, if a configuration of a $P_{O\_PUCCH,b,f,c}(q_u)$ value for a corresponding PUCCH power control adjustment state l for active UL BWP b of carrier f of serving cell c is not provided by higher layers, the wireless device may determine that $g_{b,f,c}(0,l) = \Delta P_{rampup,b,f,c} + \delta_{b,f,c}$. For example, l=0, and $\delta_{b,f,c}$ may be the TPC command value indicated in a random access response grant corresponding to a PRACH transmission or is the TPC command value in a DCI format with CRC scrambled by a particular RNTI (e.g., C-RNTI or MCS-C-RNTI) that the wireless device detects in a first PDCCH reception in a search space set provided by recoverySearchSpaceId if the PUCCH transmission is a first PUCCH transmission after a number of symbols (e.g., 28 symbols) from a last symbol of the first PDCCH reception, and, if the wireless device transmits PUCCH on active UL BWP b of carrier f of serving cell c, the wireless device may determine $$\Delta P_{rampup,b,f,c} = \min\left[\max\left(\begin{array}{c}0,\\P_{CMAX,f,c} - \left(\begin{array}{c}P_{O\_PUCCH,b,f,c} + PL_{b,f,c}(q_d) +\\ \Delta_{F\_PUCCH}(F) + \Delta_{TF,b,f,c} + \delta_{b,f,c}\end{array}\right)\end{array}\right)\right];$$
$$\Delta P_{rampuprequested,b,f,c}$$

otherwise, The wireless device may $$\Delta P_{rampup,b,f,c} = \min\left[\max\left(\begin{array}{c}0,\\P_{CMAX,f,c} - (P_{O\_PUCCH,b,f,c} + PL_{b,f,c}(q_d))\end{array}\right)\right]$$
$$\Delta P_{rampuprequested,b,f,c}$$

where $\Delta P_{rampuprequested,b,f,c}$ may be provided by higher layers and corresponds to the total power ramp-up requested by higher layers from the first to the last preamble for active UL BWP b of carrier f of primary cell c, and $\Delta_{F\_PUCCH}(F)$ corresponds to PUCCH format 0 or PUCCH format 1.

If a wireless device transmits SRS on active UL BWP b of carrier f of serving cell c using SRS power control adjustment state with index l, the wireless device may determine the SRS transmission power $P_{SRS,b,f,c}(i, q_s, l)$ in SRS transmission occasion i as $$P_{SRS,b,f,c}(i, q_s, l) = $$
$$\min\left\{\begin{array}{c}P_{CMAX,f,c}(i),\\P_{O\_SRS,b,f,c}(q_s) + 10\log_{10}(2^\mu \cdot M_{SRS,b,f,c}(i)) +\\ \alpha_{SRS,b,f,c}(q_s) \cdot PL_{b,f,c}(q_d) + h_{b,f,c}(i, l)\end{array}\right\}[dBm].$$

For example, $P_{CMAX,f,c}(i)$ may be the configured wireless device transmit power for carrier f of serving cell c in SRS transmission occasion i. For example, $P_{O\_SRS,b,f,c}(q_s)$ may be provided by p0 for active UL BWP b of carrier f of serving cell c and SRS resource set $q_s$ provided by SRS-ResourceSet and SRS-ResourceSetId; if p0 is not provided, $P_{O\_SRS,b,f,c}(q_s) = P_{O\_NOMINAL\_PUSCH,f,c}(0)$. For example, $M_{SRS,b,f,c}(i)$ may be an SRS bandwidth expressed in number of resource blocks for SRS transmission occasion i on active UL BWP b of carrier f of serving cell c and μ is a SCS configuration. For example, $\alpha_{SRS,b,f,c}(q_s)$ may be provided by alpha for active UL BWP b of carrier f of serving cell c and SRS resource set $q_s$.

For example, $PL_{b,f,c}(q_d)$ may be a downlink pathloss estimate in dB calculated by the wireless device using RS resource index $q_d$ as described elsewhere in this specification for the active DL BWP of serving cell c and SRS resource set $q_s$. The RS resource index $q_d$ may be provided by pathlossReferenceRS associated with the SRS resource set $q_s$ and may be either a ssb-Index providing a SS/PBCH block index or a csi-RS-Index providing a CSI-RS resource index.

For example, if the wireless device is not provided pathlossReferenceRS or before the wireless device is provided dedicated higher layer parameters, the wireless device may determine $PL_{b,f,c}(q_d)$ using a RS resource obtained from the SS/PBCH block that the wireless device uses to obtain MIB. For example, if the wireless device is provided pathlossReferenceLinking, the RS resource may be on a serving cell indicated by a value of pathlossReferenceLinking.

For example, the wireless device may determine $h_{b,f,c}(i, l) = f_{b,f,c}(i,l)$, where $f_{b,f,c}(i,l)$ may be the current PUSCH power control adjustment state, for example if srs-PowerControlAdjustmentStates indicates a same power control adjustment state for SRS transmissions and PUSCH transmissions.

For example, the wireless device may determine $h_{b,f,c}(i) = h_{b,f,c}(i-1) + \Sigma_{m=0}^{C(S_i)-1} \delta_{SRS,b,f,c}(m)$, for example, if the wireless device is not configured for PUSCH transmissions on active UL BWP b of carrier f of serving cell c, or if srs-PowerControlAdjustmentStates indicates separate power control adjustment states between SRS transmissions and PUSCH transmissions, and if tpc-Accumulation is not provided, where the $\delta_{SRS,b,f,c}$ values may be predefined.

For example, $\delta_{SRS,b,f,c}(m)$ may be jointly coded with other TPC commands in a PDCCH with DCI format 2_3. For example, $\Sigma_{m=0}^{C(S_i)-1} \delta_{SRS,b,f,c}(m)$ may be a sum of TPC command values in a set $S_i$ of TPC command values with cardinality $C(S_i)$ that the wireless device receives between $K_{SRS}(i-i_0)-1$ symbols before SRS transmission occasion $i-i_0$ and $K_{SRS}(i)$ symbols before SRS transmission occasion i on active UL BWP b of carrier f of serving cell c for SRS power control adjustment state, where $i_0>0$ may be the smallest integer for which $K_{SRS}(i-i_0)$ symbols before SRS transmission occasion $i-i_0$ is earlier than $K_{SRS}(i)$ symbols before SRS transmission occasion i.

For example, if the SRS transmission is aperiodic, $K_{SRS}(i)$ may be a number of symbols for active UL BWP b of carrier f of serving cell c after a last symbol of a corresponding PDCCH triggering the SRS transmission and before a first symbol of the SRS transmission For example, if the SRS transmission is semi-persistent or periodic, $K_{SRS}(i)$ may be a number of $K_{SRS,min}$ symbols equal to the product of a number of symbols per slot, $N_{symb}^{slot}$, and the minimum of the values provided by k2 in PUSCH-ConfigCommon for active UL BWP b of carrier f of serving cell c.

For example, if the wireless device has reached maximum power for active UL BWP b of carrier f of serving cell c at SRS transmission occasion $i-i_0$ and $\Sigma_{m=0}^{C(C_i)-1}\delta_{SRS,b,f,c}(m,l) \geq 0$, then the wireless device may determine $h_{b,f,c}(i)=h_{b,f,c}(i-i_0)$. For example, if the wireless device has reached minimum power for active UL BWP b of carrier f of serving cell c at SRS transmission occasion $i-i_0$ and $\Sigma_{m=0}^{C(C_i)-1}\delta_{SRS,b,f,c}(m) \leq 0$, then the wireless device may determine $h_{b,f,c}(i)=h_{b,f,c}(i-i_0)$.

For example, if a configuration for a $P_{O\_SRS,b,f,c}(q_s)$ value or for a $\alpha_{SRS,b,f,c}(q_s)$ value for a corresponding SRS power control adjustment state l for active UL BWP b of carrier f of serving cell c is provided by higher layer, the wireless device may determine $h_{b,f,c}(0)=0$; else the wireless device may determine $h_{b,f,c}(0)=\Delta P_{rampup,b,f,c}+\delta_{msg2,b,f,c}$.

For example, $\delta_{msg2,b,f,c}$ may be the TPC command value indicated in the random access response grant corresponding to the random access preamble that the wireless device transmitted on active UL BWP b of carrier f of the serving cell c, and $$\Delta P_{rampup,b,f,c} = \min\left[\max\left(\begin{array}{c} 0, \\ P_{CMAX,f,c} - \left(\begin{array}{c} P_{O\_SRS,b,f,c}(q_s)+10\log_{10} \\ (2^\mu \cdot M_{SRS,b,f,c}(i))+ \\ \alpha_{SRS,b,f,c}(q_s) \cdot PL_{b,f,c}(q_d) \end{array}\right) \end{array}\right), \Delta P_{rampuprequested,b,f,c}\right].$$

For example, $\Delta P_{rampuprequested,b,f,c}$ may be provided by higher layers and corresponds to the total power ramp-up requested by higher layers from the first to the last preamble for active UL BWP b of carrier f of serving cell c.

For example, the wireless device may determine $h_{b,f,c}(i)=\delta_{SRS,b,f,c}(i)$ if the wireless device is not configured for PUSCH transmissions on active UL BWP b of carrier f of serving cell c, or if srs-PowerControlAdjustmentStates indicates separate power control adjustment states between SRS transmissions and PUSCH transmissions, and tpc-Accumulation is provided, and the wireless device may detect a DCI format 2_3 $K_{SRS,min}$ symbols before a first symbol of SRS transmission occasion i, where absolute values of $\delta_{SRS,b,f,c}$ may be predefined.

For example, if srs-PowerControlAdjustmentStates indicates a same power control adjustment state for SRS transmissions and PUSCH transmissions, the update of the power control adjustment state for SRS transmission occasion i may occur at the beginning of each SRS resource in the SRS resource set $q_s$; otherwise, the update of the power control adjustment state SRS transmission occasion i may occur at the beginning of the first transmitted SRS resource in the SRS resource set $q_s$.

A wireless device may allocate/determine one or more transmission powers for one or more uplink signals/channels based on a priority rule when the one or more uplink signals/channels overlap partially or fully in the time domain. The wireless device may implement priority rules to scale down (adjust) or drop one or more signals when a calculated transmission power exceeds the wireless device's maximum allowed transmission power. For example, the priority rule may determine a higher priority for a first uplink signal/channel of the one or more uplink signals/channels a lower priority for a second uplink signal/channel of the one or more uplink signals/channels. The wireless device may adjust a transmission power or drop the second uplink signal/channel.

In existing technologies, power priority rules are implemented between PRACH, PUSCH, PUCCH, and SRS to scale down or drop the power of one or more channels when the UE is power limited. For example, the wireless device may prioritize a PRACH over a PUCCH and/or PUSCH. For example, the wireless device may prioritize the PUCCH than a PUSCH. In existing technologies, the wireless device may support a plurality of services via a base station. For example, the wireless device may receive/transmit one or more first channels/signals associated with a first service. The wireless device may receive/transmit one or more second channels/signals associated with a second service. For example, the first service may be an ultra-reliable and low latency communication (URLLC). For example, the second service may be an enhanced mobile broadband (eMBB). Based on the existing technologies, the wireless device may prioritize a first PUSCH comprising URLLC over a PUSCH comprising eMBB. Prioritizing PRACH over PUSCH may result in degraded QoS experience for some PUSCH traffic. In an example the existing technologies, a wireless device may prioritize a PUCCH with a high priority over a PRACH. As the wireless device may transmit the PRACH in cases where a type of recovery is needed (e.g., recover uplink synchronization, recover a beam failure, recover a connection, and/or the like), dropping or reducing a transmission power on the PRACH may lead longer recovery latency. It may lead performance degradation.

Various power priority rules for uplink channels in existing technologies may result in degraded QoS experience for PUSCH, PUCCH and PRACH traffic and procedures, for example, when PRACH is transmitted on multiple cells and uplink channels (PUSCH and/or PUSCH) on one or more cells carry information with different priority levels. Implementation of existing priority rules may result in increased packet loss, transmission delays and increased battery power consumption. Existing technologies may not effectively address a priority rule among a plurality of uplink channels.

In an example, embodiments enhance a priority rule of the plurality of uplink channels to improve QoS experience for PUSCH, PUCCH and PRACH traffic and procedures. Enhanced priority rules take into account that a first uplink channel may be associated with a high priority/a first service and a second uplink channel may be associated with a low priority (e.g. a second service, no priority level). For example, the order may be as follows: a PRACH of a primary cell, an uplink channel comprising first information with a first priority, the uplink channel comprising second information with a second priority, and then PRACH on a secondary cell (SCell). Enhanced priority rules take into account channels including data with various priority levels and PRACH on a primary cell and PRACH on a secondary cell. Both information with high priority and information with low priority have higher power priority than PRACH on a SCell. Both information with high priority and information with low priority have lower power priority than PRACH on a PCell. Example embodiments may provide enhancements considering that PRACH on a PCell and PRACH on an SCell may be transmitted in parallel with high priority information and low priority information. Implementation of enhanced power priority rules may result in reduced packet loss, reduced transmission delays and reduced battery power consumption. For example, implementation of enhance power priority rules may improve uplink recovery for a connection by prioritizing PRACH on a PCell. For example, implementation of enhanced priority rules improves uplink data/control transmission for high/low priority information by assigning a lower priority to PRACH on a SCell compared with uplink data/control transmission for high/low priority information.

In exiting dual-connectivity systems, a first base station of a first cell group (e.g., MCG) and/or a second base station of a second cell group (e.g., SCG) may configure a first transmission power threshold for the first cell group and a second transmission power threshold for the second cell group. The first transmission power threshold and the second transmission power threshold may not exceed a UE allowed power determined based on a UE power class. A wireless device may allocate powers to one or more first uplink channels for the first base station, where a sum of the allocated power for the first cell group may be equal to or smaller than the first power threshold. The wireless device may allocate powers to one or more second uplink channels for the second base station, where a sum of the allocated powers to the second cell group may be equal to or smaller than the second power threshold. The wireless device may drop UL channels or reduce powers on the UL channels of a cell group (CG) until a sum of powers on the UL channels of the CG is smaller than or equal to a transmission power threshold (e.g., a first transmission power threshold for a first CG, a second transmission power threshold for a second CG). Implementations of existing technologies may result in power reduction or packet drop data packets, for example, in certain coverage conditions (e.g., a cell edge). In an example, in some scenarios, a CG transmit power may reach a UE allowed transmit power for the CG, while each cell is transmitting below its maximum/allowed transmit power. For example, when a wireless device reduces a power level of a data packet reducing reliability of a data channel. Implementations of existing power allocations for CGs (e.g., when dual connectivity is configured) may increase packet loss for data packets when the UE is in poor coverage conditions. There is a need to improve existing power allocation processes when the UE is dual-connectivity, for example, when the UE transmits uplink data channels for multiple services.

Example embodiments implement a power allocation process based on one or more QoS requirements of a URLLC service (or other service) and provide efficient power sharing across CGs. Example embodiments provide an enhancement to power control when dual connectivity is implemented, for example, by providing more flexible transmit power thresholds for uplink transmissions via CGs.

In an example, a first base station and/or a second base station may transmit one or more RRC messages indicating a first transmission power threshold and a second transmission power threshold for a CG. The one or more RRC messages may comprise configuration parameters of a plurality of cells that are grouped into a plurality of CGs. The plurality of CGs may comprise a first CG for communication via a first base station. The plurality of CG may comprise a second CG for communication via a second base station. A wireless device may allocate powers of UL channels based on the second transmission power threshold of the CG (e.g., a sum of powers of the UL channels is less than the second power threshold) when one or more conditions are met. In determining whether the one or more conditions are met, the wireless device may select a first UL channel from the UL channels scheduled to be transmitted in a OFDM symbol i of a slot n of the CG, wherein the first UL channel has a highest order (e.g., the first UL has a highest priority in the UL channels based on an ordering rule). For example, an ordering rule may be based on UCI content transmitted via an UL channel (e.g., PRACH>HARQ-ACK feedback>CSI>data>SRS) and/or a priority class associated with an UL channel (e.g., URLLC channel>eMBB channel). Based on the selection, the one or more conditions may be determined based on a transmission power of the first UL channel and a priority class of the first UL channel. For example, the wireless device may apply the second transmission power threshold when the first UL channel is associated with a URLLC service or associated with a priority class that corresponds to a high priority and a transmission power of the first UL channel based on a power determination procedure (e.g., based on one or more power control parameters, a pathloss, a transmission power threshold of a cell where the uplink occurs) is a larger than the first power threshold.

Example embodiments efficiently allocate a transmission power to URLLC uplink channels of a first CG while reducing impacts on a second CG. A performance of the URLLC uplink channels may be improved while fair power sharing across CGs is maintained.

In exiting dual-connectivity systems, a first base station of a first cell group (e.g., MCG) and/or a second base station of a second cell group (e.g., SCG) may configure a first transmission power threshold for the first cell group and a second transmission power threshold for the second cell group. The first transmission power threshold and the second transmission power threshold may not exceed a UE allowed power determined based on a UE power class. A wireless device may allocate powers to one or more first uplink channels for the first base station, where a sum of the allocated power for the first cell group may be equal to or smaller than the first power threshold. The wireless device may allocate powers to one or more second uplink channels for the second base station, where a sum of the allocated powers to the second cell group may be equal to or smaller than the second power threshold. The wireless device may drop UL channels or reduce powers on the UL channels of a cell group (CG) until a sum of powers on the UL channels of the CG is smaller than or equal to a transmission power threshold (e.g., a first transmission power threshold for a first CG, a second transmission power threshold for a second CG). Implementations of existing technologies using different common and/or dedicated power control parameters for a cell based on channel and/or traffic type (e.g., power control parameters configuring multiple maximum transmit powers per cell based on channel priority), may not reduce packet loss ratio of URLLC and high priority data. Power reduction or packet drop of one or more URLLC packets may increase, for example, in certain coverage conditions (e.g., a cell edge). In an example, in some scenarios, a CG transmit power may reach a UE allowed transmit power for the CG, while each cell is transmitting below its maximum/allowed transmit power. For example, when a wireless device reduces a power level of a URLLC uplink channel, a reliability of the URLLC uplink channel may be reduced. Implementations of existing power allocations for CGs (e.g., when dual connectivity is configured) may increase packet loss for URLCC packets and other high, priority packets.

Example embodiments implement a power allocation process based on one or more QoS requirements of a URLLC service (or other service) and provide efficient power sharing across CGs. Example embodiments provide an enhancement to power control when dual connectivity is implemented, for example, by providing more flexible transmit power thresholds for uplink transmissions via CGs.

In an example, a first base station and/or a second base station may transmit one or more RRC messages indicating a first transmission power threshold and a second transmission power threshold for a CG. The one or more RRC messages may comprise configuration parameters of a plurality of cells that are grouped into a plurality of CGs. The plurality of CGs may comprise a first CG for communication via a first base station. The plurality of CG may comprise a second CG for communication via a second base station. A wireless device may allocate powers of UL channels based on the second transmission power threshold of the CG (e.g., a sum of powers of the UL channels is less than the second power threshold) when one or more conditions are met. In determining whether the one or more conditions are met, the wireless device may select a first UL channel from the UL channels scheduled to be transmitted in a OFDM symbol i of a slot n of the CG, wherein the first UL channel has a highest order (e.g., the first UL has a highest priority in the UL channels based on an ordering rule). For example, an ordering rule may be based on UCI content transmitted via an UL channel (e.g., PRACH>HARQ-ACK feedback>CSI>data>SRS) and/or a priority class associated with an UL channel (e.g., URLLC channel>eMBB channel). Based on the selection, the one or more conditions may be determined based on a transmission power of the first UL channel and a priority class of the first UL channel. For example, the wireless device may apply the second transmission power threshold when the first UL channel is associated with a URLLC service or associated with a priority class that corresponds to a high priority and a transmission power of the first UL channel based on a power determination procedure (e.g., based on one or more power control parameters, a pathloss, a transmission power threshold of a cell where the uplink occurs) is a larger than the first power threshold.

Example embodiments efficiently allocate a transmission power to URLLC uplink channels of a first CG while reducing impacts on a second CG. A performance of the URLLC uplink channels may be improved while fair power sharing across CGs is maintained.

In an example, a first base station and/or a second base station may transmit one or more RRC messages comprising a first transmission power threshold for a first CG and a second transmission power threshold for a second CG. Based on the one or more RRC messages, a wireless device may determine/reserve a first reserved power for the first cell group. For example, the first reserved power for the first cell group may refer unused/unallocated power by the second cell group. For example, the first reserved power may be determined based on a UE allowed/maximum power and the second transmission power threshold of the second cell group (e.g., the UE allowed power–the second power threshold). The wireless device may determine the UE allowed/maximum power based on a power class that the wireless device may support for the first cell group. In an example, the wireless device may determine/reserve the second reserved power for the second cell group. The second reserved power may be determined based on the UE allowed/maximum power and the first power threshold of the first cell group.

The first reserved power may be used by the first base station to schedule one or more uplink channels that may not be power-scaled or dropped due to a power limitation. For example, the first reserved power may be ensured for the first cell group regardless power allocation to one or more second uplink channels/transmission of the second cell group. The wireless device may limit a total/sum power of the one or more second uplink channels/transmissions of the second cell group equal to or lower than the second transmission power threshold. The second reserved power may be used by the second base station to schedule one or more uplink channels that may not be power-scaled or dropped due to the power limitation. A reserved power of a cell group is necessary in scheduling one or more uplink channels with guaranteed/ensured power.

To reserve a reserved power for a second CG, a first transmission power threshold of a first CG may not be equal to the UE allowed power and may be lower than the UE allowed/maximum power. Similarly, a second transmission power threshold of the second CG may not be equal to the UE allowed power and may be lower than the UE allowed/maximum power. With a transmission power threshold of a CG being less than a UE allowed power, there is a case that a configured transmission power on a URLLC UL channel of the CG may not be allocated as the configured transmission power may be larger than the transmission power threshold of the CG. Increasing the transmission power threshold may not address this issue as it may degrade the performance of power sharing across cell groups. In an example, a reserved power may also be called a guaranteed power. In an example, a UE allowed power may be determined based on a UE maximum power based on a UE power class or determined based on a UE internal logic or determined based on a regulation requirement or determined based on one or more power control parameters. The UE allowed power may be called a UE maximum power.

In an example, a wireless device may allocate a first power level on a first URLLC uplink channel for a first cell group (CG) beyond a first power threshold (e.g., more than the first power threshold). The wireless device may allocate a second power level on a second URLLC uplink channel for a second CG beyond a second power threshold (e.g., more than the second power threshold). The wireless device may allocate a third power level on a third eMBB uplink channel for the first CG equal to or less than the first power threshold. The wireless device may allocate a fourth power level on a fourth eMBB uplink channel for the second CG equal to or less than the second power threshold.

Allocating the first power level beyond the first transmission power threshold may degrade a performance of the second CG with degraded reserved power of the second CG. In handling of potential performance degradation of a first CG due to a high-power transmission of a URLLC transmission in a second CG, a first base station and/or a second base station may configure a first ratio for the first CG. The first base station and/or the second base station may configure a second ratio for the second CG. The wireless device may use a high-power beyond a first transmission power threshold configured for a first CG within a ratio value. The ratio may be determined by a duration used with a high power compared to a measurement interval. For example, if the ratio is 5%, the wireless device is not expected to use the high power (e.g., more than the first transmission power threshold in the first CG) more than 5% of time of uplink transmission opportunities/occasions. For example, when the ratio is 5%, the wireless device may be allowed to allocate the high power for an URLLC transmission of the first CG once in every 20 uplink transmissions. For example, when the ratio is 5%, the wireless device may be allowed to allocate the high power for the URLLC transmission of the first CG for 5 msec in every 100 msec window. For example, when the ratio is 5%, the wireless device may be allowed to allocate the high power for the URLLC transmission of the first CG once per every 20 uplink slots (or 5 transmissions in every 100 uplink slots).

The first base station and/or the second base station may configure/indicate a third transmission power threshold for the first CG. The first base station and/or the second base station may configure/indicate a fourth transmission power threshold for the second CG. The wireless device may allocate a power of an URLLC uplink channel for the first CG equal to or less than the third power threshold. The wireless device may allocate a power of an URLLC uplink channel for the second CG equal to or less than the fourth threshold.

In configuration/indication of threshold values, the first base station and/or the second base station may configure a first power allowance for the first CG. The first base station and/or the second base station may configure a second power allowance for the second CG. The wireless device may allocate a first power on an URLLC UL channel for a first CG equal to or less than a sum of a first transmission power threshold and the first power allowance. The wireless device may allocate a second power on an URLLC UL channel for a second CG equal to or less than a sum of a second transmission power threshold and the second power allowance. For example, the third transmission power threshold of the first CG and/or the fourth transmission power threshold of the second CG may be implicitly determined based on a UE allowed power. For example, the third transmission power threshold of the first CG and/or the fourth transmission power threshold of the second CG may be implicitly determined based on a UE allowed power when the wireless device may not receive other RRC messages to set the parameters of the third transmission power threshold and/or the fourth power threshold. Embodiments may allow performance enhancements of URLLC services, by increasing opportunities that a configured power on an URLLC uplink channel may be guaranteed. Embodiments may allow efficient resource sharing among cell groups based on guaranteed powers, which are guaranteed at least when no URLLC traffic arises. Configuration of a first transmission power threshold level for a first service (e.g., eMBB services) and a second transmission power threshold level for a second service (e.g., URLLC services) for a CG may allow enhanced performance of the second service with reduced impact on the first services.

In an example, a first quality of service target of a first service (e.g., eMBB) may be different from a second quality of service target of a second service (e.g., URLLC). For example, the first quality of service target may be a BLER of $10^{-1}$ and a latency requirement is 4 msec. The second quality of service target may be a BLER of $10^{-5}$ and a latency requirement is less than 1 msec. A wireless device may operate in a dual-connectivity scenario where a first CG (e.g., a MCG) may provide a coverage while a second CG (e.g., a SCG) may provide a throughput or support the second service. In supporting different quality of service targets of the first and the second service, a required uplink power for the first service and the second service may be different.

Figure 16:
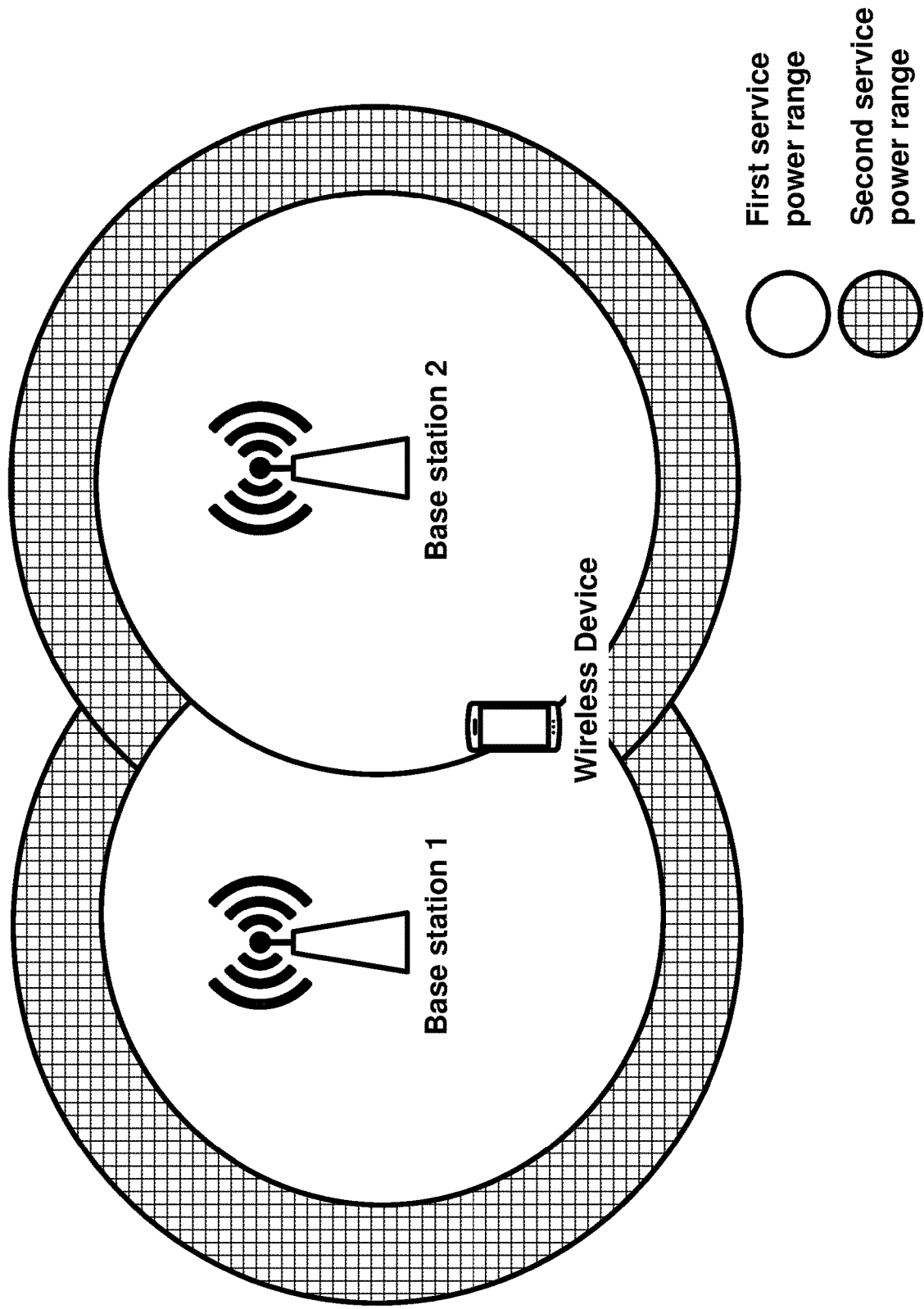
FIG. 16 is a diagram of a plurality of services.

For example, as shown in FIG. 16, a first uplink power coverage of a first service (e.g., first service power range) may be smaller than a second uplink power coverage of a second service (e.g., second service power range). FIG. 16 illustrates an embodiment. In a dual connectivity scenario, where a wireless device (e.g., a UE) may be associated with a first base station (e.g. base station 1) and a second base station (e.g., base station 2). The first base station and the second base station may split a UE allowed power among two cell groups. The first base station and/or the second base station may configure a first threshold used for the first service and a second threshold used for the second service for a first CG. The first base station and/or the second base station may configure a third threshold used for the first service and a fourth threshold used for the second service for a second CG. Potential uplink coverages based on the first threshold and the second threshold for the first CG (e.g., base station 1) are shown in left diagrams (a first service power range shown in inner circle and a second service power range shown in outer circle respectively for the first base station). Potential uplink coverages based on the third threshold and the fourth threshold for the second base station are shown in right diagrams (a first service power range shown in inner circle and a second service power range shown in outer circle respectively for the second base station). For example, the first CG may be configured/associated with the first base station. A second CG may be configured/associated with the second base station. For example, FIG. 16 illustrates that the first service power range of the first CG/the first base station may be smaller than the second service power range. The wireless device may apply a first allowed power based on the first threshold in response to an uplink, for the first CG, is associated with the first service/priority (e.g., eMBB service). The wireless device may apply a second allowed power based on the second threshold in response to an uplink, for the first CG, is associated with the second service/priority (e.g., URLLC service). Similarly, the wireless device may apply the third threshold or the fourth threshold for a second uplink transmission for the second CG based on a service/priority that the second uplink transmission is associated with. With different quality of service targets of each service, different uplink power sharing/coverage may be supported.

In an example, a wireless device may determine a transmission power of a UL channel based on one or more power control parameters for the UL channel in a cell, where the UL channel is being transmitted. The wireless device may further determine the transmission power based on a pathloss, a spatial filter information (e.g., SRI), and/or the like. The wireless device may determine one or more transmission powers for corresponding UL channels in a OFDM symbol i of a slot n. In determining powers of the UL channels, a wireless device may allocate powers based on an order of the UL channels. In determining a power of an UL channel, the wireless device may determine a power as a lowest of {a transmission power of the UL channel, a transmission power threshold of a CG, a maximum transmission power threshold of the cell, a maximum transmission power threshold of a frequency region}. The frequency region is determined based on the cell. Based on the order, the wireless device may allocate a power from a highest ordered UL channel. In response to applying a second transmission power threshold (e.g., a sum of a first transmission power threshold and an allowance), the wireless device may select a first ordered (e.g., a highest ordered UL channel). In determining a power of the first ordered channel, the wireless device may determine the power as a lowest of {a transmission power of the UL channel, the second transmission power threshold of the CG, the maximum transmission power threshold of the cell, the maximum transmission power threshold of a frequency region}, in response to the first UL channel is associated with a second service or a second priority class. In determining a power of the first ordered channel, the wireless device may determine the power as a lowest of {a transmission power of the UL channel, the first transmission power threshold of the CG, the maximum transmission power threshold of the cell, the maximum transmission power threshold of a frequency region}, in response to the first UL channel is associated with a first service or a first priority class. The wireless device may determine one or more powers for other UL channels except for the first ordered UL channel as a lowest of {a transmission power of the UL channel, the first transmission power threshold of the CG, the maximum transmission power threshold of the cell, the maximum transmission power threshold of a frequency region}.

Figure 17:
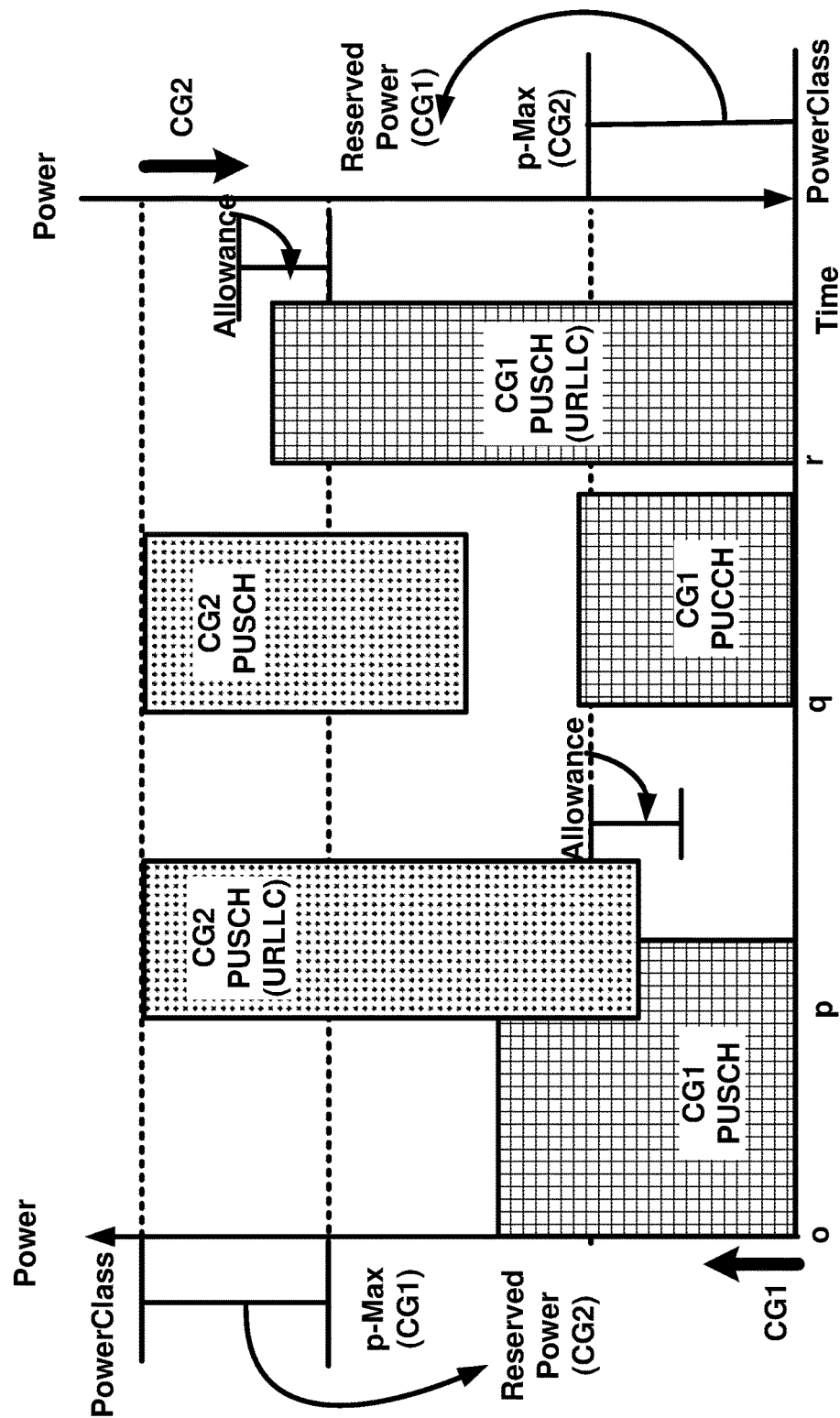
FIG. 17 is an example of embodiments.

FIG. 17 illustrates an embodiment. A wireless device may be configured with a dual-connectivity scenario, wherein the wireless device is associated with a first cell group (CG1) and a second cell group (CG2). A first base station and/or a second base station may transmit one or more RRC messages indicating a first transmission power threshold used for the first CG (e.g., p-Max (CG1)) and a second transmission power threshold used for the second CG (e.g., p-Max (CG2)). The first base station and/or the second base station may transmit additional RRC message(s) indicating an allowance value for a CG (the first CG or the second CG or applied for both CGs). The allowance value may be applied to the first CG, the second CG or both the first and the second CG. For example, FIG. 17 illustrates the wireless device is configured with a first allowance for the first CG and a second allowance for the second CG. For example, the first allowance and the second allowance may have same. For example, the first base station and/or the second base station may transmit messages comprising the first allowance and the second allowance respectively for each CG. For example, the first base station and/or the second base station may transmit messages comprising an allowance that may be applied for the first allowance and the second allowance.

The allowance value is an additional power that a wireless device may utilize for transmitting an uplink channel for the second service (e.g., URLLC service). In an example, the wireless device may determine the uplink channel is for a service based on a priority value associated with the uplink channel. A first priority value may be used for the first services. A second priority value may be used for the second services. For example, the wireless device may receive a DCI indicating a priority value for the uplink channel, wherein the DCI schedules resource(s) for the uplink channel. For example, the wireless device may receive RRC messages indicating a priority value for the uplink channel, wherein the uplink channel may be transmitted via one or more resource of configured resources (e.g., configured grant resources, SRS resources, semi-persistent CSI feedback resources, etc.). For example, the wireless device may determine the uplink channel is for the second service based on a logical channel (LCH) of data carried over the uplink channel. One or more LCHs may be associated with the first services. One or more second LCHs may be associated with the second services. For example, the wireless device may determine the uplink channel is for the second service based on a RNTI used in a DCI scheduling the uplink channel for the transmission. For example, C-RNTI may be used for the first services. For example, a second RNTI may be used for the second services. Based on a UE power class or a UE allowed power, a wireless device may allocate power up to p-Max (CG1) to uplink transmissions to CG1. A remaining power (e.g., the UE allowed power–allocated power of the CG1, PowerClass–p-Max (CG1)) may be considered as a reserved/guaranteed/assured power for CG2. The remaining power will not be used for uplink transmission for the CG1 at least for the first services. Similarly, the wireless device may allocate power up to p-Max (CG2) to uplink transmissions to CG2. A remaining power (e.g., the UE allowed power–allocated power of the CG2, PowerClass–p-Max (CG2)) may be considered as a reserved/guaranteed/assured power for CG1 as the remaining power will not be used for uplink transmission for the CG2 at least for the first services. In an example, the first services may indicate eMBB services. The second services may indicate URLLC services. In a time o, the wireless device allocate a power which is less than p-Max (CG1) for a PUSCH for the CG1 (CG1 PUSCH).

In response to receiving a transmission request of PUSCH for the second service for CG2 at a time p (e.g., CG2 PUSCH (URLLC)), the wireless device may allocate/determine a transmission power to/of the PUSCH more than p-Max (CG2) as the PUSCH is for/associated with the second service (e.g., URLLC). In response to allocating the power for the CG2 PUSCH at the time p, the wireless device may drop CG1 PUSCH or reduce allocated power to the CG1 PUSCH. In case the wireless device may reduce a power level on on-going transmission or the CG1 PUSCH (e.g., an UL channel being transmitted at a time of power determination or an UL channel that the wireless device has determined a power level already), a quality of the packet may be degraded. Particularly, the case where the wireless device may reduce the power on OFDM symbol(s) carrying DM-RS may degrade the quality of the uplink transmission. The wireless device may drop an UL channel (e.g., CG1 PUSCH at the time p) in response to one or more OFDM symbols impacted by the power adjustment may contain DM-RS or a level of power scaling is larger than X dB (e.g., X=3). When the wireless device needs to reduce the power more than a certain threshold (e.g., 3 dB), the wireless device may drop the transmission instead of reducing the power. The wireless device may drop the uplink transmission when the power reduction is larger than the threshold. In other cases, the wireless device may reduce the power and continue the uplink transmission.

In determining the power for the CG2 PUSCH for the second service at the time p, the wireless device considers additional allowance for the second service. The wireless device may determine a transmission power based on a configured power for CG2 PUSCH, allowed power (e.g., PowerClass), and a sum of p-Max (CG2) and the allowance (e.g., the transmission power=minimum {the UE allowed power, p-Max (CG2)+the allowance, the configured power for CG2 PUSCH}. In the example, the wireless device may allocate the configured power for CG2 PUSCH that is smaller than the UE allowed power (e.g., PowerClass) and a sum of p-Max (CG2) and the allowance (e.g., the configured power<=minimum {the UE allowed power, p-Max (CG2)+the allowance}. For example, the wireless device may determine the transmission power of the CG2 PUSCH as a lowest power among {a configured transmission power of the CG2 PUSCH computed based on one or more power control parameters and a pathloss, p-Max (CG2)+allowance, a UE allowed power, a UE allowed power in a frequency region, a UE allowed power in a cell}. The frequency region is determined from a frequency range 1 or frequency range 2 depending on a frequency of the cell where the CG2 PUSCH is transmitted.

For example, the wireless device may allocate a first power to a CG2 PUSCH and a second power to a CG1 PUCCH at a time q where a sum of the first power and the second power is less than the UE allowed power. The first power is less than the p-Max (CG2) and the second power is less than p-Max (CG1). The wireless device allocates a required/requested/configured power for a UL channel based on one or more configured power control parameters. The wireless device allocates/determine a third power for CG1 PUSCH that is for the second service. The third power is larger than p-Max (CG1) and smaller than a sum of the p-Max (CG1) and an allowance value for CG1. As the PUSCH is for the second service, the wireless device may allocate/determine the third power beyond the first transmission power threshold value (p-Max (CG1)).

In an example, a wireless device may be configured with a first transmission power threshold and a second transmission power threshold for a CG. The wireless device may apply the first transmission power threshold in determining power levels for one or more first uplink channels. The wireless device may apply the second transmission power threshold in determining power levels for one or more second uplink channels. The one or more first uplink channels may comprise PUCCH, PUSCH and/or SRS transmission for either the first service (e.g., eMBB) or the second service (e.g., URLLC). The one or more second uplink channels may comprise PUCCH, PUSCH and/or SRS transmission of the second service and/or PRACH transmission. For example, PRACH transmission may be triggered for a beam failure recovery procedure. PRACH transmission may be triggered by PDCCH order. For example, a PRACH of a PCell or a SPCell may have higher priority over a PARCH of a SCell. The PRACH of the PCell or the SPCell may be considered as a PRACH of the second service (e.g., a wireless device may allocate a power up to the second threshold or UE allowed power). The PRACH of the SCell or the SPCell is considered as a PRACH of the first service (e.g., a wireless device may allocate a power up to the first threshold or UE allowed power).

In an example, a wireless device may apply the first transmission power threshold on one or more first uplink channels when one or more following conditions are met: the one or more first uplink channels are belonging to the first service; the one or more first uplink channels do not include PRACH transmission and are belonging to the first service; the one or more first uplink channels include only one PRACH transmission and a configured power on the one PRACH transmission is less than or equal to the first power threshold; the one or more first uplink channels include only one uplink channel of the second service and a configured power on the one uplink channel is less than or equal to the first power threshold; the one or more first uplink channels include more than one uplink channels of the second service and a sum of configured powers of the more than one uplink channels is less than or equal to the first power threshold; and/or the one or more first uplink channels include more than one PRACH transmissions and a sum of configured powers of the more than one PRACH transmissions is less than or equal to the first power threshold.

The wireless device may apply the second transmission power threshold on one or more second uplink channels when one or more following conditions are met: the one or more first uplink channels are belonging to the second service; the one or more first uplink channels are PRACHs; the one or more first uplink channels include only one PRACH transmission and a configured power on the one PRACH transmission is larger than the first power threshold; the one or more first uplink channels include only one uplink channel of the second service and a configured power on the one uplink channel is larger than the first power threshold; the one or more first uplink channels include more than one uplink channels of the second service and a sum of configured powers of the more than one uplink channels is larger than the first power threshold; the one or more first uplink channels include more than one PRACH transmissions and a sum of configured powers of the more than one PRACH transmissions is larger than the first power threshold; the one or more first uplink channels include more than one uplink channels of the second service and a largest value among configured powers of the more than one uplink channels is larger than the first power threshold; the one or more first uplink channels include more than one PRACH transmissions and a largest value of configured powers of the more than one PRACH transmissions is larger than the first power threshold; the one or more first uplink channels include more than one uplink channels of the second service and a configured power of a highest priority uplink channel is larger than the first power threshold; and/or the one or more first uplink channels include more than one PRACH transmissions and a configured power of a highest priority PRACH is larger than the first power threshold.

The wireless device may apply the second transmission power threshold based on a duty cycle configuration or a ratio configuration if configured. For example, if the base station configures a ratio parameter used for the second transmission power threshold for the CG1, the wireless device may apply the second transmission power threshold as long as the wireless device has not allocated a power more than the first transmission power threshold for the CG1 more than the configured ratio parameter. For example, the ratio parameter is 50%. The wireless device may keep track of a first time where a higher power than the first transmission power threshold is allocated for the CG1. The wireless device may keep track of the second time where a lower or equal power to the first transmission power threshold is allocated for the CG1. The wireless device may not use the second transmission power threshold as long as the ratio of the first time/(the first time+the second time) is larger than the configured ratio.

In an example, a first base station and/or a second base station may configure a duty cycle where a wireless device may use a higher transmission power threshold than a lower transmission power threshold for a CG. For example, the duty cycle may be used for a second priority class UL transmissions (e.g., a wireless device is allowed to apply the higher transmission power threshold only for case where all UL channel(s) are URLLC UL channel(s)). For example, the duty cycle may be used for the CG regardless of priority class of UL channels when the duty cycle is satisfied. For example, the duty cycle may be used when the wireless device may have at least one a second priority/a high priority UL traffic for the CG. For example, the duty cycle may be used when the wireless device may have at least one a second/a high priority UL transmission where a transmission power of the UL transmission may exceed the lower transmission power threshold of the CG. A duty cycle may be configured regardless of a power class to share power with different patterns in different times. In an example, the duty cycle may be additionally configured with an allowance value for a CG. The wireless device may be allowed to exceed a maximum/allowed power of the CG (e.g., p-Max (CG)+the allowance) for the second services within the duty cycle if configured. For example, when the duty cycle is 50%, the wireless device may exceed or utilize the configured allowance up to 50% of uplink transmissions/uplink slots/transmission time/a time duration.

Figure 18:
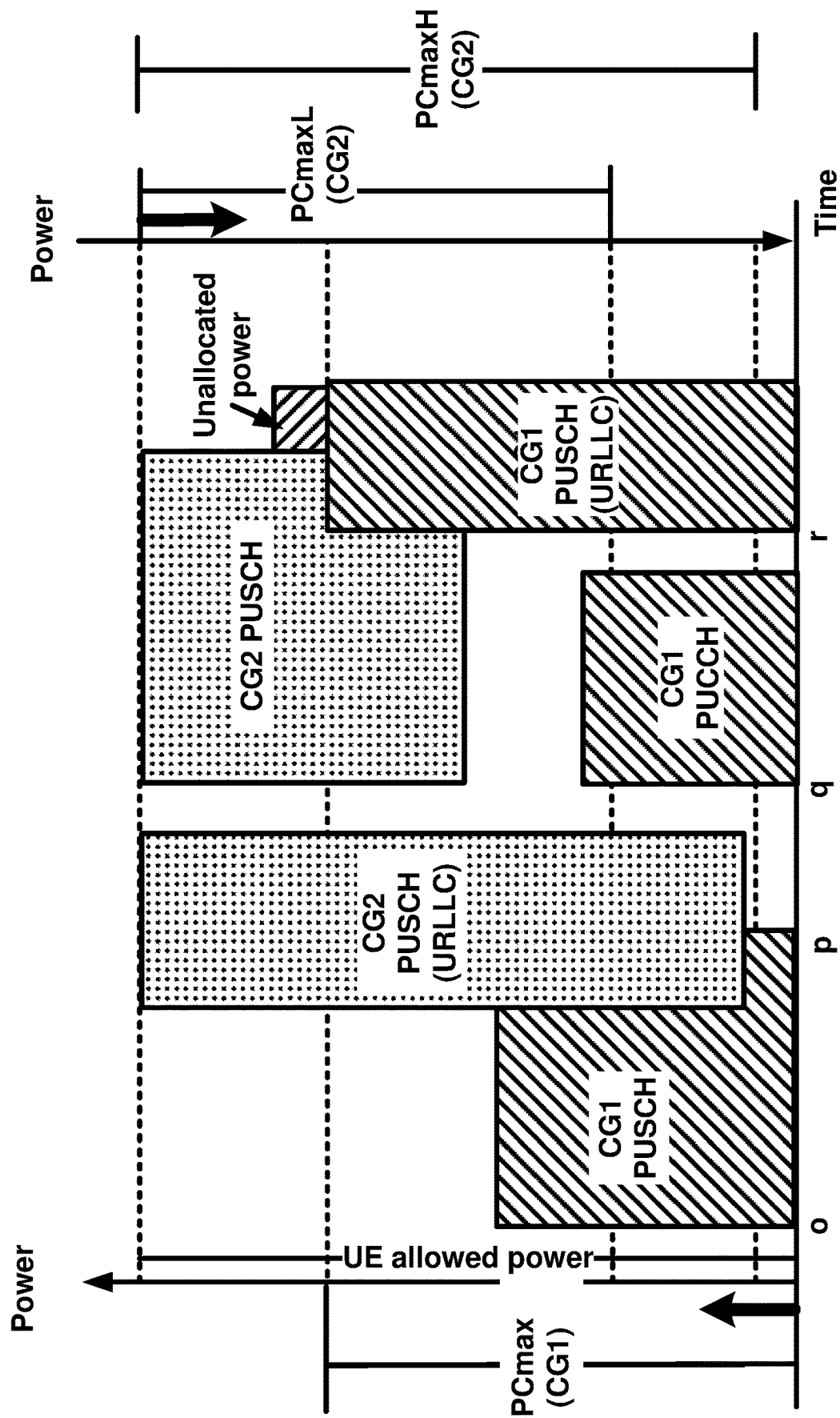
FIG. 18 is an example of embodiments.

FIG. 18 illustrates an example of an embodiment of an allowance configured to a first CG. For example, the first CG may operate NR. The second CG may operate LTE. For example, the first CG may operate a slow processing RAT. The second CG may operate a fast processing RAT. A first base station or a second base station may configure a first transmission power threshold for a CG1 (PCmax (CG1)). The first base station and/or the second base station may configure a second transmission power threshold for a CG2 (PCmaxL (CG2)) and a third transmission power threshold for the CG2 (PCmaxH(CG2)). In response to receiving two transmission power threshold values, a wireless device may apply different transmission power threshold values for different services. In response to receiving a transmission power threshold value, the wireless device may apply the transmission power threshold values for all services/channels of the CG. In an example, a wireless device may assume a second transmission power threshold is a UE allowed power in response to receiving only one transmission power threshold value for a CG.

In FIG. 18, the wireless device applies the single transmission power threshold value for all uplink channels for CG1. At a time o, the wireless device allocates a power to CG1 PUSCH up to a configured power of CG1 PUSCH. At a time p, the wireless device allocates a power up to the third transmission power threshold value of CG2 as the PUSCH is for the second service. The wireless device may reduce or drop CG1 PUSCH in response to reducing the power on CG1 PUSCH. At a time p, the wireless device allocates configured powers of CG2 PUSCH and CG1 PUSCH as a sum of configured powers do not exceed UE allowed power. At a time r, the wireless device may allocate a PCmax (CG1) to a CG1 PUSCH that is lower than a configured power of the CG1 PUSCH. As the wireless device is configured with a single transmission power threshold value for the CG1, the wireless device may not allocate more power than the configured threshold for the CG1 regardless of service type. The wireless device may reduce a power allocated to CG2 PUSCH at a time p up to a reserved power of CG2. The wireless device may allocate a lower power than the configured power for CG1 PUSCH at the time r.

In an example, a wireless device may take some or all power allocated to a first channel, that is being transmitted, of a CG in response to a configured power of a second uplink channel of another CG may not be satisfied with a currently remaining power. For example, in FIG. 18, the wireless device takes power from a CG1 PUSCH (a first PUSCH of CG1) for CG2 PUSCH at a time p. The wireless device may take the power of the first channel, that is being transmitted, for the second channel when the second channel has higher priority than the first channel. The wireless device may not take the power of the first channel, that is being transmitted, for the second channel when the second channel has an equal or lower priority than the first channel.

Figure 19:
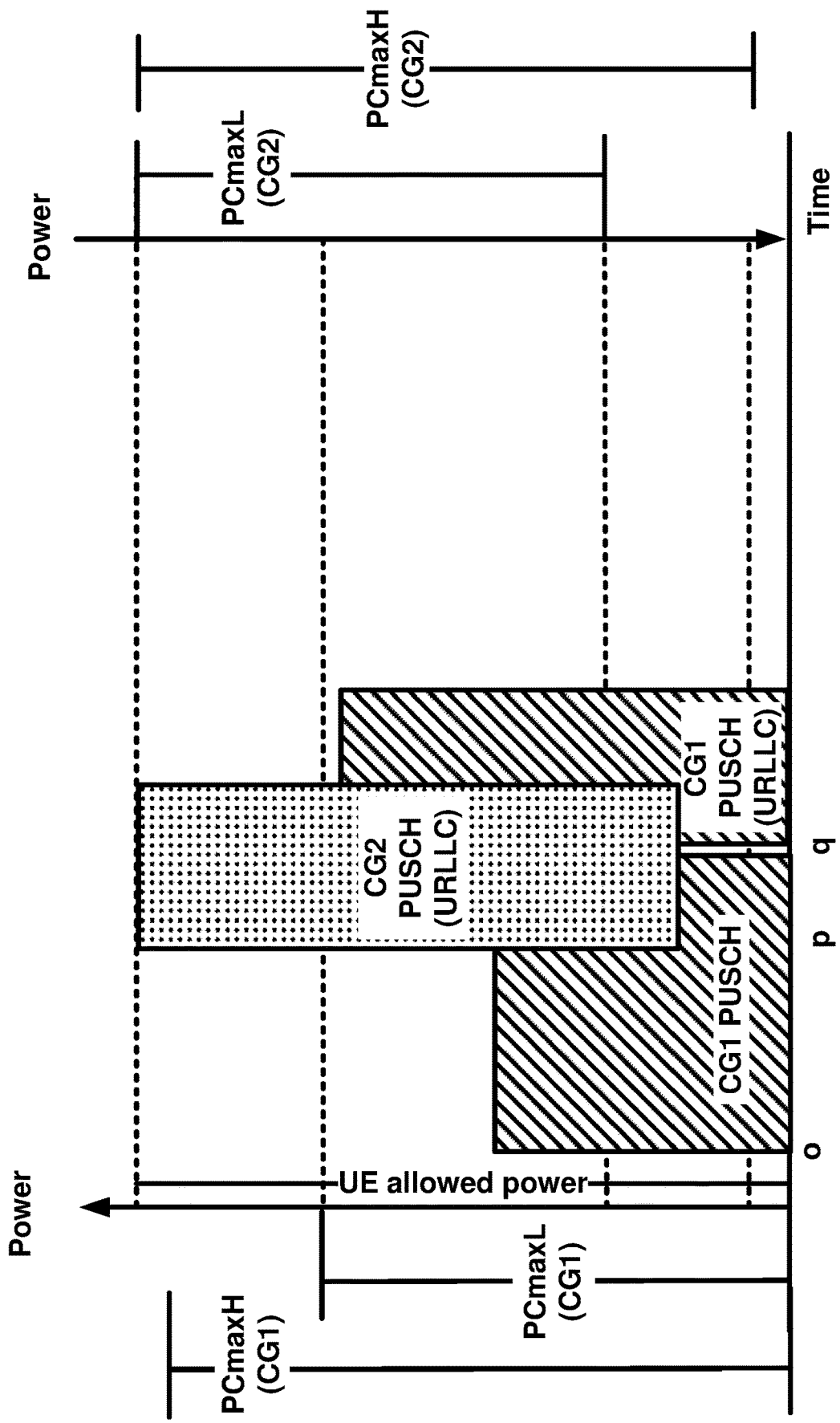
FIG. 19 is an example of embodiments.

FIG. 19 illustrates a case where more than one uplink channels, across CGs, of a second service collide. A first base station or a second base station may configure a first transmission power threshold (PCmaxL(CG1)) and a second transmission power threshold (CGMaxH(CG1)) for a CG1. The first base station or the second base station may configure a third transmission power threshold (CGmaxL (CG2)) and a fourth transmission power threshold (CG-maxH(CG2)) for a CG2. A wireless device may allocate a power to a CG1 PUSCH at a time o based on a configured power on the CG1 PUSCH as the configured power is smaller than the first power threshold. At a time p, the wireless device may need to allocate a power to a CG2 PUSCH, and reduce the power on the CG1 PUSCH. The wireless device allocates a configured power of the CG2 PUSCH that is lower than the fourth transmission power threshold of CG2. In response to another PUSCH (CG1 PUSCH for URLLC) in a time q, the wireless device may not allocate a configured power of the CG1 PUSCH for URLLC as it requires reducing the allocated power to the CG2 PUSCH. As CG2 PUSCH occurs earlier than the CG1 PUSCH, the wireless device may prioritize an earlier transmission when two channels have a same priority (e.g., both channels are for the second service).

In an example, a wireless device may have a first processing capability for a first channel. The wireless device may have a second processing capability for a second channel. The first processing capability may be faster than the second processing capability. For example, the wireless device may need to receive an UL grant scheduling the first channel at a time n. For example, the wireless device may need to receive an UL grant scheduling the second channel at a time p where p is earlier than n. In receiving the UL grant for the second channel at the time p, the wireless device may allocate the configured power to the second channel occurring at a K-th OFDM symbol of the slot m. In receiving the UL grant for the first channel at the time n, the wireless device may not reduce the allocated power to the second channel when the first channel and the second channel may have the same priority or the first channel has a lower priority than the second channel.

Figure 20:
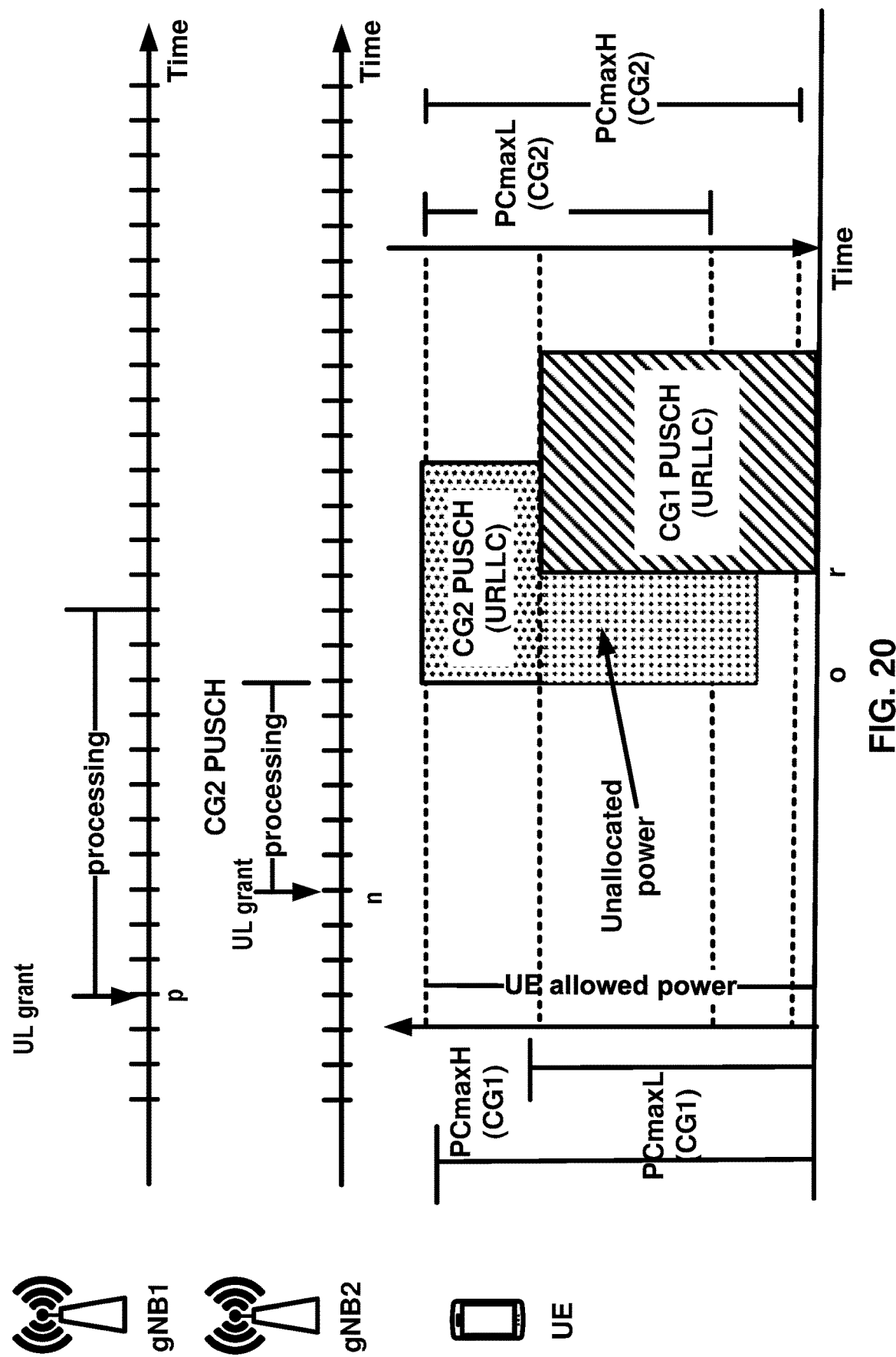
FIG. 20 is an example of embodiments.

FIG. 20 illustrates an example. A first base station (gNB1) transmits an UL grant at a time p which is a latest time to schedule a PUSCH scheduled at a time r with a processing time constraint. A second base station (gNB2) transmits an UL grant a time n which is a latest time to schedule a PUSCH at a time o with a processing time constraint. In receiving the UL grant at the time p, the wireless device may allocate a power for CG1 PUSCH up to a configured power of CG1 PUSCH. In receiving the UL grant at the time n, the wireless device may allocate only a remaining power to the CG2 PUSCH as the power is allocated to the CG1 PUSCH already and both PUSCHs have a same priority. In an example, a wireless device may take some or all power allocated to a first channel for a second channel with a same priority when the second channel is for a master CG. Reducing a power during a transmission or dropping a partial transmission may degrade a performance of a transmission. Ensuring a QoS of a UL channel, a wireless device may not reallocate an already allocated power to an uplink channel when a priority value of the uplink channel is a high or the uplink channel is for a second service (e.g., URLLC). The wireless device may not reallocate an already allocated power to an uplink channel when a base station may configure an option (e.g., via RRC signaling) for the wireless device not to change the power during a transmission. The wireless device may reallocate an already allocated power to an uplink channel when the wireless device may determine based on implementation.

In an example, a wireless device may have a plurality of uplink channels for a CG. For example, a priority of only one uplink channel from the plurality of uplink channels is a high priority or the uplink channel is associated with a second service type (e.g., URLLC). The wireless device may determine to apply a first transmission power threshold or a second transmission power threshold for the CG based on a configured transmission power of the uplink channel. For example, if the configured transmission power of the uplink channel is smaller than or equal to the first power threshold, the wireless device may apply the first transmission power threshold in determining powers of the plurality of uplink channels of the CG. For example, if the configured transmission power of the uplink channel is larger than the first power threshold, the wireless device may apply the second transmission power threshold in determining powers of the plurality of uplink channels of the CG.

When the wireless device applies the second transmission power threshold for this case, the wireless device may allocate 'zero' power to the plurality of uplink channels of the CG except for the uplink channel. For example, when the wireless device may have more than one uplink channels with a high priority among the plurality of uplink channels for the CG, the wireless device may select a single uplink channel that may have a highest priority. The wireless device may select a earliest UL transmission among the more than one uplink channels with the high priority. The wireless device may select a single uplink transmission that can be allocated a power more than the first power threshold. For example, if the configured transmission power of the selected single uplink transmission is larger than the first power threshold, the wireless device may apply the second transmission power threshold in determining powers of the plurality of uplink channels of the CG. When the wireless device applies the second transmission power threshold for this case, the wireless device may allocate 'zero' power to the plurality of uplink channels of the CG except for the selected single uplink transmission. Otherwise, the wireless device may apply the first transmission power threshold in determining powers for the plurality of the uplink channels of the CG.

Figure 21:
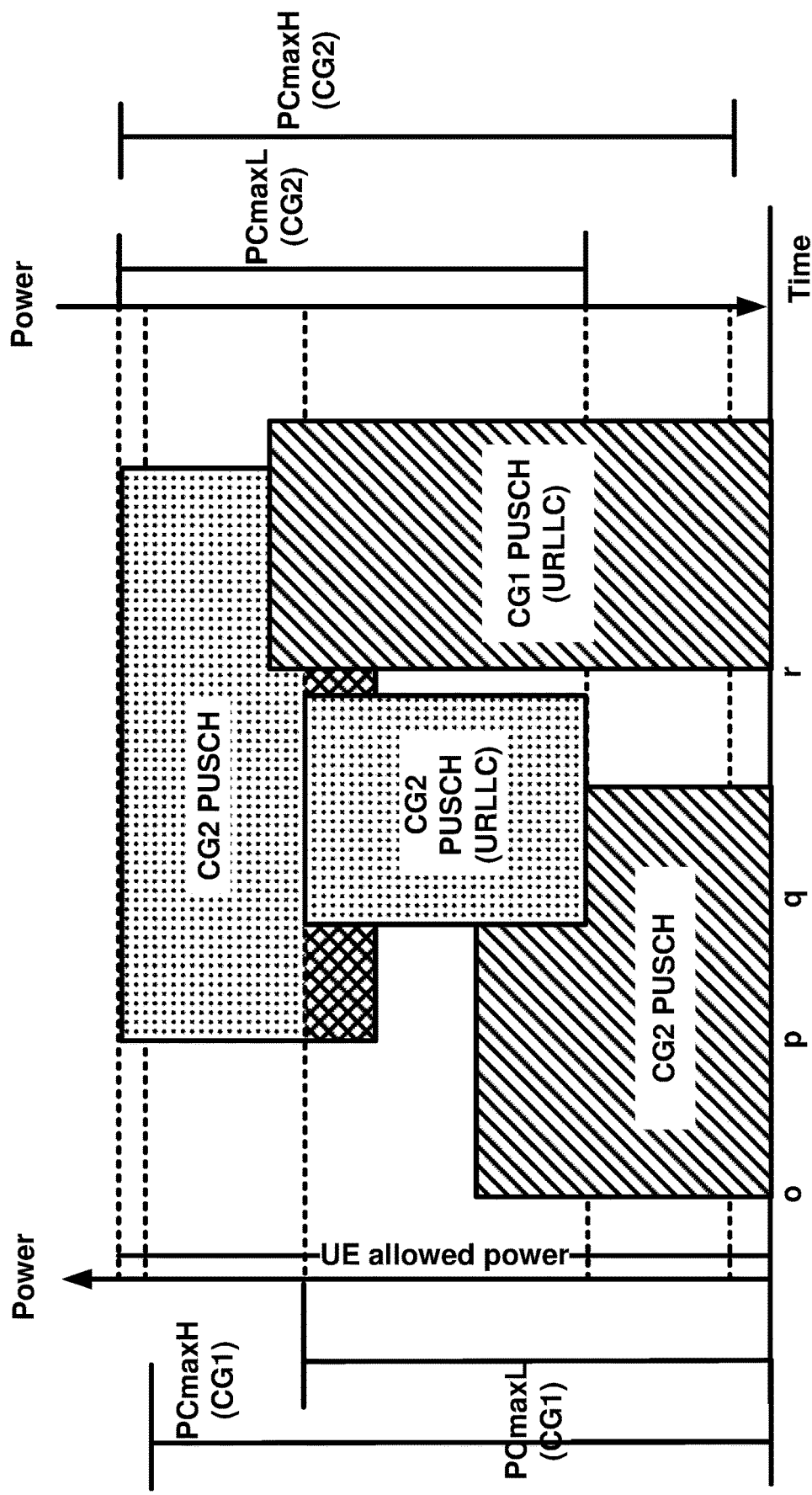
FIG. 21 is an example of embodiments.

FIG. 21 illustrates an example. A first base station (e.g., gNB1) may schedule a UL grant for a CG1 scheduled at a time o. A configured power for the first PUSCH for the CG1 is less than a first transmission power threshold of the CG1. A wireless device allocates the configured power to the first PUSCH of the CG1. A second base station (e.g., gNB2) may schedule a UL grant for a CG2 scheduled at a time p. A configured power for the CG2 PUSCH is less than a first transmission power threshold of the CG2. The wireless device allocates the configured power to the CG2 PUSCH at the time p. When the wireless device allocates a power for CG2 PUSCH scheduled at a time q, the wireless device determines whether to use the first transmission power threshold or the second transmission power threshold for scheduling the CG2 PUSCH as the CG2 PUSCH at the time q is associated with the second service. In response to the lower configured power of the CG2 PUSCH at the time q compared to the first transmission power threshold (e.g., PCmaxL(CG2)) of the CG2, the wireless device reduces the power of the earlier PUSCH (e.g., CG2 PUSCH at the time p) and allocates more power to the second PUSCH for the CG2. When the wireless device allocates a power to a PUSCH for the CG1 at a time r, the wireless device uses a second transmission power threshold (e.g., PCmaxH(CG1)) of the CG1 as a configured power for the CG1 PUSCH scheduled at the time r is larger than a first threshold of CG1 (e.g., PCmaxL(CG1)). The wireless device may reduce the power from the CG2 PUSCH of CG2 scheduled at the time p or drop the CG2 PUSCH scheduled at the time p to reallocate the power to CG1 PUSCH for the second service (e.g., CG1 PUSCH (URLLC)).

In an example, a wireless device may perform power determination of one or more first uplink channels of a CG, first based on a first transmission power threshold of the CG. The wireless device may apply a second transmission power threshold of the CG when the wireless device may require a sum power of configured powers of the one or more first uplink channels that is larger than the first transmission power threshold of the CG. The wireless device may determine whether there is at least one uplink channel, which has a high priority or associated with a second channel, with a configured power for the channel is larger than the first power threshold. In case the wireless device at least one channel of the high priority requires a higher power than the first power threshold, the wireless device may apply the second transmission power threshold in determining powers for the one or more first uplink channels. Otherwise, the wireless device may apply the first transmission power threshold in determining powers of the one or more first uplink channels. When the wireless device determines to use the second transmission power threshold for the CG, the wireless device may configure a transmission power threshold of the CG based on a lower value between a configured power of an uplink channel with a high priority or associated with the second service and the second power threshold. When the wireless device may have more than one uplink channels for the CG with a high priority or associated with the second service, the wireless device may select a single uplink channel based on a priority rule. If a configured power of the single uplink channel is higher than the first threshold of the CG, the wireless device may apply the second transmission power threshold in determining a power level for the single uplink channel. Otherwise, the wireless device may use the first power threshold.

In an example, a wireless device may apply a first transmission power threshold of a CG in response to all uplink channels at a given time are associated with a first service only or have a low priority. The wireless device may apply a second transmission power threshold of the CG in response to any uplink channel at a given time is associated with a second service or have a high priority. In case, the wireless device may have a first uplink channel with a high priority in a first CG and a second uplink channel with the high priority in a second CG, the wireless device may prioritize the first uplink channel or an uplink channel of the first CG, and/or or may prioritize an earlier uplink transmission occurring in a time, and/or may prioritize an uplink transmission scheduled earlier, and/or may prioritize a dynamic uplink over a configured grant uplink transmission.

In an example, a wireless device may apply a second transmission power threshold of a CG in response to a sum of configured powers of one or more uplink channels associated with a second priority or have a high priority for the CG may be larger than a first transmission power threshold of the CG. The wireless device may apply the first transmission power threshold in other cases. In an example, a wireless device may apply a second transmission power threshold of a CG in response to a sum of configured powers of one or more uplink channels for the CG may be larger than a first threshold of the CG, and there is at least one UL channel, that is associated with a second service or has a high priority, in the one or more uplink channels. The wireless device may apply a first transmission power threshold of the CG in other cases.

Based on a determined threshold value for a CG (e.g., a first power threshold, a second power threshold, a configured power of a UL channel, etc.), a wireless device may perform power determination within the CG. For example, the wireless device may have a first uplink channel, a second uplink channel, a third uplink channel and a fourth uplink channel. The wireless device may determine an order of uplink channels based on a transmission timing (e.g., an UL channel with an earlier starting OFDM symbol in a slot may have a higher priority over another UL channel with a later starting OFDM symbol in the slot), an associated service (e.g., an UL channel associated with a second service may have a higher priority over another UL channel associated with a first service), a data type (e.g., PRACH may have higher priority over SR/PUCCH with HARQ-ACK feedback, SR/PUCCH with HARQ-ACK feedback may have higher priority over PUSCH with HARQ-ACK feedback (or PUSCH with HARQ-ACK feedback may have higher priority over SR/PUCCH with HARQ-ACK feedback), PUCCH with HARQ-ACK feedback/PUSCH with HARQ-ACK feedback may have a higher priority over a PUSCH, aperiodic SRS/CSI feedback contained PUSCH/PUCCH may have higher priority over a data only PUSCH), a priority of an UL channel (e.g., a priority value is associated with each UL channel), and/or a cell index to where the wireless device may transmit an uplink channel (e.g., a UL channel to a lower index cell may have a higher priority over another UL to a higher index cell).

Figure 22:
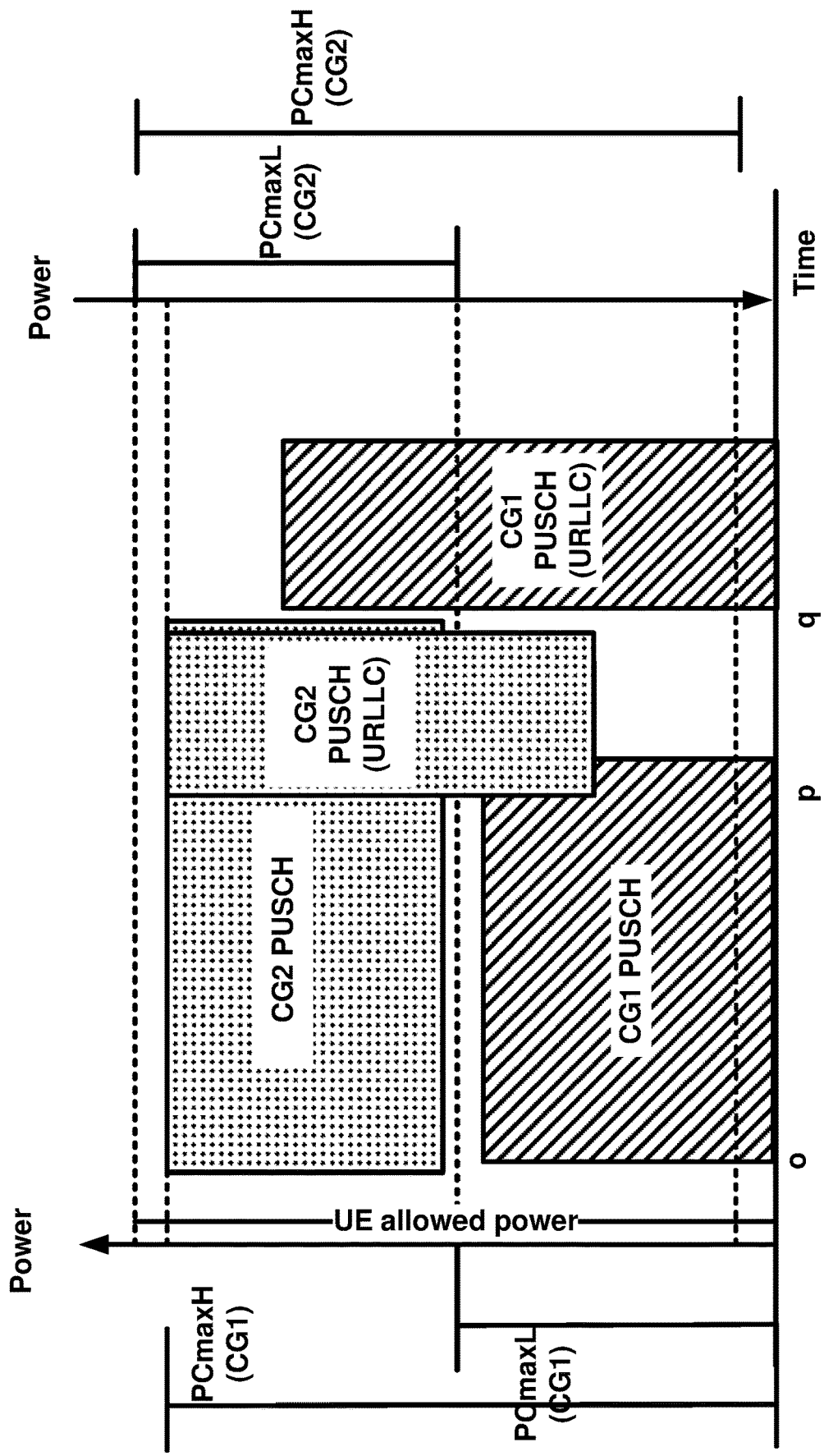
FIG. 22 is an example of embodiments.

FIG. 22 illustrates an example of a semi-static power sharing between two CGs. In an example, a first base station and/or a second base station may share a power based on a semi-static power split (e.g., PCmaxL (CG1)+PCmaxL (CG2)<=UE allowed power). A wireless device may allocate powers up to a first threshold (e.g. PCmaxL (CG1) for a first CG and may allocate powers up to a second threshold (e.g., PCmaxL (CG2) for a second CG for non-URLLC uplink transmissions. The first base station and/or the second base station may configure additional allowance or another threshold (e.g., PCmaxH (CG1) for the first CG, PCmaxH (CG2) for the second CG) that may be used for the URLLC UL services. The wireless device may apply the higher transmission power threshold for scheduling URLLC UL in the first CG.

For example, the wireless device may allocate a transmission power on CG2 PUSCH, and a transmission power of CG1 PUSCH at a time o as the transmission power of each channel is lower than a lower threshold of the CG. In response to receiving an URLLC PUSCH at a time p that requires higher power than the lower threshold of the second CG, the wireless device may allocate the transmission power on the CG2 PUSCH and reduce the power on CG1 PUSCH. In a time q, the wireless device may allocate a transmission power on CG1 PUSCH which is higher than the lower threshold of the CG1 (e.g., PCmaxL (CG1)).

A base station may transmit a PDCCH order via a DCI to trigger a PRACH transmission. The base station may allocate a dedicated sequence/preamble for the PRACH transmission. The base station may use a first PRACH format for the first service and use a second PRACH format for the second service. For example, the first PRACH format may be a long PRACH format to support a large coverage. For example, the second PRACH format may be a short PRACH format to support a low latency PRACH transmission. The base station may indicate a which PRACH format to use in PRACH transmission in the PDCCH order command. For example, the base station may use a first RNTI in the PDCCH order command to request PRACH transmission based on the first PRACH format. The base station may use a second RNTI in the PDCCH order command to request PRACH transmission based on the second PRACH format. For example, the base station may have a DCI field to indicate a PRACH format in the PRACH transmission. For example, the base station may use a first search space to schedule the PDCCH order based on the first PRACH format. The base station may use a second search space to schedule the PDCCH order based on the second PRACH format.

In response to receiving a PRACH format, the wireless device determines the PRACH format as indicated. For example, the first PRACH format may have a lower priority over the second PRACH format. The wireless device may drop the first PRACH based on the first PRACH format when the wireless device may have collision between the first PRACH and a second PRACH based on the second PRACH format. The wireless device may allocate a power up to the second transmission power threshold on the second PRACH of the CG1. The wireless device may allocate a power up to the first transmission power threshold on the first PRACH of the CG1. The first PRACH format may be the same as the second PRACH format. A PRACH for a beam failure recovery may be considered as a PRACH for the second service or a PRACH based on the second PRACH format. The PRACH for the beam failure recovery may have higher priority over another PRACH. In terms of priority of one or more PRACH transmissions, an order may be determined.

For example, a PRACH due to SR>a PRACH due to beam failure>a PRACH based on a PDCCH order>a PRACH due to other reasons may be used as the order. For example, a PRACH triggered due to SR failure may have a higher priority. In response to a first PRACH due to a first SR failure and a second PRACH due to a second SR failure collide, a priority between the first PRACH and the second PRACH may be determined based on a priority between the first SR and the second SR. The priority of the first SR and the second SR may be determined based on mapping of LCHs to the first SR and the second SR. A highest LCH priority mapped to a SR may determine the priority value of the SR. A SR with higher priority value is considered as a higher priority SR.

In an example, a PRACH for a two-step RACH procedure may be considered with a high priority over a PRACH for a four-step RACH procedure. For example, PRACHs may be ordered first based on a reason to trigger a RACH, and then, for a same reason PRACHs, may prioritize a RACH with two-step RACH and contention-based RACH (e.g., two-step PRACH with contention>two-step PRACH with contention-free>four-step PRACH with contention>four-step PRACH with contention-free, or two-step PRACH with contention>four-step PRACH with contention>two-step PRACH with contention-free>four-step PRACH with contention-free). For example, PRACHs may be ordered first based on two-step or four-step, based on contention and contention-free second, and based on a reason to trigger a RACH. For example, PRACHs may be ordered first based on contention and contention-free, based on two-step or four-step second, and based on a reason to trigger a RACH next. For example, PRACHs may be ordered first based on a reason to trigger a RACH, based on contention and contention-free second, and based on two-step or four-step next.

In an example, a wireless device may determine a priority/a priority class or a service associated with a SR transmission based on one or more following: a logical channel (LCH) mapping to the SR configuration: if there are more than one LCHs mapped to the SR, a LCH with a highest priority among the more than one LCHs (or a LCH with a lowest priority among the more than one LCHs) may be used to determine a priority or a service of the SR transmission; a periodicity of the SR configuration: for example, if the periodicity is less than a slot based on a numerology of the SR configuration or active UL BWP of the SR transmission, the SR configuration/transmission is considered as a high priority or associated with the second service. Otherwise, the SR configuration/transmission is considered as a low priority or associated with the first service; a priority explicitly configured in the SR configuration: a base station may configure a priority level/value used in the SR configuration. The wireless device may follow the configured/indicated priority level/value in determining a priority value of the SR.

In an example, a wireless device may determine a priority or a priority class or a service associated with a PUCCH transmission based on an uplink control information transmitted via a PUCCH. For example, the PUCCH transmission may carry beam failure indication(s), SR indication(s), HARQ-ACK feedback(s), periodic CSI feedback(s), aperiodic CSI feedback(s), and/or the like. Depending on the contents transmitted via the PUCCH, the priority may be determined. When the PUCCH carries more than one content, a content with a highest priority or a lowest priority may be used to determine the priority. In determining a priority/a priority class of the one content, in an example, the wireless device may use an explicitly configured priority/priority class for a resource indicated for the content. For example, in transmitting HARQ-ACK feedback(s), a PUCCH resource is dynamically or semi-statically indicated.

A base station may configure a priority of the PUCCH resource in one more RRC messages. The wireless device may use the configured priority of the PUCCH resource for the HARQ-ACK feedbacks. When the wireless device may use different resource for UCI multiplexing, the priority of each content may be determined based on an original PUCCH resource configuration before the multiplexing. For CSI feedbacks, the base station may configure a priority for a CSI-RS configuration or a CSI report configuration. The wireless device may determine the priority of the content based on the configuration. In an example, the wireless device may determine a priority of HARQ-ACK feedbacks based on one or more corresponding PDSCHs. For example, if the one or more corresponding PDSCHs are associated with a first service or a first RNTI, the HARQ-ACK feedbacks are considered as a first/low priority. If the one or more corresponding PDSCHs are associated with a second service or a second RNTI, the HARQ-ACK feedbacks are considered as a second/high priority. For CSI feedbacks, the wireless device may assume a low priority for a periodic CSI feedback, and may assume a high priority for a aperiodic CSI feedback unless the base station configures differently.

In an example, a wireless device may associate a priority with SRS. A base station may configure a priority value for a SRS resource/a SRS resource set configuration. When the priority value not configured in the SRS configuration, the wireless device may assume that a periodic SRS is associated with a low/first priority and a aperiodic SRS is associated with a high/second priority.

In an example, a wireless device may determine a priority of a PUSCH based on a content of the PUSCH and a RNTI/a priority associated with a configured grant resource and/or a scheduling DCI. For example, the wireless device may multiplex a first priority UCI content to a PUSCH with a second priority data (and vice versa (e.g., the second priority UCI content to the first priority PUSCH)). The wireless device may piggyback HARQ-ACK feedbacks associated with one or more URLLC PDSCHs on an eMBB PUSCH. When the wireless device may multiplex a first priority UCI to a second priority PUSCH, the wireless device may determine a priority of the PUSCH based on a higher priority value between the first priority and the second priority. In an example, the wireless device is not allowed to piggyback a first priority UCI content to a second priority PUSCH and vice versa. When the wireless device may not multiplex different priorities in a PUSCH, the priority of the PUSCH may be determined based on a priority of a data transmitted via the PUSCH. In the example, the wireless device may drop a lower priority uplink channel when the second priority PUCCH with the UCI may collide with the first priority PUSCH instead of piggybacking on the PUSCH, when the wireless device is not able transmit both. In an example, the wireless device is not allowed to piggyback a first priority UCI content to a second priority PUSCH but is allowed to piggyback the second priority UCI content to the first priority PUSCH. In the example, the first priority is assumed to be a lower priority than the second priority. The piggyback of the second priority UCI to the first priority PUSCH data may be allowed when the wireless device may allocate configured power(s) of the first priority PUSCH assuming a priority of PUSCH is the first priority.

In an example, based on a priority of an UL channel, an order of different UL channels in allocating a power within a cell group may be a PRACH with a high priority>a SR/PUCCH with HARQ-ACK feedback with a high priority>PUSCH with HARQ-ACK feedback with a high priority>PUSCH with a aperiodic CSI feedback with a high priority>a aperiodic SRS with a high priority>PUSCH with a periodic CSI feedback or a PUSCH with data only with a high priority>a periodic SRS with a high priority>a PRACH with a low priority>a SR/PUCCH with HARQ-ACK feedback with a low priority>PUSCH with HARQ-ACK feedback with a low priority>PUSCH with a aperiodic CSI feedback or a PUSCH with data only with a low priority>a aperiodic SRS with a low priority>PUSCH with a periodic CSI feedback with a low priority>a periodic SRS with a low priority>a PRACH for a secondary cell.

The wireless device determines a higher priority on a first UL channel with a high priority compared to a second UL channel with a low priority regardless of contents of the first UL channel and the second UL channel. In an example, an order of UL channels may be determined first based on a content of a UL channel. For UL channels with the same content, a priority value is used to determine the order. In an example, SRS may be treated differently (e.g., SRS transmission is deprioritized over other UL channels). For example, an order may be a PRACH with a high priority>a SR/PUCCH with HARQ-ACK feedback with a high priority>PUSCH with HARQ-ACK feedback with a high priority>PUSCH with a aperiodic CSI feedback with a high priority>PUSCH with a periodic CSI feedback or a PUSCH with data only with a high priority>a PRACH with a low priority>a SR/PUCCH with HARQ-ACK feedback with a low priority>PUSCH with HARQ-ACK feedback with a low priority>PUSCH with a aperiodic CSI feedback with a low priority>PUSCH with a periodic CSI feedback or a PUSCH with data only with a low priority>aperiodic SRS with a high priority>a aperiodic SRS with a low priority>a periodic SRS with a high priority>a periodic SRS with a low priority.

The PRACH of the PCell or the SPCell may be considered as a PRACH of the second service (e.g., a wireless device may allocate a power up to the second threshold or UE allowed power). The PRACH of the SCell or the SPCell is considered as a PRACH of the first service (e.g., a wireless device may allocate a power up to the first threshold or UE allowed power).

In an example, a wireless device may prioritize a PRACH transmission on a PCell or SPCell>PUCCH transmission with HARQ-ACK and/or SR or PUSCH transmission with HARQ-ACK information>PUCCH transmission with CSI or PUSCH transmission with CSI>PUSCH transmission without UCI>SRS transmission with aperiodic SRS>SRS transmission with semi-persistent and/or periodic and/or PRACH transmission for a SCell. In an example, a rule may be expanded for one or more priorities such that the wireless device may prioritize one or more UL channels with a high priority over one or more UL channels with a low priority. For example, an order may be PRACH transmission on a PCell or SPCell with the high priority>PUCCH transmission with HARQ-ACK and/or SR or PUSCH transmission with HARQ-ACK information with the high priority>PUCCH transmission with CSI or PUSCH transmission with CSI with the high priority>PUSCH transmission without UCI with high priority>SRS transmission with aperiodic SRS with the high priority>SRS transmission with semi-persistent and/or periodic with the high priority and/or PRACH transmission with the high priority for a SCell>PRACH transmission on a PCell or SPCell with the low priority>PUCCH transmission with HARQ-ACK and/or SR or PUSCH transmission with HARQ-ACK information with the low priority>PUCCH transmission with CSI or PUSCH transmission with CSI with the low priority>PUSCH transmission without UCI with high priority>SRS transmission with aperiodic SRS with the low priority>SRS transmission with semi-persistent and/or periodic with the low priority and/or PRACH transmission with the low priority for a SCell.

In an example, the wireless device may prioritize a plurality of uplink channels based on the following order: PRACH transmission on a PCell or SPCell>PUCCH transmission with HARQ-ACK and/or SR or PUSCH transmission with HARQ-ACK information with the high priority>PUCCH transmission with CSI or PUSCH transmission with CSI with the high priority>PUSCH transmission without UCI with high priority)>PUCCH transmission with HARQ-ACK and/or SR or PUSCH transmission with HARQ-ACK information with the low priority>PUCCH transmission with CSI or PUSCH transmission with CSI with the low priority>PUSCH transmission without UCI (with high priority)>SRS transmission with aperiodic SRS (with the low priority)>SRS transmission with semi-persistent and/or periodic (with the low priority) and/or PRACH transmission for a SCell.

For example, the order may be a PRACH with a high priority>a PRACH with a high priority>a SR/PUCCH with HARQ-ACK feedback with a high priority>a SR/PUCCH with HARQ-ACK feedback with a low priority>PUSCH with HARQ-ACK feedback with a high priority>PUSCH with HARQ-ACK feedback with a low priority>PUSCH with a aperiodic CSI feedback with a high priority>PUSCH with a aperiodic CSI feedback with a low priority>a aperiodic SRS with a high priority>a aperiodic SRS with a low priority>PUSCH with a periodic CSI feedback or a PUSCH with data only with a high priority>PUSCH with a periodic CSI feedback or a PUSCH with data only with a low priority>a periodic SRS with a high priority>a periodic SRS with a low priority.

In an example, an order among multiple UL channels in a carrier is determined based on priority values of the multiple UL channels (e.g., a high priority UL channel is prioritized) first, and then determined based on contents of the multiple channels. The order of second multiple channels across carriers in a carrier group is determined first based on the contents of the second multiple channels first, then is determined based on priority values of the second multiple channels for the same content channels. In an example, an order based on priority values firstly and contents secondly is used for multiple UL channels in a carrier. Then an order based on contents firstly and priority secondly values is used for multiple UL channels across carriers in a cell group.

In determining an order for power determination in a cell group, a wireless device may prioritize of an uplink channel when the uplink channel is already being transmitted or the power on the uplink channel has been already allocated. The wireless device may place the uplink channel at first among uplink channels with a same priority. For example, if the wireless device has allocated a power on a first PUSCH for eMBB, the wireless device may prioritize the first PUSCH for eMBB over a PRACH with a low priority.

In an example, a wireless device may determine a first UL channel for a first CG and a second UL channel for a second CG. The first UL channel may be a first UL channel for the first CG based on the ordering. The second UL channel may be a first UL channel for the second CG based on the ordering. The wireless device may apply a second transmission power threshold of the first CG for the first UL channel if a configured power of the first UL is larger than a first threshold of the first CG and a priority value of the first UL channel is a high priority. The wireless device may apply a second transmission power threshold of the second CG for the second UL channel if a configured power of the second UL is larger than a first threshold of the second CG and a priority value of the second UL channel is a high priority.

A determined threshold is applied power determined within a CG. Based on a first ordered UL channels of a first CG and a second ordered UL channels of a second CG based on an ordering within a CG, a wireless device may determine ordering of sum of the first ordered UL channels and the second ordered UL channels. The ordering rule may follow a same rule within a CG. When a first channel from the first CG and the second channel from the second CG may have a same priority/order based on the rule, the wireless device may assume the first CG channel has higher priority or placed in earlier order. Or, an earlier transmission (e.g., a starting OFDM symbol is faster) may be determined for the earlier order. In an example, ordering across CGs may apply when a wireless device may support dynamic power sharing across CGs.

In an example, a wireless device may not support dynamic power sharing across CGs. A base station may configure a first transmission power threshold and a second transmission power threshold for a first CG. The wireless device may determine whether to use the first transmission power threshold or the second transmission power threshold as specified in the specification. When the wireless device determines to use the second transmission power threshold for the first CG, the wireless device may drop one or more uplink channels for a second CG. In an example, a wireless device may not support dynamic power sharing across CGs.

A first base station or a second base station may configure a first transmission power threshold and a second transmission power threshold for a first CG. The first base station or the second base station may configure a first set of slots where the first transmission power threshold is applied. The base station may configure a second set of slots where the second transmission power threshold is applied. The first base station or the second base station may configure a first transmission power threshold and a second transmission power threshold for a second CG. The first base station or the second base station may configure a first set of slots where the first transmission power threshold is applied for the second CG. The base station may configure a second set of slots where the second transmission power threshold is applied for the second CG. The base stations configure transmission power threshold values and set of slots such that a sum of a threshold of the CG and another threshold of the second CG in a slot does not exceed UE allowed power. The wireless device may apply different threshold value based on the first set of slots and the second set of slots for the CG. The wireless device may apply different threshold value based on the first set of slots and the second set of slots for the second CG.

In an example, more than one LCH may be mapped to a PUSCH or a PDSCH, a wireless device may determine a priority or a priority class of the PUSCH or the PDSCH based on a highest priority of the mapped LCH, based on a highest priority of actually transmitted payload, based on a lowest priority of the mapped LCH, based on a lowest priority of actually transmitted payload, based on a RNTI of a scheduling DCI scheduling the PUSCH or the PDSCH, or based on RRC configuration of a configured grant for the PUSCH or a SPS configuration for the PDSCH. For example, a MAC layer may indicate a priority class of a uplink channel based on a data transmitted via the uplink channel. For example, based on a RNTI of a DCI scheduling an uplink channel, a priority class of the uplink channel may be determined. For example, based on a RNTI of a DCI scheduling a PDSCH, a priority class of a PUCCH carrying HARQ-ACK feedback of the PDSCH may be determined. For example, based on one or more DCI fields of a scheduling DCI of an uplink channel or a DCI indicating an uplink channel (e.g., a DCI scheduling a PDSCH indicating a PUCCH transmission for HARQ feedback), a wireless device may determine a priority class of the uplink channel. For example, based on one or more RRC configurations, a wireless device may determine a priority class of an uplink channel (e.g., a priority class configured for a configured grant configuration).

In an example, a base station may configure a RNTI used for a retransmission of a configured grant resource or a SPS. The base station may configure a first RNTI for a first priority. The base station may configure a second RNTI for a second priority. Based on the configured RNTI, a wireless device may determine a priority of the configured grant resource or the SPS. In an example, a base station may configure a priority on a configured grant or a SPS. The wireless device may apply the configured priority in utilizing the configured grant or the SPS. In an example, a wireless device may determine a priority based on a periodicity and/or a duration and/or a repetition factor of a configured grant configuration or a SPS configuration. For example, the wireless device may determine a high priority for the configured grant or the SPS with shorter periodicity than K slot (e.g., K=1), or with less than M OFDM symbols (e.g., M=4), or with more than P repetitions (e.g., P=2).

A configured priority or priority class (e.g., based on a RNTI or based on an explicit priority value) may be used in determining mapping one or more LCHs to the configured grant or the SPS. The configured priority may be used in determining multiplexing one or more UCIs (e.g., HARQ-ACK, SR, CSI) in a PUSCH transmission based on the configured grant.

In an example, a wireless device may drop a PRACH transmission when a configured power for the PRACH has not been allocated due to power scaling (where the configured power for the PRACH is equal to or smaller than a UE allowed power). In an example, a wireless device may drop SRS when a configured power for the SRS has not been allocated due to power scaling (where the configured power for the SRS is equal to or smaller than a UE allowed power). In an example, a wireless device may reduce a power or drop a UL channel if a configured power has not been allocated due to power scaling.

In an example, a wireless device may multiplex a first priority of UCI (e.g., HARQ-ACK feedback) to a second priority PUSCH. For example, the wireless device may transmit the first priority of UCI piggybacked on a first priority PUSCH. The wireless device may need to reduce a power or drop the first priority PUSCH. To minimize dropping or performance degradation of the UCI, the wireless device may multiplex the first priority UCI in the second priority PUSCH. The wireless device may allocate more power to transmit the first priority UCI with the second priority PUSCH. In an example, a wireless device may multiplex a first priority of UCI (e.g., HARQ-ACK feedback) to a second priority PUCCH. For example, the wireless device may transmit the first priority of UCI piggybacked on a first priority PUCCH. The wireless device may need to reduce a power or drop the first priority PUCCH. To minimize dropping or performance degradation of the UCI, the wireless device may multiplex the first priority UCI in the second priority PUCCH. The wireless device may allocate more power to transmit the first priority UCI with the second priority PUCCH. In an example, a wireless device may transmit a PUCCH for a first priority UCI in response to dropping a first priority PUSCH where the first priority UCI was going to be piggybacked due to power scaling. The wireless device may fall back to the PUCCH transmission (e.g., no piggybacking on a PUSCH if a power on the PUSCH is not enough). The wireless device may not perform a piggybacking operation on a PUSCH when the wireless device may not allocate a configured power for the PUSCH due to power scaling.

In an example, a first base station or a second base station may configure a first transmission power threshold is used for a configured resource or a second transmission power threshold is used for the configured resource. Similarly, the first base station or the second base station may configure the first transmission power threshold or the second transmission power threshold used for a PUSCH scheduled by an UL grant based on a RNTI (e.g., C-RNTI uses the first transmission power threshold and a new URLLC-RNTI uses the second power threshold). A wireless device may be configured with a transmission power threshold assumed in a resource pool used for a sidelink operation.

FIG. 22 illustrates an example of RRC messages comprising a parameter of allowance (e.g., additional-Allowance). A wireless device may receive the RRC messages for a CG. In an example, a first base station or a second base station may configure a p-NR-FR1 that is a first transmission power threshold of the CG. The first base station or the second base station may configure an additional-allowance where a sum of the p-NR-FR1 and the additional-allowance may determine a second power threshold. The wireless device may apply the first transmission power threshold for one or more uplink channels for a first service. The wireless device may apply the second transmission power threshold for one or more uplink channels associated with the first service and/or a second service based on one more determining conditions specified in the specification.

In an example, a wireless device may prioritize a PRACH transmission on a PCell or SPCell>PUCCH transmission with HARQ-ACK and/or SR or PUSCH transmission with HARQ-ACK information>PUCCH transmission with CSI or PUSCH transmission with CSI>PUSCH transmission without UCI>SRS transmission with aperiodic SRS>SRS transmission with semi-persistent and/or periodic and/or PRACH transmission for a SCell. In an example, a rule may be expanded for one or more priorities such that the wireless device may prioritize one or more UL channels with a high priority over one or more UL channels with a low priority. For example, an order may be PRACH transmission on a PCell or SPCell with the high priority>PUCCH transmission with HARQ-ACK and/or SR or PUSCH transmission with HARQ-ACK information with the high priority>PUCCH transmission with CSI or PUSCH transmission with CSI with the high priority>PUSCH transmission without UCI with high priority>SRS transmission with aperiodic SRS with the high priority>SRS transmission with semi-persistent and/or periodic with the high priority and/or PRACH transmission with the high priority for a SCell>PRACH transmission on a PCell or SPCell with the low priority>PUCCH transmission with HARQ-ACK and/or SR or PUSCH transmission with HARQ-ACK information with the low priority>PUCCH transmission with CSI or PUSCH transmission with CSI with the low priority>PUSCH transmission without UCI with high priority>SRS transmission with aperiodic SRS with the low priority>SRS transmission with semi-persistent and/or periodic with the low priority and/or PRACH transmission with the low priority for a SCell.

In an example, the wireless device may prioritize a plurality of uplink channels based on the following order: PRACH transmission on a PCell or SPCell>PUCCH transmission with HARQ-ACK and/or SR or PUSCH transmission with HARQ-ACK information with the high priority>PUCCH transmission with CSI or PUSCH transmission with CSI with the high priority>PUSCH transmission without UCI with high priority)>PUCCH transmission with HARQ-ACK and/or SR or PUSCH transmission with HARQ-ACK information with the low priority>PUCCH transmission with CSI or PUSCH transmission with CSI with the low priority>PUSCH transmission without UCI (with high priority)>SRS transmission with aperiodic SRS (with the low priority)>SRS transmission with semi-persistent and/or periodic (with the low priority) and/or PRACH transmission for a SCell.

In an example, a wireless device may determine an order based on a type of UL channel (e.g., PRACH, PUCCH, PUSCH) and then a priority (or a priority class). For example, an order may be PRACH transmission on a PCell or SPCell with the high priority>PRACH transmission on a PCell or SPCell with the low priority>PUCCH transmission with HARQ-ACK and/or SR or PUSCH transmission with HARQ-ACK information with the high priority>PUCCH transmission with HARQ-ACK and/or SR or PUSCH transmission with HARQ-ACK information with the low priority>PUCCH transmission with CSI or PUSCH transmission with CSI>PUSCH transmission without UCI with the high priority>PUCCH transmission with CSI or PUSCH transmission with CSI>PUSCH transmission without UCI with the low priority>SRS transmission with aperiodic SRS>SRS transmission with semi-persistent and/or periodic and/or PRACH transmission for a SCell with the high priority>SRS transmission with aperiodic SRS>SRS transmission with semi-persistent and/or periodic and/or PRACH transmission for a SCell with the low priority.

In case of a same priority order and for operation with aggregation, a wireless device may prioritize power allocation for transmissions on the primary cell of a first CG (e.g., MCG) or a second CG (e.g., SCG) over transmissions on a secondary cell. The wireless device may prioritize power allocation for transmissions on the PCell over transmissions on the PSCell. In case of same priority order and for operation with two UL carriers of a cell, the wireless device may prioritize power allocation for transmissions on the carrier where the UE is configured to transmit PUCCH. If PUCCH is not configured for any of the two UL carriers of the cell, the wireless device may prioritize power allocation for transmissions on the non-supplementary UL carrier of the cell.

In an example, a wireless device may be associated with a MCG using E-UTRA radio access and a SCG using NR radio access. A first base station or a second base station may configure one or more RRC messages comprising a first transmission power threshold (PLTE) for the transmission on the MCG (e.g., p-MaxEUTRA). The first base station or the second base station may configure one or more RRC messages comprising a first transmission power threshold ($P_{NR}$) for the transmission in frequency range 1 (e.g., FR1) on the SCG (e.g., p-NR). The one or more RRC messages may comprise an additional-Allowance where a sum of the additional-Allowance and the first threshold of the SCG may determine a second power threshold. The wireless device may determine powers on one or more uplink channels in a CG based on an order rule described in the specification.

When a sum of the first transmission power threshold of the MCG and the second transmission power threshold of the SCG exceeds a UE allowed power, allowed in a frequency range 1 (e.g., p-UE-FR1), the wireless device may determine a transmission power for the SCG based on:

If the wireless device may have received a configuration of a reference TDD configuration for E-UTRA (LTE, e.g., tdm-patternConfig-r15), the wireless device may drop one or more uplink channels in a slot for the SCG when a corresponding subframe on the MCG is an UL subframe based on the reference TDD configuration, where the corresponding subframe on the MCG is the corresponding subframe of the MCG to the slot for SCG, in response to the wireless device does not support dynamic power sharing between LTE and NR. The wireless device may determine powers on one or more uplink channels in a second slot for the SCG when a corresponding subframe on the MCG is not an UL subframe based on the reference TDD configuration, based on the first transmission power threshold or the second transmission power threshold of the SCG, in response to the wireless device does not support dynamic power sharing between LTE and NR. The wireless device may apply the first transmission power threshold of the SCG when the one or more uplink channels are associated with a first service or a low priority (e.g., eMBB traffic). The wireless device may apply the second transmission power threshold of the SCG when at least one UL channels are associated with a second service or a high priority (e.g., URLLC traffic).

When the wireless device supports dynamic power sharing between LTE and NR for EN-DC, the wireless device may reduce transmission power of one or more uplink channels of SCG in a slot that overlaps with a corresponding subframe of the MCG to satisfy a sum of an allocated transmission power on the MCG in the subframe and an allocated transmission power on SCG in the slot is lower than the UE allowed power.

In response to reducing the allocated transmission power on SCG more than XSCALE, the wireless device may drop the one more uplink channels of SCG. The wireless device may not reduce a configured power on a UL channel from the one or more uplink channels, when the UL channel is associated with a second service or associated with a high priority. The configured power of the UL channel is limited by the second transmission power threshold of the SCG. If a sum of configured powers across the MCG and the SCG exceeds the UE allowed power with not scaling the configured power on the UL channel, the wireless device may drop one or more second UL channels on the corresponding subframe of the MCG or reduce powers on the one or more second UL channels.

In an example, a wireless device may be associated with a MCG using NR radio access and a SCG using E-UTRA radio access. A first base station or a second base station may configure a first transmission power threshold for the MCG (e.g., p-NR). The first base station or the second base station may configure a first transmission power threshold for the SCG (e.g., p-EUTRA). When the wireless device does not receive a TDD-UL-DL-ConfigurationCommon for the MCG, the wireless device may determine a transmission power for the SCG using the first transmission power threshold for the SCG. When the wireless device receives the TDD-UL-DL-ConfigurationCommon for the MCG, the wireless device determines the power of the SCG based on:

If at least one OFDM symbol of a slot of the MCG that is indicated as uplink or flexible by the TDD-UL-DL-ConfigurationCommon or the TDD-UL-DL-ConfigDedicated overlaps with a subframe of the SCG, the wireless device may determine transmission powers of one or more UL channels of the subframe based on the first threshold of the SCG.

In other cases, the wireless device may determine the transmission powers of the one or more UL channels of the subframe based on a UE allowed power.

The one or more RRC messages may comprise an additional-Allowance where a sum of the additional-Allowance and the first threshold of the MCG may determine a second power threshold. The wireless device may determine powers on one or more uplink channels in a CG based on an order rule described in the specification. When a sum of the first transmission power threshold of the MCG and the second transmission power threshold of the SCG exceeds a UE allowed power, allowed in a frequency range 1 (e.g., p-UE-FR1), the wireless device may determine a transmission power for the SCG based on:

If the wireless device may have received a configuration of a reference TDD configuration for E-UTRA (LTE, e.g., tdm-patternConfig-r15) for the SCG, the wireless device may drop one or more uplink channels in a slot for the MCG when a corresponding subframe on the SCG is an UL subframe based on the reference TDD configuration, where the corresponding subframe on the SCG is the corresponding subframe of the SCG to the slot for MCG, in response to the wireless device does not support dynamic power sharing between LTE and NR. The wireless device may determine powers on one or more uplink channels in a second slot for the MCG when a corresponding subframe on the SCG is not an UL subframe based on the reference TDD configuration, based on the first transmission power threshold or the second transmission power threshold of the MCG, in response to the wireless device does not support dynamic power sharing between LTE and NR. The wireless device may apply the first transmission power threshold of the MCG when the one or more uplink channels are associated with a first service or a low priority (e.g., eMBB traffic). The wireless device may apply the second transmission power threshold of the MCG when at least one UL channels are associated with a second service or a high priority (e.g., URLLC traffic).

When the wireless device supports dynamic power sharing between LTE and NR for EN-DC, the wireless device may reduce transmission power of one or more uplink channels of MCG in a slot that overlaps with a corresponding subframe of the SCG to satisfy a sum of an allocated transmission power on the SCG in the subframe and an allocated transmission power on MCG in the slot is lower than the UE allowed power.

In response to reducing the allocated transmission power on MCG more than XSCALE, the wireless device may drop the one more uplink channels of MCG. The wireless device may not reduce a configured power on a UL channel from the one or more uplink channels, when the UL channel is associated with a second service or associated with a high priority. The configured power of the UL channel is limited by the second transmission power threshold of the MCG. If a sum of configured powers across the MCG and the SCG exceeds the UE allowed power with not scaling the configured power on the UL channel, the wireless device may drop one or more second UL channels on the corresponding subframe of the SCG or reduce powers on the one or more second UL channels.

Figure 24:
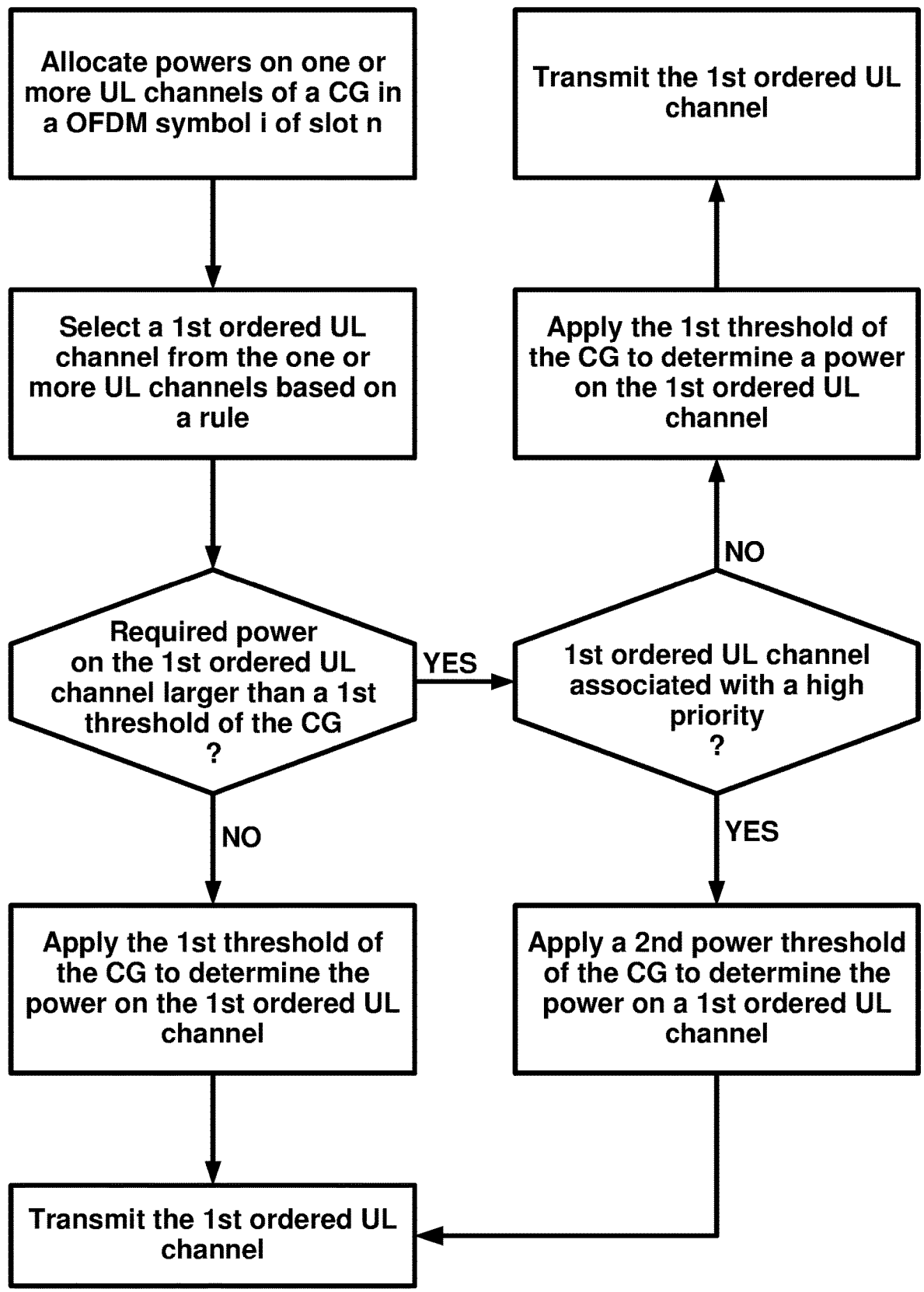
FIG. 24 is a flow diagram of an aspect of an example embodiment of the present disclosure.

FIG. 24 illustrates a flow diagram of a power determination. A wireless device may determine powers on one or more uplink channels of a CG at a time (e.g., a OFDM symbol i of a slot n). The wireless device may select a first uplink channel which is a first ordered UL channel from the one or more uplink channels based on the priority rule(s). The wireless device may apply a second transmission power threshold in determining a power on the first uplink channel when a transmission power of the first ordered UL channel (e.g., the first uplink channel) is higher than a first threshold of the CG and the first uplink channel is associated with a high priority. The wireless device may apply a first transmission power threshold in determining a power on the first uplink channel otherwise. The wireless device may transmit the first uplink channel based on the determined power.

Figure 25:
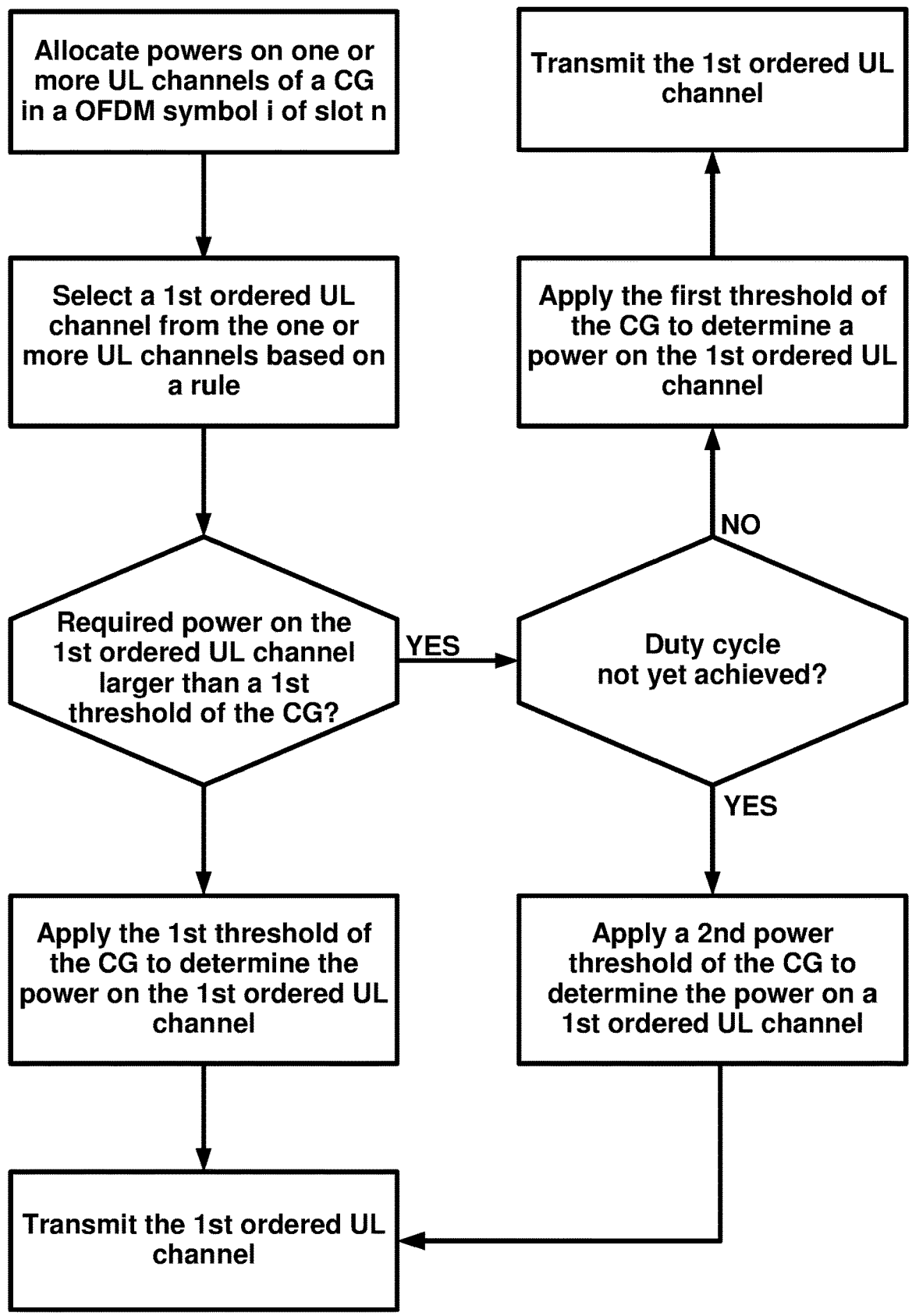
FIG. 25 is a flow diagram of an aspect of an example embodiment of the present disclosure.

FIG. 25 illustrates a flow diagram of a power determination. A wireless device may determine powers on one or more uplink channels of a CG at a time (e.g., a OFDM symbol i of a slot n). The wireless device may select a first uplink channel which is a first ordered UL channel from the one or more uplink channels based on the priority rule(s). The wireless device may apply a second transmission power threshold in determining a power on the first uplink channel when a transmission power of the first ordered UL channel (e.g., the first uplink channel) is higher than a first threshold of the CG and a configured duty cycle has not been reached (e.g., a high power than the first threshold has been used less than the configured duty cycle). The wireless device may apply a first transmission power threshold in determining a power on the first uplink channel otherwise. The wireless device may transmit the first uplink channel based on the determined power.

A wireless device may receive one or more radio resource control (RRC) messages. The one or more RRC messages may indicate a first transmission power threshold of a first cell group and a second transmission power threshold of the first cell group. The wireless device may determine powers for one or more uplink channels of the first cell group based on an order. The wireless device may determine a first uplink channel which is a first ordered UL channel among the one or more uplink channels based on the order. The wireless device may select one or the first transmission power threshold and the second transmission power threshold based on a priority class of the first uplink channel. For example, the wireless device may select the first transmission power threshold when the priority class of the first uplink channel is a first priority. For example, the wireless device may select the second transmission power threshold when the priority class of the first uplink channel is a second priority. The wireless device may determine a transmission power for the first uplink channel based on one or more power parameters, a pathloss, a scheduling DCI for the first uplink channel (if available) or a configured grant configuration corresponding to the first uplink channel, and the selected power threshold. The wireless device may transmit the first uplink channel with the determined transmission power.

The wireless device may determine the priority class of the first uplink channel based on an RNTI corresponding to a DCI scheduling the first uplink channel. The wireless device may determine the priority class of the first uplink channel based on a DCI scheduling the first uplink channel. The wireless device may determine the priority class of the first uplink channel based on a priority of logical channel corresponding to data transmitted via the first uplink channel.

The one or more RRC messages may comprise configuration parameters of a plurality of cells that are grouped into a plurality of cell groups (CGs). The plurality of cell groups may comprise a first cell group for communication via a first base station. The plurality of cell groups may comprise a second cell group for communication via a second base station. The wireless device may allocate powers based on the order for the CG. The wireless device may allocate a power on the first uplink channel before allocating powers on other channels at a given time.

The one or more RRC messages may indicate a duty cycle for the CG. The wireless device may select the second transmission power threshold based on the duty cycle in additional to other conditions. For example, a duty cycle is a ratio determined by dividing a time duration when a transmission power of the first cell group is larger than the first threshold by a time duration when one or more uplink transmissions occur for the first cell group.

The wireless device may select the second transmission power threshold based on the priority class of the first uplink channel where the priority class of the first uplink channel is a high priority or the first uplink channel is associated with a URLLC service. Further it is based on a configured/requested/transmission power on the first uplink channel based on one or more power control parameters and the duty cycle.

One or more second RRC messages may indicate a third transmission power threshold of a second cell group. The wireless device may determine a second power value of a second uplink channel of the second cell group based on the determined transmission power of the first uplink channel of the first cell group, one or more second power control parameters for a second cell, and the third transmission power threshold of the second cell group. The wireless device may determine a second configured/requested/transmission power level of the second uplink channel based on the one or more power control parameters of the second cell where the second uplink channel is being transmitted and transmission power control (TPC), and scheduled resource allocations of the second uplink channel. The wireless device may determine the second power value based on at least a lower value between the second configured power level and a remaining power. The wireless device may determine the remaining power based on at least a UE allowed power, a power class and/or the first power value of the first uplink channel.

A first priority class may indicate that an uplink channel is supported with a first quality of service requirements. In the example, the first uplink channel is associated with a second priority and the second uplink channel is associated with a first priority.

The wireless device may determine a configured power of the first uplink channel based on the one or more power control parameters, transmission power control, and scheduled resource allocations of the first uplink channel. The wireless device may determine the transmission power based on at least a lower value between the configured power and the second transmission power threshold of the first cell group, in response to the first uplink channel is indicated as the second priority class and the configured power may exceed the first transmission power threshold of the first cell group. The wireless device may determine the transmission power based on at least a lower value between the configured power and the first transmission power threshold of the first cell group otherwise. The first transmission power threshold and the second transmission power threshold of the first cell group is equal to or lower than the UE allowed power. The one or more RRC messages may comprise a first transmission power threshold and a second transmission power threshold of a CG via RRC signaling. The one or more RRC messages may comprise a first transmission power threshold and an allowance parameter, wherein a second transmission power threshold of a CG is determined based on a sum of the first transmission power threshold and the allowance parameter.

A wireless device may receive one or more radio resource control (RRC) messages. The one or more RRC messages may indicate a first transmission power threshold of a first cell group, a second transmission power threshold of the first cell group and a duty cycle. The wireless device may determine powers for one or more uplink channels of the first cell group based on an order. The wireless device may select a first uplink channel which is a first ordered UL channel among the one or more uplink channels based on the order. The wireless device may select one or the first transmission power threshold and the second transmission power threshold based on a priority class of the first uplink channel and the duty cycle. For example, the wireless device may select the first transmission power threshold when the priority class of the first uplink channel is a first priority or duty cycle is exceeded. For example, the wireless device may select the second transmission power threshold when the priority class of the first uplink channel is a second priority and the duty cycle has not been exceeded. The wireless device may determine a transmission power for the first uplink channel based on one or more power parameters, a pathloss, a scheduling DCI for the first uplink channel (if available) or a configured grant configuration corresponding to the first uplink channel, and the selected power threshold. The wireless device may transmit the first uplink channel with the determined transmission power.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 26 is a flow diagram as per an aspect of an example embodiment of the present disclosure. At 2610, a wireless device may determine transmission powers of uplink channels based on the following order of power priorities: a physical random access channel (PRACH) of a primary cell; an uplink channel comprising first information with a first priority; the uplink channel comprising second information with a second priority that is lower than the first priority; and a PRACH of a secondary cell. At 2620, the wireless device may transmit, via the uplink channels, uplink signals with the determined transmission powers.

According to an example embodiment, the uplink channel may be a physical uplink control channel (PUCCH). According to an example embodiment, the first information may comprise a scheduling request (SR) with the first priority and HARQ feedback with the second priority; or the SR with the second priority and the HARQ feedback with the first priority. The wireless device may determine a priority of the first information based on a higher priority between the first priority and the second priority. According to an example embodiment, the wireless device may drop the HARQ feedback when the HARQ feedback is associated with the second priority and the SR is associated with the first priority. The wireless device may receive one or more radio resource control (RRC) messages comprising configuration parameters of a SR configuration indicating a priority value. For example, the priority value indicates the first priority or the second priority.

According to an example embodiment, the uplink channel may be a physical uplink shared channel (PUSCH). For example, the first information may comprise uplink control information (UCI) with the first priority and data with the second priority; or the UCI with the second priority and data with the first priority. The wireless device may determine a priority of the first information based on a higher priority between the first priority and the second priority. According to an example embodiment, the wireless device may drop the UCI when the UCI is associated with the second priority and the data is associated with the first priority.

According to an example embodiment, the uplink channel may be a sounding reference signal (SRS). According to an example embodiment, the wireless device may receive one or more radio resource control (RRC) messages indicating a priority associated with an SRS configuration for the uplink channel.

According to an example embodiment, the uplink channel is for a third cell of a cell group. The primary cell and the secondary cell belong to the cell group.

According to an example embodiment, the primary cell belongs to a first cell group. The uplink channels may be transmitted for one or more cells of the first cell group.

According to an example embodiment, the primary cell may belong to a second cell group. The uplink channels may be transmitted for one or more cells of the second cell group.

According to an example embodiment, a second uplink channel is associated with a first service in response to the second uplink channel with the first priority. For example, the first service is an ultra-reliable and low latency communication (URLLC) service.

According to an example embodiment, a second uplink channel is associated with a second service in response to the second uplink channel with the second priority. For example, the second service is an enhanced mobile broadband (eMBB) service.

According to an example embodiment, the wireless device may further determine transmission powers of second uplink channels based on the following order of power priorities: the PRACH of the primary cell; a PUSCH comprising data. The PUSCH does not comprise HARQ feedback, with the first priority; a PUCCH comprising HARQ feedback with the second priority; and the PRACH of the secondary cell.

According to an example embodiment, the wireless device may further determine transmission powers of second uplink channels based on the following order of power priorities: the PRACH of the primary cell; a PUSCH comprising data with the first priority. The PUSCH may not comprise HARQ feedback and may not comprise channel state information (CSI) feedback; a PUCCH comprising CSI feedback with the second priority; and the PRACH of the secondary cell.

According to an example embodiment, the wireless device may further determine transmission powers of second uplink channels based on the following order of power priorities: the PRACH of the primary cell; a PUCCH or a PUSCH comprising HARQ feedback with the first priority; a PUCCH comprising CSI feedback with the first priority; a PUSCH comprising data with the first priority. The PUSCH may not comprise HARQ feedback and does not CSI feedback; the PUCCH or the PUSCH comprising HARQ feedback with the second priority; the PUCCH comprising CSI feedback with the second priority; the PUSCH comprising data with the second priority. The PUSCH may not comprise HARQ feedback and may not comprise channel state information (CSI) feedback; and a SRS or the PRACH of the secondary cell.

In an example, a wireless device may determine transmission powers of uplink channels based on the following order of power priorities: first, a physical random access channel (PRACH) of a primary cell; second, an uplink channel comprising first information with a first priority; third, the uplink channel comprising second information with a second priority that is lower than the first priority; and fourth, a PRACH of a secondary cell. The wireless device may transmit, via the uplink channels, uplink signals with the transmission power.

Figure 27:
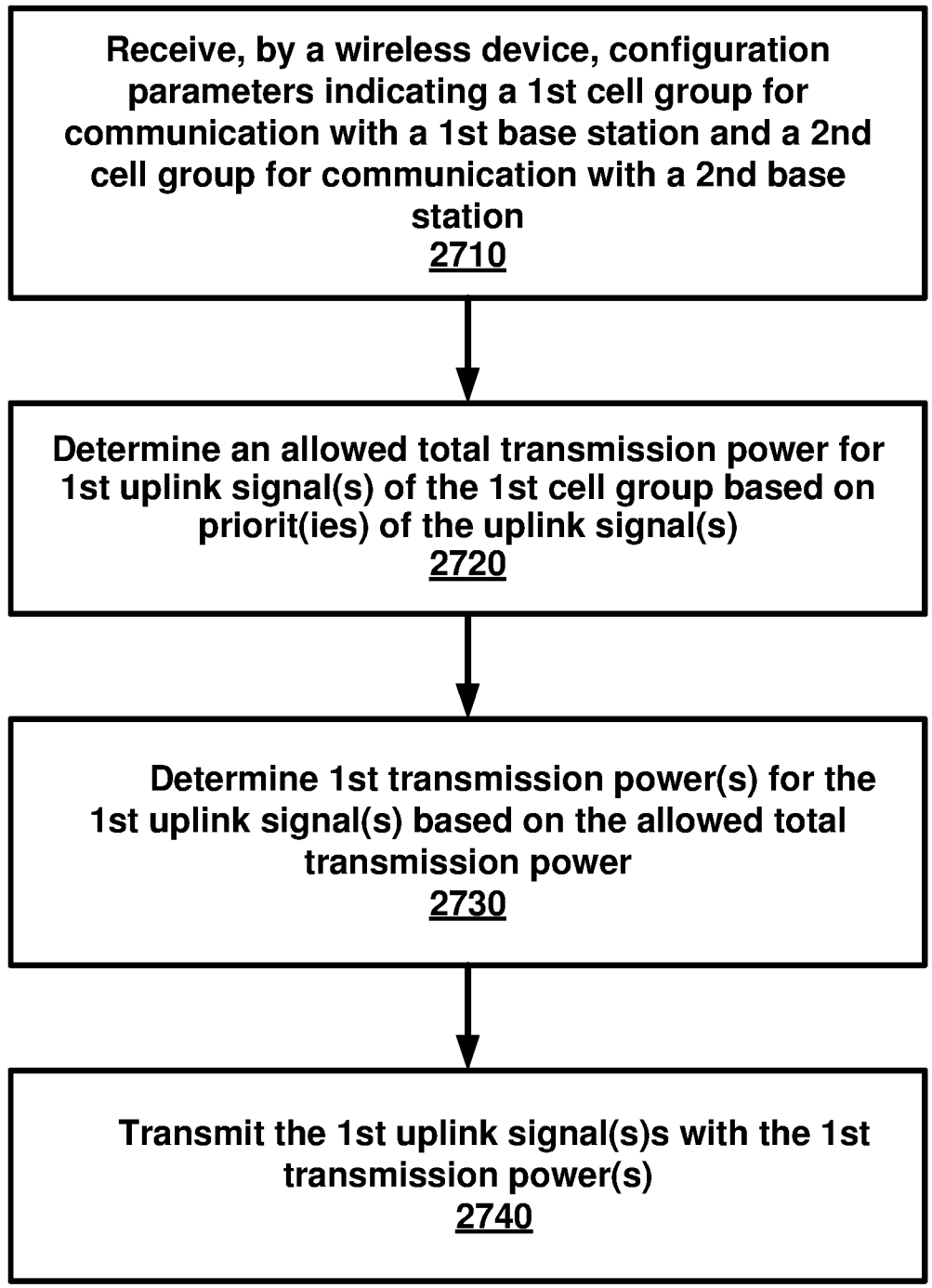
FIG. 27 is a flow diagram of an aspect of an example embodiment of the present disclosure.

FIG. 27 is a flow diagram as per an aspect of an example embodiment of the present disclosure. At 2710, a wireless device may receive configuration parameters indicating a first cell group for communication with a first base station and a second cell group for communication with a second base station. At 2720, the wireless device may determine an allowed total transmission power for at least one first uplink signal of the first cell group based on at least one priority of at least one uplink signal. At 2730, the wireless device may determine at least one first transmission power for the one or more first uplink signal based on the allowed total transmission power. At 2740, the wireless device may transmit the at least one first uplink signals with the at least one first transmission power.

According to an example embodiment, the configuration parameters may further indicate: a first maximum transmission power threshold of the first cell group; and a second maximum transmission power threshold of the first cell group. For example, the first maximum transmission power threshold may be associated with a first priority. For example, the second maximum transmission power threshold may be associated with a second priority. For example, the second priority is higher than the first priority. The configuration parameters may comprise the first maximum transmission power threshold of the first cell group and a power allowance for the first cell group. The wireless device may determine the second maximum transmission power threshold of the first cell group based on the first maximum transmission power threshold and the power allowance. According to an example embodiment, the second maximum transmission power threshold may be a sum of the first maximum transmission power threshold and the power allowance.

According to an example embodiment, the wireless device may select as the allowed total transmission power of the first cell group, based on the at least one priority of the at least one uplink signal, the first maximum transmission power threshold; or the second maximum transmission power threshold. According to an example embodiment, the selecting may select the first maximum transmission power threshold in response to: a configured transmission power of the at least one uplink signal being equal to or lower than the first maximum transmission power threshold; or the at least one uplink signal being associated with the first priority. According to an example embodiment, the selecting may select the second maximum transmission power threshold in response to: a configured transmission power of the at least one uplink signal being higher than the first maximum transmission power threshold; and the at least one priority of the at least one uplink signal being the first priority.

According to an example embodiment, one or more uplink transmissions of the first cell group may comprise a first uplink transmission. The one or more uplink transmissions are used for transmitting the at least one first uplink signal. The first uplink transmission may be used for transmitting the at least one uplink signal. The one or more uplink transmissions may be scheduled in a slot of the first cell group. According to an example embodiment, the wireless device may select the first uplink transmission of the one or more uplink transmissions based on a priority of the first uplink transmission and one or more priority of the one or more uplink transmissions. For example, the priority of the first uplink transmission may be higher than or equal to a priority of a second uplink transmission of the one or more uplink transmissions. According to an example embodiment, the priority of the first uplink transmission may be determined based on the at least one priority of the at least one uplink signal. For example, the wireless device may determine power priorities among the one or more uplink transmissions based on the one or more priorities. In an example, an uplink transmission with a higher priority may have a higher power priority. According to an example embodiment, the determining power priorities may be further based on information carried in an uplink transmission. For example, a scheduling request (SR)/hybrid automatic repeat request (HARD) feedback may have higher power priority over channel state information (CSI) feedback. For example, channel state information (CSI) may have higher power priority over data and data has higher power priority over a sounding reference signal (SRS). According to an example embodiment, the at least one priority of the at least one uplink signal may be determined based on a priority parameter configured for a configured grant configuration. For example, the wireless device may use a resource of the configured grant configuration for transmitting the at least one uplink signal. According to an example embodiment, the at least one priority of the at least one uplink signal may be determined based on a downlink control information (DCI) field of a DCI scheduling a resource for the at least one uplink signal. For example, the DCI field indicate a priority parameter for the at least one uplink signal.

According to an example embodiment, the wireless device may determine at least one second transmission power for at least one second uplink signal of the second cell group based on: the at least one first transmission power; or based on the allowed total transmission power of the first cell group. According to an example embodiment, the determining the at least one second transmission power may be based on the first transmission power in response to the wireless device supports dynamic power sharing between the first cell group and the second cell group. According to an example embodiment, the determining the at least one second transmission power may be based on the allowed total transmission power in response to the wireless device does not support dynamic power sharing between the first cell group and the second cell group.

Figure 28:
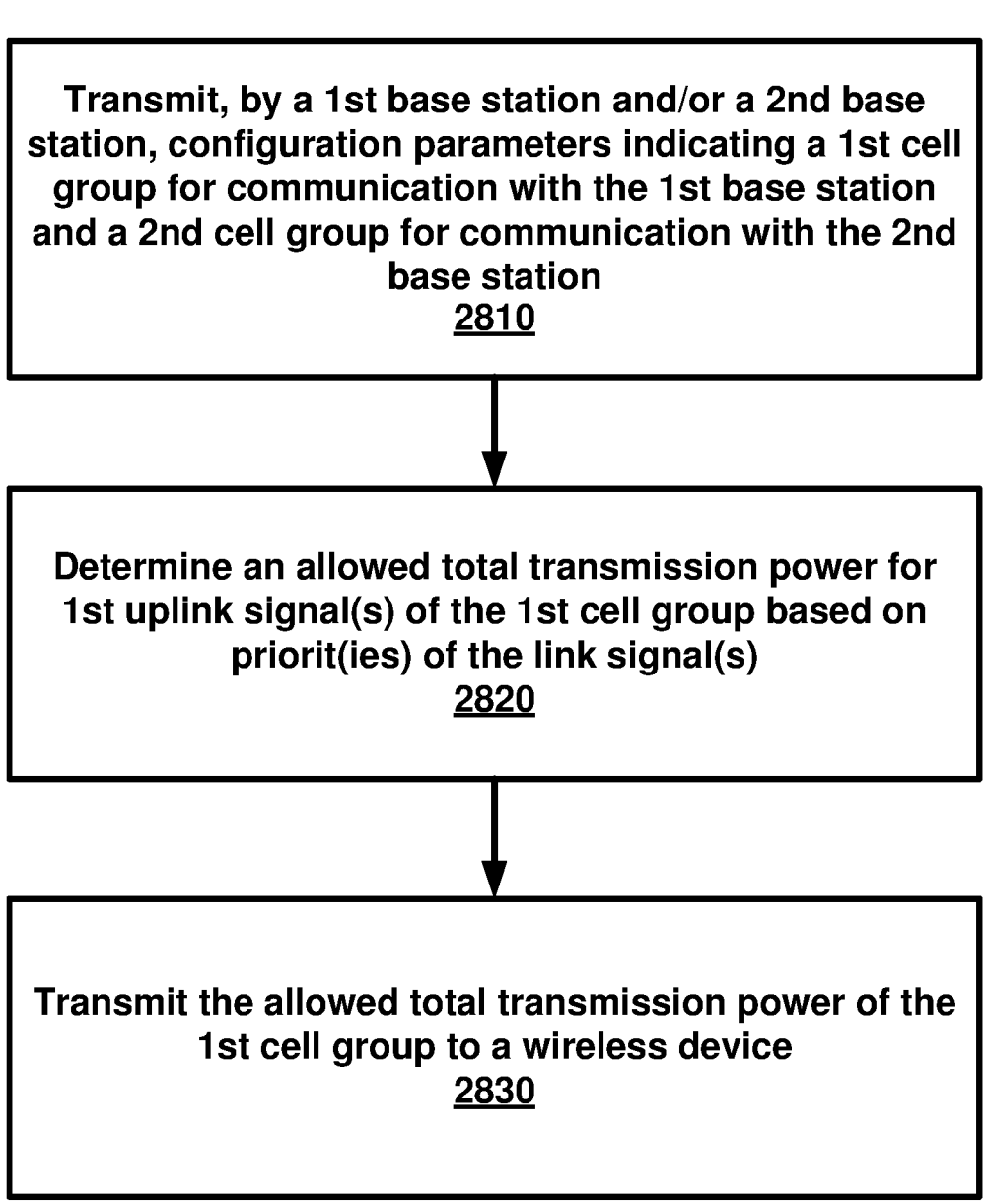
FIG. 28 is a flow diagram of an aspect of an example embodiment of the present disclosure.

FIG. 28 is a flow diagram as per an aspect of an example embodiment of the present disclosure. At 2810, a first base station and/or a second base station may transmit configuration parameters indicating a first cell group for communication with a first base station and a second cell group for communication with a second base station. At 2820, the first base station and/or the second base station may determine an allowed total transmission power for at least one first uplink signal of the first cell group based on at least one priority of at least one uplink signal. At 2830, the first base station and/or the second base station may transmit the allowed total transmission power of the first cell group to a wireless device.

In an example, a wireless device may receive configuration parameters indicating a first cell group for communication with a first base station and a second cell group for communication with a second base station. The wireless device may determine an allowed total transmission power for at least one first uplink signal of the first cell group based on at least one priority of at least one uplink signal. The wireless device may determine at least one first transmission power for the one or more first uplink signal based on the allowed total transmission power. The wireless device may determine at least one second transmission power for at least one second uplink signal of the second cell group based on the at least one first transmission power. The wireless device may transmit the at least one first uplink signals with the at least one first transmission power and the at least one second uplink signal with the at least one second transmission power.

According to an example embodiment, the configuration parameters further indicate: a first maximum transmission power threshold of the first cell group; and a second maximum transmission power threshold of the first cell group. According to an example embodiment, the first maximum transmission power threshold may be associated with a first priority. According to an example embodiment, the second maximum transmission power threshold may be associated with a second priority. For example, the second priority is higher than the first priority. According to an example embodiment, the configuration parameters may comprise the first maximum transmission power threshold of the first cell group and a power allowance for the first cell group. For example, the wireless device may determine the second maximum transmission power threshold of the first cell group based on the first maximum transmission power threshold and the power allowance. The second maximum transmission power threshold may be a sum of the first maximum transmission power threshold and the power allowance. According to an example embodiment, the wireless device may select as the allowed total transmission power of the first cell group, based on the at least one priority of the at least one uplink signal, the first maximum transmission power threshold; or the second maximum transmission power threshold. According to an example embodiment, the selecting may select the first maximum transmission power threshold in response to: a configured transmission power of the at least one uplink signal being equal to or lower than the first maximum transmission power threshold; or the at least one uplink signal being associated with the first priority. According to an example embodiment, the selecting may select the second maximum transmission power threshold in response to: a configured transmission power of the at least one uplink signal being higher than the first maximum transmission power threshold; and the at least one priority of the at least one uplink signal being the first priority.

According to an example embodiment, the wireless device may determine a second allowed power of the second cell group based on an allowed power of the wireless device and the allowed total transmission power of the first cell group. According to an example embodiment, the wireless device may determine the second allowed power of the second cell group based on the allowed power of the wireless device the at least one first transmission power of the first cell group. For example, the second allowed power of the second cell group may be equal to or higher than a difference between the allowed power of the wireless device and the allowed total transmission power of the first cell group. For example, the determining the second allowed power of the second cell group may be based on the at least one first transmission power in response to the wireless device may support dynamic power sharing between the first cell group and the second cell group. For example, the determining the second allowed power may be based on the allowed total transmission power of the first cell group in response to the wireless device may not support dynamic power sharing between the first cell group and the second cell group.

According to an example embodiment, one or more uplink transmissions of the first cell group may comprise a first uplink transmission. The one or more uplink transmissions are used for transmitting the at least one first uplink signal. The first uplink transmission may be used for transmitting the at least one uplink signal. The one or more uplink transmissions may be scheduled in a slot of the first cell group. According to an example embodiment, the wireless device may select the first uplink transmission of the one or more uplink transmissions based on a priority of the first uplink transmission and one or more priority of the one or more uplink transmissions. For example, the priority of the first uplink transmission may be higher than or equal to a priority of a second uplink transmission of the one or more uplink transmissions. According to an example embodiment, the priority of the first uplink transmission may be determined based on the at least one priority of the at least one uplink signal. For example, the wireless device may determine power priorities among the one or more uplink transmissions based on the one or more priorities. In an example, an uplink transmission with a higher priority may have a higher power priority. According to an example embodiment, the determining power priorities may be further based on information carried in an uplink transmission. For example, a scheduling request (SR)/hybrid automatic repeat request (HARD) feedback may have higher power priority over channel state information (CSI) feedback. For example, channel state information (CSI) may have higher power priority over data and data has higher power priority over a sounding reference signal (SRS). According to an example embodiment, the at least one priority of the at least one uplink signal may be determined based on a priority parameter configured for a configured grant configuration. For example, the wireless device may use a resource of the configured grant configuration for transmitting the at least one uplink signal. According to an example embodiment, the at least one priority of the at least one uplink signal may be determined based on a downlink control information (DCI) field of a DCI scheduling a resource for the at least one uplink signal. For example, the DCI field indicate a priority parameter for the at least one uplink signal.

According to an example embodiment, the at least one priority of the uplink signal may be determined based on a DCI field of a DCI scheduling a resource for the at least one uplink signal. For example, the DCI may be scrambled with a first Radio Network Temporary Identifier (RNTI). According to an example embodiment, the at least one priority of the uplink signal may be determined based on a priority of a logical channel of the at least one uplink signal. According to an example embodiment, the least one uplink signal may be associated with a first service. For example, the first service may be an enhanced mobile broadband. According to an example embodiment, the at least one priority may be a first priority. For example, the first priority may be a low priority. According to an example embodiment, the least one uplink signal may be associated with a first service. For example, the first service may be an ultra-reliable and low latency communication. According to an example embodiment, the at least one priority may be a second priority. For example, the second priority is a high priority. For example, the second priority may be higher than the first priority.

In an example, a wireless device may receive configuration parameters indicating a first cell group for communication with a first base station and a second cell group for communication with a second base station. The wireless device may determine an allowed total transmission power for at least one first uplink signal of the first cell group based on at least one priority of the at least one uplink signal. The wireless device may determine at least one first transmission power for the one or more first uplink signal based on the allowed total transmission power. The wireless device may determine at least one second transmission power for at least one second uplink signal of the second cell group based on the at least one the allowed total transmission power of the first cell group. The wireless device may transmit the at least one first uplink signals with the at least one first transmission power and the at least one second uplink signal with the at least one second transmission power.

According to an example embodiment, a wireless device may receive one or more radio resource control messages comprising configuration parameters. Configuration parameters may indicate a plurality of cells grouped into a plurality of cell groups. For example, the plurality of cell groups may comprise a first cell group for communication via a first base station and a second cell group for communication via a second base station. For example, the configuration parameters may comprise a first maximum transmission power threshold of the first cell group; and a second maximum transmission power threshold of the first cell group. The wireless device may select, as a selected maximum transmission power threshold, one of the first maximum transmission power threshold; and the second maximum transmission power threshold. The wireless device may select the selected maximum transmission power threshold based on a priority of a first uplink transmission to the first base station. The wireless device may determine a first transmission power for the first uplink transmission based on the selected maximum transmission power threshold. The wireless device may determine a second transmission power of a second uplink transmission to the second base station based on the selected maximum transmission power threshold. The wireless device may transmit the first uplink transmission based on the transmission power.

According to an example embodiment, the configuration parameters may comprise the first maximum transmission power threshold of the first cell group and a power allowance for the first cell group. For example, the wireless device may determine the second maximum transmission power threshold of the first cell group based on the first maximum transmission power threshold and the power allowance. For example, the second maximum transmission power threshold may be a sum of the first maximum transmission power threshold and the power allowance. According to an example embodiment, the wireless device may determine a second allowed power for the second cell group based on an allowed power of the wireless device and the selected maximum transmission power threshold. For example, the determining the second allowed power may be further based on one or more transmission powers of one or more uplink transmission of the first cell group. For example, the allowed power of the second cell group may be equal to or higher than a difference. For example, the difference may be determined as a gap between the allowed power of the wireless device and the selected maximum transmission power threshold. The wireless device may determine the second transmission power based on: the allowed power of the second cell group; and a configured power of the second uplink transmission. For example, the determining the second allowed power may be a lower value between: the difference; and the configured power of the second uplink transmission.

According to an example embodiment, the priority of the first uplink transmission may be determined based on a Radio Network Temporary Identifier (RNTI) corresponding to a downlink control information (DCI) scheduling the first uplink transmission. For example, the priority of the first uplink transmission may be determined based on a priority parameter configured for a configured grant configuration. For example, the wireless device may use a resource of the configured grant configuration for the first uplink transmission. According to an example embodiment, the priority of the first uplink transmission may be determined based on a DCI field of a DCI scheduling the first uplink transmission. For example, the DCI field may comprise a priority parameter for the first uplink transmission. According to an example embodiment, the priority of the first uplink transmission may be determined on a priority of a logical channel corresponding to data transmitted via the first uplink transmission.

According to an example embodiment, the wireless device may select the first uplink transmission among one or more uplink transmissions in response to being configured with the one or more uplink transmissions comprising the first uplink transmission in a slot for the first cell group. For example, the selecting may be based on one or more priority of the one or more uplink transmissions. For example, the priority of the first uplink transmission may be higher than a priority of a second uplink transmission of the one or more uplink transmissions.

According to an example embodiment, the wireless device may determine power priorities among the one or more uplink transmissions based on the one or more priorities. According to an example embodiment, the wireless device may determine a third uplink transmission, of the one or more uplink transmission, with a first priority that may have a higher power priority than a fourth uplink transmission, of the one or more uplink transmissions, with a second priority. For example, the first priority may be higher than the second priority. For example, the determining the power priorities may be further based on information carried in an uplink transmission. For example, a scheduling request (SR)/hybrid automatic repeat request (HARD) feedback may have higher power priority over channel state information (CSI) feedback. For example, CSI may have higher power priority over data and data has higher power priority over a sounding reference signal (SRS). According to an example embodiment, the wireless device may select the first maximum transmission power threshold. For example, a configured power for the first uplink transmission may be lower than or equal to the first maximum transmission power threshold.

According to an example embodiment, the wireless device may select the second maximum transmission power threshold. For example, the configured power for the first uplink transmission may be higher than the first maximum transmission power threshold and the priority of the first uplink transmission is associated with a first service. For example the first service may be a URLLC service. According to an example embodiment, the wireless device may select the second maximum transmission power threshold. For example, the configured power for the first uplink transmission is higher than the first maximum transmission power threshold. The priority of the first uplink transmission may be associated with a first priority. The first priority is a high priority.

According to an example embodiment, the wireless device may select the first maximum transmission power threshold. For example, the configured power for the first uplink transmission may be higher than the first maximum transmission power threshold and the priority of the first uplink transmission is associated with a second service. For example, the priority of the first uplink transmission is associated with a second priority. For example, the second priority may be a low priority. For example, first priority may be higher than the second priority.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   determining, by a wireless device, transmission powers of a plurality of uplink channels, comprising a scheduling request (SR) with a first priority and a hybrid automatic request (HARQ) feedback with a second priority, based on the following power priorities in descending order:
   a physical random access channel (PRACH) of a primary cell;
   a first uplink channel, of the plurality of uplink channels, comprising the SR with the first priority;
   a second uplink channel, of the plurality of uplink channels, comprising the HARQ feedback with the second priority, wherein the second priority is lower than the first priority; and
   a PRACH of a secondary cell; and
   transmitting, by the wireless device and via the plurality of uplink channels, uplink signals with the transmission powers.

2. The method of claim 1, wherein the plurality of uplink channels comprise a physical uplink control channel (PUCCH).

3. The method of claim 1, wherein the plurality of uplink channels comprise a physical uplink shared channel (PUSCH).

4. The method of claim 1, wherein the plurality of uplink channels comprise uplink control information (UCI) with the first priority and data with the second priority.

5. The method of claim 4, further comprising determining priorities of the plurality of uplink channels based on a higher priority between the first priority and the second priority.

6. The method of claim 1, wherein the primary cell belongs to a first cell group, and wherein the plurality of uplink channels are transmitted for one or more cells of the first cell group.

7. The method of claim 1, wherein the first uplink channel is associated with a first service in response to the first uplink channel being configured with the first priority.

8. The method of claim 7, wherein the first service is an ultra-reliable and low latency communication (URLLC) service.

9. The method of claim 1, wherein the second uplink channel is associated with a second service in response to the second uplink channel being configured with the second priority.

10. The method of claim 9, wherein the second service is an enhanced mobile broadband (eMBB) service.

11. A wireless device comprising:
    one or more processors; and
    memory storing instructions that, when executed by the one or more processors, cause the wireless device to:
    determine transmission powers of a plurality of uplink channels, comprising a scheduling request (SR) with a first priority and a hybrid automatic request (HARQ) feedback with a second priority, based on the following power priorities in descending order:
    a physical random access channel (PRACH) of a primary cell;
    a first uplink channel, of the plurality of uplink channels comprising the SR with the first priority;
    a second uplink channel, of the plurality of uplink channels, comprising the HARQ feedback with the second priority, wherein the second priority is lower than the first priority; and
    a PRACH of a secondary cell; and
    transmit, via the plurality of uplink channels, uplink signals with the transmission powers.

12. The wireless device of claim 11, wherein the plurality of uplink channels comprise a physical uplink control channel (PUCCH).

13. The wireless device of claim 11, wherein the plurality of uplink channels comprise a physical uplink shared channel (PUSCH).

14. The wireless device of claim 11, wherein the plurality of uplink channels comprise uplink control information (UCI) with the first priority and data with the second priority.

15. The wireless device of claim 14, wherein the instructions further cause the wireless device to determine priorities of the plurality of uplink channels based on a higher priority between the first priority and the second priority.

16. The wireless device of claim 11, wherein the primary cell belongs to a first cell group, and wherein the plurality of uplink channels are transmitted for one or more cells of the first cell group.

17. The wireless device of claim 11, wherein the first uplink channel is associated with a first service in response to the first uplink channel being configured with the first priority.

18. The wireless device of claim 17, wherein the first service is an ultra-reliable and low latency communication (URLLC) service.

19. The wireless device of claim 11, wherein the second uplink channel is associated with a second service in response to the second uplink channel being configured with the second priority, wherein the second service is an enhanced mobile broadband (eMBB) service.

20. A non-transitory computer-readable medium comprising instructions that, when executed by one or more processors of a wireless device, cause the wireless device to:
    determine transmission powers of a plurality of uplink channels, comprising a scheduling request (SR) with a first priority and a hybrid automatic request (HARQ) feedback with a second priority, based on the following power priorities in descending order:
    a physical random access channel (PRACH) of a primary cell;

a first uplink channel, of the plurality of uplink channels comprising the SR with the first priority;
a second uplink channel, of the plurality of uplink channels, comprising the HARQ feedback with the second priority, wherein the second priority is lower than the first priority; and
a PRACH of a secondary cell; and transmit, via the plurality of uplink channels, uplink signals with the transmission powers.

* * * * *